US009618827B2

(12) United States Patent
Shatz et al.

(10) Patent No.: US 9,618,827 B2
(45) Date of Patent: Apr. 11, 2017

(54) ILLUMINATION DEVICE FOR PERFORMING VIDEOGRAPHY AND PHOTOGRAPHY WITH MOBILE DEVICES

(71) Applicant: SureFire, LLC, Fountain Valley, CA (US)

(72) Inventors: Narkis Shatz, San Diego, CA (US); John C. Bortz, Spokane, WA (US); John W. Matthews, Newport Beach, CA (US)

(73) Assignee: SureFire, LLC, Fountain Valley, CA (US)

( * ) Notice: Subject to any disclaimer, the term of this patent is extended or adjusted under 35 U.S.C. 154(b) by 0 days.

(21) Appl. No.: 14/996,152

(22) Filed: Jan. 14, 2016

(65) Prior Publication Data

US 2016/0209728 A1 Jul. 21, 2016

Related U.S. Application Data

(60) Provisional application No. 62/104,038, filed on Jan. 15, 2015, provisional application No. 62/169,491, filed on Jun. 1, 2015.

(51) Int. Cl.
*H04B 1/38* (2015.01)
*G03B 15/05* (2006.01)
(Continued)

(52) U.S. Cl.
CPC ............... *G03B 15/05* (2013.01); *F21L 4/02* (2013.01); *F21V 7/0075* (2013.01);
(Continued)

(58) Field of Classification Search
USPC ............... 455/550.1, 556.1, 557; 362/296.1, 362/311.02, 311.12, 317, 335
See application file for complete search history.

(56) References Cited

U.S. PATENT DOCUMENTS 3,758,770 A 9/1973 Morasz
D422,787 S 4/2000 Feng
(Continued)

FOREIGN PATENT DOCUMENTS

AT 350 905 6/1979
DE 10 2009 04778 3/2011
(Continued)

OTHER PUBLICATIONS

"Meet the New Kid on the Block. The [Expose] Smart Light for Iphone", Knog, 5 pages, [online], [retrieved on May 14, 2015]. Retrieved from the Internet: <URL: http://usd.knog.com.au/exposesmart>.
(Continued)

*Primary Examiner* — Fayyaz Alam
(74) *Attorney, Agent, or Firm* — Haynes and Boone, LLP

(57) ABSTRACT

Illumination devices may be provided with one or more light sources that emit light of the same, similar, and/or different optical spectra within a wavelength range, for example, from the extreme ultraviolet (UV) to the far infrared (IR). One or more of the light sources may be selectively adjusted to control the overall mix of light projected onto a scene of interest. For example, one or more light sources may be used, and sometimes in conjunction with other optical elements, to provide illumination having a particular angular intensity distribution, color temperature, and/or other desired optical properties for a scene within a field of view (FOV) of the camera of a mobile device used for videography and/or photography. One or more illumination devices may also be used as flashlights and/or as sources of electrical power for recharging mobile devices. Related methods are provided.

28 Claims, 76 Drawing Sheets

(51) Int. Cl.
*H04M 1/725* (2006.01)
*F21L 4/02* (2006.01)
*F21V 7/00* (2006.01)
*F21Y 103/10* (2016.01)
*F21Y 115/10* (2016.01)
*F21Y 113/10* (2016.01)

(52) U.S. Cl.
CPC ..... *H04M 1/72527* (2013.01); *F21Y 2103/10* (2016.08); *F21Y 2113/10* (2016.08); *F21Y 2115/10* (2016.08); *G03B 2215/0514* (2013.01); *G03B 2215/0564* (2013.01); *G03B 2215/0567* (2013.01); *G03B 2215/0571* (2013.01)

(56) References Cited

U.S. PATENT DOCUMENTS

| | | |
|---|---|---|
| D445,791 S | 7/2001 | Ito et al. |
| 6,357,893 B1* | 3/2002 | Belliveau ............... F21L 4/027 257/E25.028 |
| D494,585 S | 8/2004 | Aupperle |
| D593,750 S | 6/2009 | Song |
| 7,604,361 B2* | 10/2009 | Pohlert ............... H04N 5/2354 362/11 |
| D641,756 S | 7/2011 | Hsieh et al. |
| D642,171 S | 7/2011 | Melanson et al. |
| 8,007,156 B1 | 8/2011 | Shatz et al. |
| 8,033,690 B1 | 10/2011 | Shatz et al. |
| D655,699 S | 3/2012 | Bau |
| D668,660 S | 10/2012 | Norfolk |
| D668,661 S | 10/2012 | Norfolk |
| D671,933 S | 12/2012 | Rodgers |
| D686,606 S | 7/2013 | Hong |
| D688,234 S | 8/2013 | Esses |
| D689,851 S | 9/2013 | Chang et al. |
| D692,826 S | 11/2013 | Aida et al. |
| D697,905 S | 1/2014 | Chang et al. |
| D702,672 S | 4/2014 | Mather |
| D703,648 S | 4/2014 | Magness et al. |
| D705,769 S | 5/2014 | Esses |
| 8,714,782 B1 | 5/2014 | Shatz et al. |
| 8,727,576 B1 | 5/2014 | Shatz et al. |
| D709,063 S | 7/2014 | Chang et al. |
| D709,064 S | 7/2014 | Chang et al. |
| D709,488 S | 7/2014 | Bulkley et al. |
| D709,868 S | 7/2014 | Witter et al. |
| D712,386 S | 9/2014 | Lu |
| D712,388 S | 9/2014 | Jia et al. |
| D719,945 S | 12/2014 | Chiang et al. |
| D721,072 S | 1/2015 | Laffon de Mazieres et al. |
| 2002/0025157 A1* | 2/2002 | Kawakami ............ G03B 15/05 396/155 |
| 2005/0231948 A1* | 10/2005 | Pohlert ................. F21V 14/06 362/237 |
| 2007/0159819 A1* | 7/2007 | Bayat ..................... F21L 4/02 362/236 |
| 2007/0242948 A1* | 10/2007 | Miramontes ........... G03B 17/00 396/448 |
| 2008/0175581 A1* | 7/2008 | Yasutomi ............... G03B 15/02 396/174 |
| 2009/0181729 A1 | 7/2009 | Griffin, Jr. et al. |
| 2012/0275025 A1* | 11/2012 | Parrill ................... G02B 23/16 359/511 |
| 2012/0286118 A1 | 11/2012 | Richards |
| 2015/0076020 A1 | 3/2015 | Smith |

FOREIGN PATENT DOCUMENTS

| | | |
|---|---|---|
| EP | 2 391 096 | 11/2011 |
| EP | 2 789 290 | 10/2014 |
| GB | 2 198 516 | 6/1988 |
| WO | WO 2006/022601 | 3/2006 |
| WO | WO 2012/103554 | 8/2012 |

OTHER PUBLICATIONS

"[Expose] Smart Manual", Knog, pp. 1-4, [online], [retrieved on May 14, 2015]. Retrieved from the Internet: <URL: https://www.knog.com.au/media/wysiwyg/files/product_instructions/expose-smart-instructions.pdf>.

"Manfrotto Introduces Their First Smartphone Accessory!", Manfrotto, Oct. 8, 2012, 3 pages, [online], [retrieved on Jul. 8, 2015]. Retrieved from the Internet: <URL: http://www.manfrotto.us_News+%26+EventsNewsManfrotto+Introduces+Their+First+Smartphone+Accessory!30663597>.

* cited by examiner

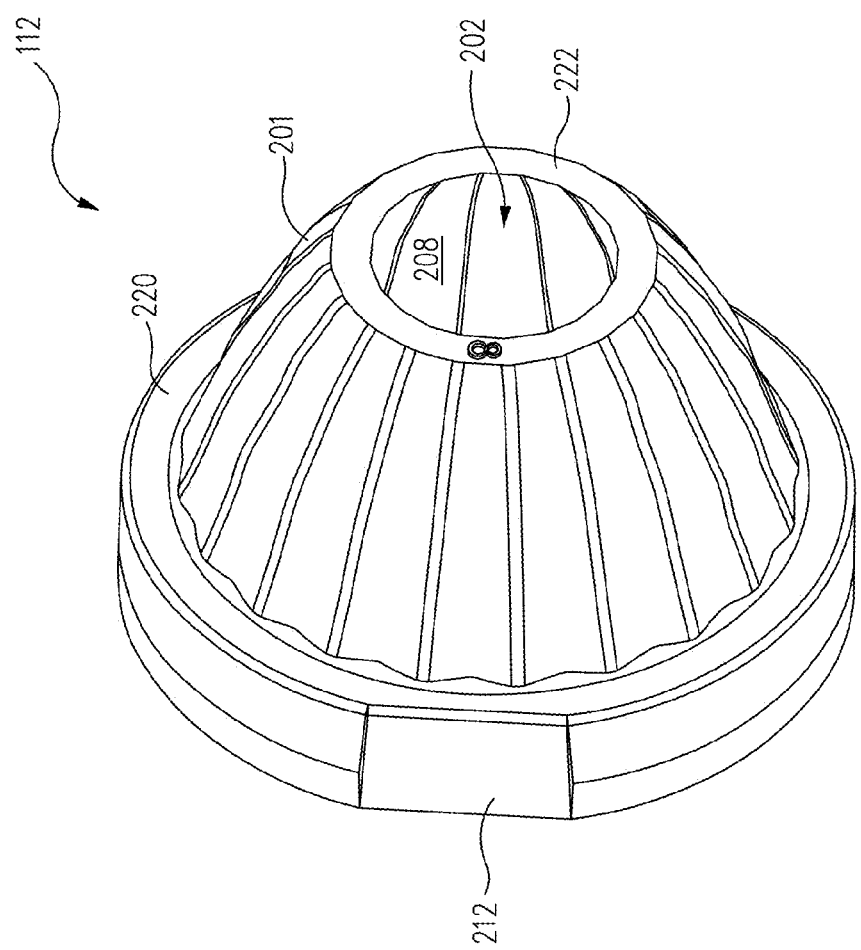

ILLUMINATION DEVICE FOR PERFORMING VIDEOGRAPHY AND PHOTOGRAPHY WITH MOBILE DEVICES

CROSS-REFERENCE TO RELATED APPLICATIONS

This application claims priority to and the benefit of U.S. Provisional Patent Application No. 62/104,038 filed Jan. 15, 2015 and entitled "LIGHTING DEVICE WITH REFLECTIVE NON-PARABOLOIDAL BEAM-SHAPING OPTICS AND LIGHTING DEVICE ATTACHMENT FOR MOBILE DEVICES" which is hereby incorporated by reference in its entirety.

This application claims priority to and the benefit of U.S. Provisional Patent Application No. 62/169,491 filed Jun. 1, 2015 and entitled "ILLUMINATION DEVICE FOR PERFORMING VIDEOGRAPHY AND PHOTOGRAPHY WITH MOBILE DEVICES" which is hereby incorporated by reference in its entirety.

This application is related to U.S. patent application No. Ser. 14/996,135 filed Jan. 14, 2016 and entitled "REFLECTIVE NON-PARABOLOIDAL BEAM-SHAPING OPTICS" which is hereby incorporated by reference in its entirety.

This application is related to U.S. patent application Ser. No. 14/996,178filed Jan. 14, 2016 and entitled "LIGHTING DEVICE ATTACHMENT FOR MOBILE DEVICES" which is hereby incorporated by reference in its entirety.

BACKGROUND

Field of the Invention

In some embodiments, the present invention generally relates to beam-shaping optics for lighting devices, lighting device attachments for mobile devices, portable illumination devices for performing videography and photography with mobile phones and other mobile devices, and the use of such portable illumination devices as flashlights and as sources of electrical power for the recharging of batteries in mobile devices.

Related Art

Lighting devices, such as flashlights, headlamps, and others, typically include reflective optics for projecting light from a light source from the lighting device. Conventional reflective optics for projecting light onto distant objects are typically paraboloidal in shape. Paraboloidal reflective optics produce a narrow collimated beam centered on a wide-angle surround beam of much lower intensity. The peak intensity produced by such optics can approach the maximum peak intensity value theoretically achievable using a given light source, for a specified exit-pupil area. However, the surround-beam intensity outside the central collimated portion of beams produced by paraboloidal reflective optics is typically lower than would be preferred by most users, even for viewing objects at relatively short ranges.

In addition, the beam quality (i.e., beam smoothness) produced by a paraboloidal reflector is often poor in the central collimated region due to imaging of various structures in the light source. For this reason, the paraboloidal shape of the reflector is often modified slightly by the addition of texturing on the surface of the reflector. This texturing has the effect of diffusing the collimated portion of the output, thereby producing a smoother collimated output. The texturing is often created by spraying droplets of a viscous liquid onto the reflector's surface and allowing it to solidify. The effect of such texturing on the optical output is difficult to control, so considerable trial and error in spraying the droplets is often required to achieve satisfactory results. An alternative to such texturing is to place a refractive diffuser behind a protective cover glass of the flashlight. However, this increases the cost of the flashlight and reduces the light output due to Fresnel reflection.

Paraboloidal reflectors also generate a surround beam that commonly extends out to off-axis angles beyond which the light is of benefit to the typical user. It would be preferable in most cases to transfer some or all of this light to angular regions closer to the optical axis. This can sometimes be achieved by reducing the focal length of the paraboloid, thereby producing a deeper reflector that collects and collimates more of the light from the source and reduces the angular width of the surround beam. However, in many cases reducing the focal length can be difficult or impossible due to the need to avoid a reflective surface that is impractically close to the light source and prevents providing sufficient space for the light source to be mounted with adequate clearance. It would therefore be desirable to provide improved reflectors for lighting devices.

Mobile devices such as cameras, smartphones, tablets, personal digital assistants, laptop computers and others often include one or more light sources such as light emitting diode light (LED) light sources. These light sources are sometimes operated in conjunction with an image sensor in the mobile device to capture still or video images by using the light sources to illuminate the imaged scene. In other applications, the light sources are sometimes used as a temporary substitute for a flashlight.

The ever-present consumer demand for lighter and smaller devices and for longer battery life in the devices poses a challenge to provide light sources in mobile devices that provide sufficient illumination, illumination of a desirable color, and/or illumination with an effective beam shape for image capture and other scene illumination purposes without creating undesirably bulky or power hungry devices. It would therefore be desirable to provide improved lighting capabilities for mobile devices.

Mobile devices such as cameras, smartphones, tablet computers, personal digital assistants, laptop computers, and other similar devices generally include one or more built-in illuminators that utilize light sources such as light emitting diodes (LEDs). These built-in illuminators are operated in conjunction with a camera in the mobile device to supplement ambient illumination when capturing still and/or video imagery at short ranges (e.g., several feet). Such illuminators are sometimes also used as backup flashlights.

The built-in illuminators in current mobile devices generally provide inadequate illumination under low-ambient-lighting conditions for still photography and, especially, for videography at substantially longer image-capture ranges (e.g., up to 50 feet). Even for scenes illuminated by moderate to high levels of ambient light, these built-in illuminators often fail to provide adequate supplemental illumination to reduce image contrast to acceptable levels when there are large differences in the level of ambient illumination between different regions within a scene to be imaged (e.g., a person standing in a shaded area with a light-colored, sun-illuminated building in the background). Therefore, there is a need for improved illuminators capable of producing significantly higher intensity levels for use with mobile devices.

Due to constraints on weight, volume, shape (e.g., thickness), and available electrical power, it is difficult to incorporate into a given mobile device a built-in illuminator that provides adequate performance over a wide range of commonly encountered ambient lighting conditions, particularly in the case of small mobile devices such as mobile phones, and also particularly for videography. Therefore, a stand-alone portable illumination device that can be utilized as needed with one or more mobile devices can provide significant performance benefits relative to built-in illumination devices.

There is demand among some consumers for the ability to reduce or eliminate unnatural color casts in images captured by cameras in mobile devices via adjustment of the color temperature of the light produced by the illuminator The built-in illuminators in most current mobile devices have no capability for adjustment of the color temperature. Although color casts can be adjusted in post processing of images (e.g., using Photoshop or similar software), it would be far preferable, particularly in the case of video imagery, to use an illuminator with an adjustable color temperature.

The output angular beam widths and beam shapes provided by built-in illuminators in the vast majority of current mobile devices are rotationally symmetrical and non-adjustable, even though the horizontal and vertical field of view (FOV) of still and video imagery captured by a given mobile device can vary greatly depending on its settings (e.g., zoom setting or video-format setting). The light projected by an illuminator outside the camera's FOV does not contribute to illuminating the scene being captured and represents a waste of energy. It may therefore be desirable to provide illuminators with adjustable beam widths and beams shapes for use with mobile devices.

SUMMARY

Various techniques are provided to control the beam shape of a light beam projected by a lighting device. For example, the lighting device may include a non-paraboloidal monolithic beam-shaping reflector. The reflector may be a monolithic structure that generates a high-quality output beam without requiring the use of texturing or a diffuser while providing significantly higher surround-beam intensity levels, within a desired angular extent, than could be produced by a paraboloidal reflector having the same aperture size.

The monolithic beam-shaping reflector may be a monolithic reflective optical element having an internal surface that defines a cavity within which a light source such as a light-emitting diode (LED) light source can be at least partially disposed to emit light onto the internal surface. The internal surface may be a non-paraboloidal reflective surface having longitudinal undulations that generates a light beam having the desired intensity levels at different angles off axis. The internal surface may be faceted or non-faceted. For example, in some embodiments, the internal surface may include a plurality of facets each having longitudinal undulations. A monolithic beam-shaping reflector with a faceted internal surface may have longitudinal undulations and an axial asymmetry latitudinally about a symmetry axis of an order that is equal to the number of facets. The symmetry axis of a faceted reflector may coincide with an optical axis of the reflector. The faceted internal surface may have a profile in any plane containing the surface's symmetry axis that includes longitudinal undulations.

In another example, the internal surface may be a non-faceted non-paraboloidal surface having longitudinal undulations. A monolithic beam-shaping reflector with a non-faceted internal surface may be a smoothly continuous surface that includes longitudinal undulations and that has axial symmetry of approximately infinite order latitudinally about a symmetry axis. The symmetry axis of a non-faceted reflector may also coincide with an optical axis of the reflector.

Undulations on the internal surface of the reflector (in cooperation with the facets in embodiments in which the internal surface is also faceted) may smooth the light beam, eliminating spatial beam structure that would otherwise be produced by a reflector, such as an untextured paraboloid that forms far-field images of structure present in the light source.

In faceted embodiments, as a result of the faceting, the reflector may have a cross section that is a regular polygon such as a 20-sided polygon. That is, the shape of the intersection of the reflective surface with any plane perpendicular to the optical axis may be a regular polygon such as a 20-sided regular polygon centered on the optical axis of the reflector. The reflector may have an aperture defined by an opening that is opposite to an opening in which the light source is disposed. The aperture of a faceted reflector may have an aperture size defined as the diameter of the circle that intersects the center of each side of the polygonal exit pupil. The reflector may have a shape profile in a plane that passes through both the symmetry axis of the reflective surface and the center of one of the facets that includes smooth, continuous longitudinal undulations.

The reflector may be substantially longer than a paraboloidal reflector having the same aperture size, thereby reducing the angular extent of the surround beam and providing relatively more light to angular regions that are closer to the center of the beam where it may be of greater benefit to a typical user.

In one embodiment, a lighting device is provided that includes a light source adapted to project light; and a reflective optical element having: an internal surface, a cavity defined by the internal surface, a first opening at a first end, a second opening at an opposing second end, a plurality of facets on the internal surface that each extend continuously and longitudinally from the first opening to the second opening, in which each of the plurality of facets has a surface that forms a portion of the internal surface, in which the surface of each of the plurality of facets includes longitudinal undulations, in which the light source is disposed at least partially within the cavity and configured to project the light onto the internal surface, and in which the internal surface is configured to reflect the light from the light source to generate a light beam.

In another embodiment, a method of making the lighting device is provided that includes: providing the light source; providing the reflective optical element; inserting the light source through the first opening and at least partially into the cavity; and coupling the light source to the reflective optical element such that, when illuminated by the light source, the internal reflective surface generates the light beam.

In another embodiment, a method of operating a lighting device includes illuminating, by generating a light beam with a light source and a monolithic reflective optical element with an aperture size, a first portion of a scene with a first brightness that is less than a brightness, in the first portion, of a light beam of a paraboloidal reflector with the same hole size, aperture size, and light source; illuminating, with the light beam generated by the light source and the monolithic reflective optical element with the aperture size, a second portion of the scene with a second brightness that is greater than a brightness, in the second portion, of the light beam of the paraboloidal reflector with the same hole size, aperture size, and light source; and illuminating, with the light beam generated by the light source and the monolithic reflective optical element with the aperture size, a third portion of the scene with a third brightness that is less than a brightness, in the third portion, of the light beam of the paraboloidal reflector with the same hole size, aperture size, and light source, in which the second portion surrounds the first portion and in which the third portion surrounds the second portion.

In another embodiment, a monolithic reflective optical element is provided that includes an internal reflective surface; a cavity defined by the internal surface; a first opening at a first end; a second opening at an opposing second end; a plurality of facets on the internal surface that each extend continuously and longitudinally from the first opening to the second opening; in which each of the plurality of facets has a surface that forms a portion of the internal surface; in which the surface of each of the plurality of facets includes longitudinal undulations; and in which the internal surface is configured to reflect light from a light source disposed at least partially within the cavity to generate a light beam.

In another embodiment, a monolithic reflective optical element is provided that includes an internal reflective surface; a cavity defined by the internal surface; a first opening at a first end; a second opening at an opposing second end; longitudinal undulations on the internal surface that extend continuously and longitudinally from the first opening to the second opening; and in which the internal surface is configured to reflect light from a light source disposed at least partially within the cavity to generate a light beam.

In another embodiment, a lighting device attachment is provided that includes a housing that defines a cavity configured to receive a mobile device; and a light source disposed within the housing and configured to operate in cooperation with the mobile device.

In another embodiment, a lighting device attachment is provided that includes a housing that defines a housing cavity configured to receive a mobile device; a light source adapted to project light; and a monolithic reflective optical element including a reflective internal surface that defines a reflector cavity, a first opening at a first end, a second opening at an opposing second end, longitudinal undulations on the reflective internal surface that extend continuously and longitudinally from the first opening to the second opening, and where the reflective internal surface is configured to reflect the light from the light source to generate a light beam.

In another embodiment, a method is provided that includes attaching a mobile device to a lighting device attachment and operating one or more light sources of the lighting device attachment using a control component of the lighting device attachment or an application of the mobile device.

In another embodiment, a lighting device attachment is provided that includes a housing that defines a cavity configured to receive a mobile device; a light source disposed within the housing; and an optical element adapted to project light from the light source to illuminate an external scene.

In another embodiment, a method of operating a lighting device attachment having a housing that defines a cavity configured to receive a mobile device, a light source disposed within the housing, and an optical element is provided, the method including attaching the mobile device at least partially within the cavity; and projecting light from the light source with the optical element to illuminate an external scene while the mobile device is attached.

In various embodiments, one or more illumination devices and/or related methods may be provided with one or more light sources and one or more optical elements to produce one or more beams of light having the same, similar, and/or different spectra and the same, similar, and/or different intensity distributions as a function of angle. In various embodiments, such light may be any electromagnetic radiation in a spectral region ranging from the extreme ultraviolet (UV) to the far infrared (IR), and may include wavelengths ranging from approximately 10 nm to approximately 106 nm. In some embodiments, such light may be provided primarily or exclusively in the visible-light band, with wavelengths ranging from approximately 390 nm to approximately 770 nm. In some embodiments, the flux output by multiple light sources and one or more optical elements may be selectively adjusted electronically to control the output spectrum and/or the angular distribution of the intensity of the composite beam of light produced by all the individual sources and the optical elements.

For example, multiple light sources may be used, and sometimes in conjunction with one or more optical elements, to provide a combined output illumination beam with adjustable color temperature for use with the camera of a mobile device.

In various embodiments, the multiple light sources may emit light along appropriate optical axes to produce a combined non-rotationally symmetric illumination beam comprised of the overlapping projected light beams produced by the multiple light sources. By selectively electronically adjusting the flux output of the different light sources, the intensity as a function of angle of the combined output beam may be adjusted. As a result, such an illumination device could be adapted to provide the appropriate output beam shape for any camera setting to produce high-quality imagery and to reduce drain on the battery by reducing the amount of light projected outside the camera's FOV.

In some embodiments, an illumination device as described herein may be attached to a mobile device and used to illuminate an area of interest with a desired beam pattern and/or spectrum to supplement and/or replace a flash or other existing illumination device of the mobile device. As a result, still images or video images captured by a camera of the mobile device may be illuminated in a manner that is superior to conventional techniques that merely rely on a conventional illumination device of the mobile device.

In various embodiments, the illumination device may also be used as a flashlight and its battery may be used to recharge the batteries in portable devices.

In another embodiment, a portable illumination includes a housing; and one or more light sources disposed within the housing and adapted to provide corresponding light beams to selectively illuminate an external area of interest with a combined light beam having a desired output optical flux level, a desired angular intensity distribution, a desired color temperature, and/or a desired optical spectrum to provide illumination for images captured by a camera of a mobile device.

In another embodiment, a portable illumination device includes a housing; a plurality of light sources disposed within the housing and configured to provide corresponding light beams having independently adjustable output flux levels; and wherein the light beams at least partially overlap to provide a combined light beam to provide illumination for images of an external area of interest captured by a camera of a mobile device separate from the housing.

In another embodiment, a method includes providing a portable illumination device comprising a housing and one or more light sources disposed within the housing; operating the light sources to provide corresponding light beams to selectively illuminate an external area of interest with a combined light beam having a desired output optical flux level, angular intensity distribution, color temperature, and/or optical spectrum; and capturing images of the illuminated external area of interest using one or more cameras of a mobile device In another embodiment, a method includes providing a portable illumination device comprising a housing and one or more light sources disposed within the housing; operating the light sources to provide corresponding light beams having independently adjustable output flux levels, wherein the light beams at least partially overlap to provide a combined light beam; and capturing, by a camera of a mobile device separate from the housing, images of an external area of interest illuminated by the combined light beam.

In another embodiment, an illumination device includes a housing; one or more light sources disposed within the housing and adapted to project light from the housing to illuminate an area of interest external to the housing; one or more batteries disposed within the housing and adapted to provide electrical power to the light sources; and an attachment mechanism adapted to selectively secure the illumination device to a mobile electronic device.

In another embodiment, a method includes providing a mobile electronic device; providing an illumination device comprising: a housing, one or more light sources disposed within the housing and adapted to project light from the housing to illuminate an area of interest external to the housing, one or more batteries disposed within the housing and adapted to provide electrical power to the light source, and an attachment mechanism; and selectively securing the illumination device to the mobile electronic device by the attachment mechanism.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

FIG. 2D illustrates a rear perspective view of the reflective element of FIG. 2A in accordance with an embodiment of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

In accordance with various embodiments provided herein, a lighting device may be provided having a beam-shaping reflector. For example, in some embodiments, such a lighting device may include a monolithic reflective optical element having an internal surface that defines a cavity, in which the internal surface is faceted or non-faceted and includes longitudinal undulations extending outwards. The longitudinal undulations and the non-paraboloidal shape of the reflective internal surface cooperate to shape the beam of light generated by the lighting device. In various embodiments, longitudinal undulations may extend outwards along the shape profile from a rearward hole to the exit pupil.

Figure 1A:
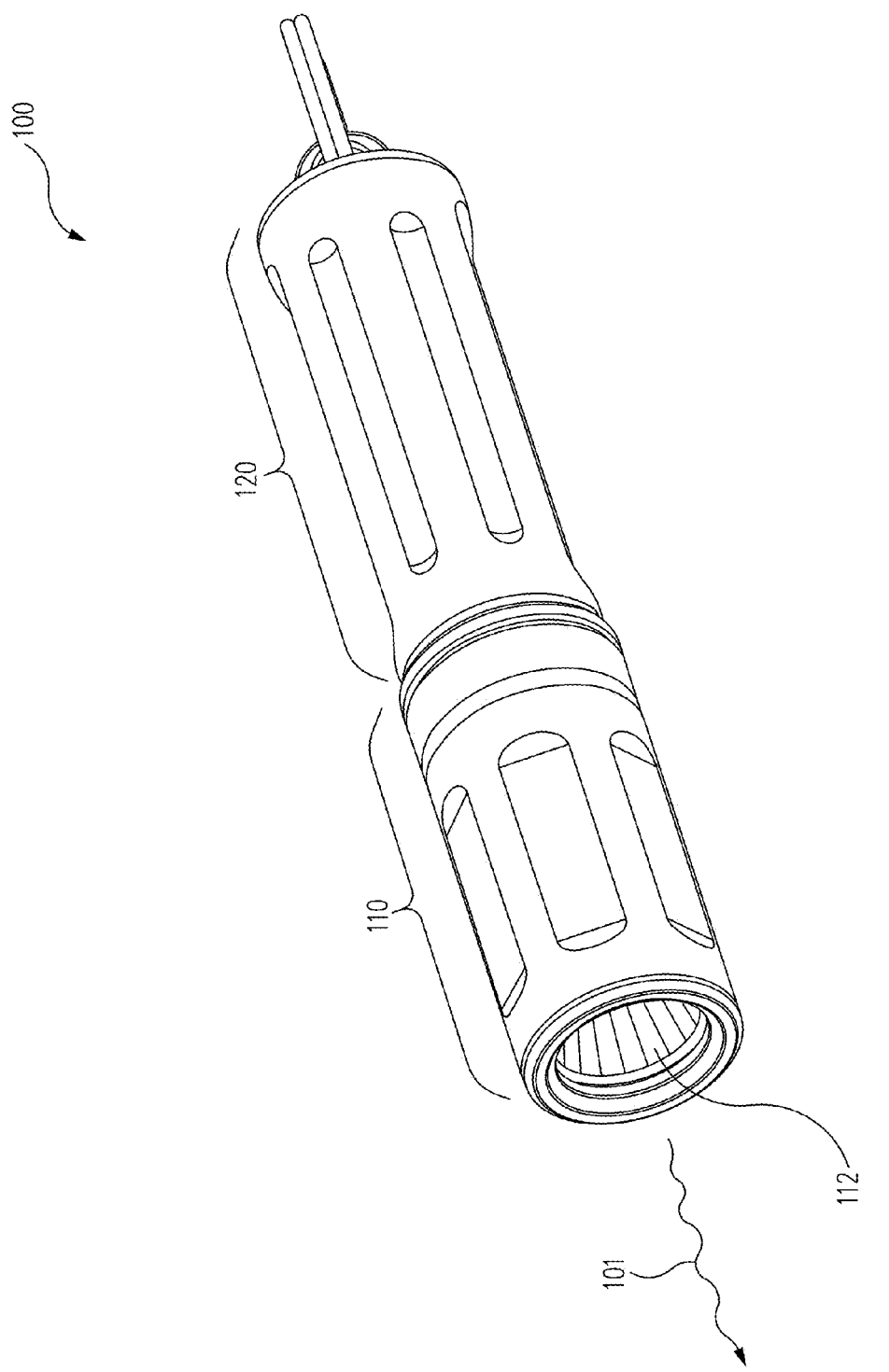
FIG. 1A illustrates a perspective view of a lighting device in accordance with an embodiment of the disclosure.

Referring now to the drawings wherein the showings are for purposes of illustrating embodiments of the present disclosure only, and not for purposes of limiting the same, FIG. 1A provides a perspective view of a lighting device 100 in accordance with embodiments of the disclosure. As shown, lighting device 100 may be a flashlight including a head 110 and a body 120. Head 110 may include various components for producing and controlling light 101 (e.g., a light beam) directed toward a scene such as an area of interest. Body 120 may include various components for providing power to produce the projected light.

Head 110 may include an optical element 112 that receives light projected from a light source (not shown) and shapes the light into a desired beam shape (e.g., having a desired direction and spread profile). In some embodiments, optical element 112 may be implemented as an optical reflector having a reflective internal surface having a non-paraboloidal shape and surface features such as undulations and/or facets that cooperate to shape the light beam.

An exploded perspective view of lighting device 100 is shown in FIG. 2 in accordance with an embodiment. As shown in FIG. 2, head 110 may include a front housing portion 114, a washer 116, a transparent protective cap 118 such as a glass or transparent plastic cover, reflector 112, an internal mounting structure 122, a lighting stack 124 having a light source 126, a circular mounting member 128, and a conductive ring 130. Body 120 may include a battery 132, a conductive spring 134, an O-ring 136, and a rear housing portion 138. Body 120 may also be provided with external accessories such as a clip 142 (e.g., a keychain ring) and/or a loop 140 (e.g., a loop formed on body 120 for coupling a keychain ring).

Light source 126 may be implemented, for example, as a light emitting diode (LED), an incandescent light bulb, a tungsten-halogen light bulb, a fluorescent light bulb, a high-intensity discharge light bulb, or any other singular or plural light source devices.

Reflector 112 may be mounted within front housing portion 114. Internal mounting structure 122 may be configured to receive a rearward end of reflector 112 and a forward end of lighting stack 124 so that light source 126 is located within an opening of reflector 112 within mounting structure 122. A forward end of mounting structure 122 may be inserted into front housing portion 114 so that a front end of reflector 112 is mounted against transparent protective member 118. In this way, reflector 112 may be arranged to project light from light source 126 through opening 144 in front housing portion 114 along optical axis 145.

Figure 2A:
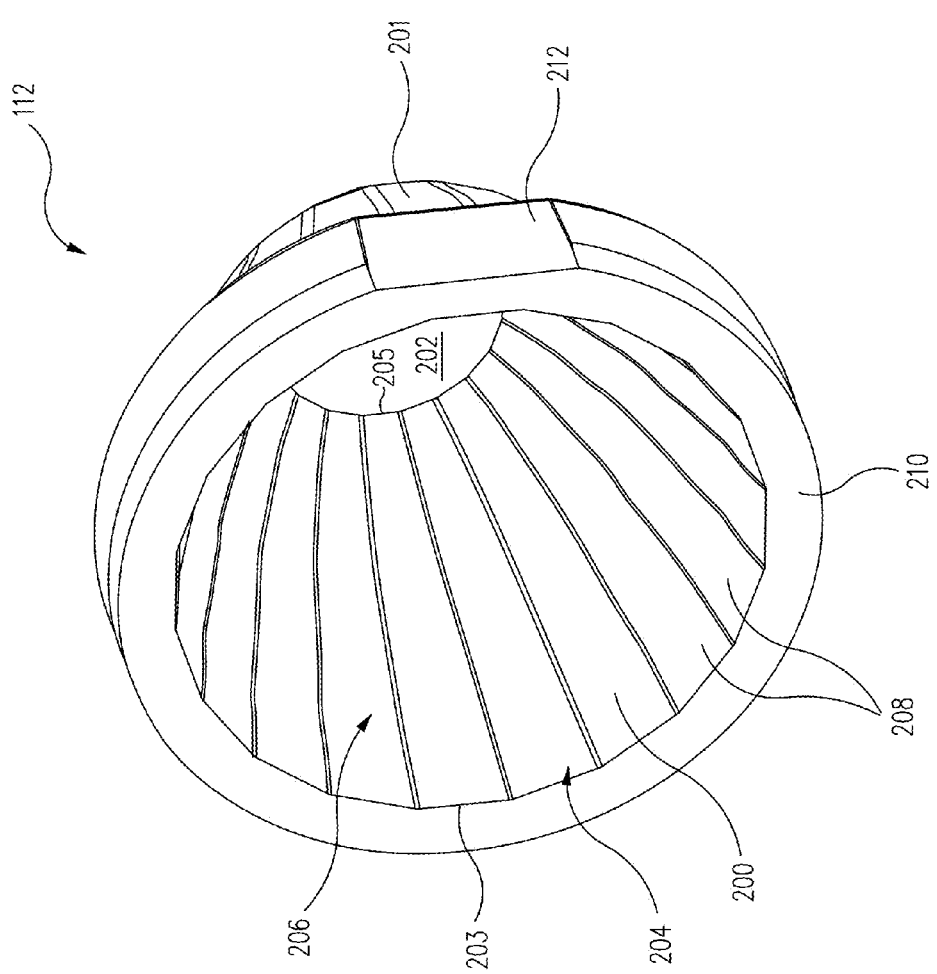
FIG. 2A illustrates a perspective view of a reflective element in accordance with an embodiment of the disclosure.

As discussed above, reflector 112 may have an internal surface with a non-paraboloidal shape and longitudinal undulations and can be provided with or without facets. Various views of a reflector 112 implemented with facets are shown in FIGS. 2A-2F. For example, a top side perspective view of reflector 112 is shown in FIG. 2A according to an embodiment. As shown in FIG. 2A, reflector 112 may have an internal surface 200 and an external surface 201. The internal surface 200 may extend from a first opening 202 at a rearward end of reflector 112 to a second opening 204 at a forward end of reflector 112 such that the internal surface 200 defines a cavity 206. Rear opening 202 may be defined by an edge 205. Opening 204 may be defined by an edge 203.

Figure 1B:
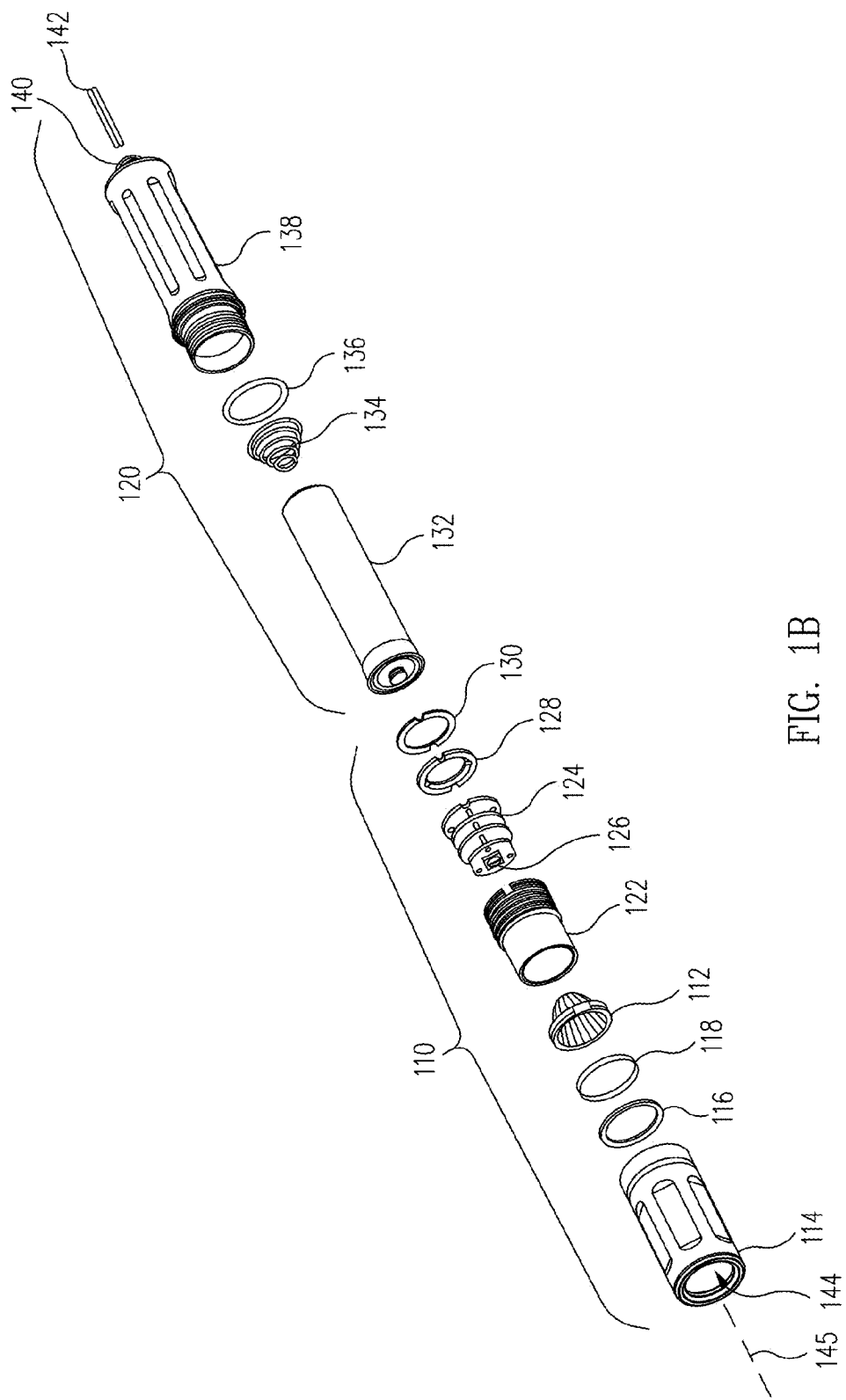
FIG. 1B illustrates an exploded perspective view of the lighting device of FIG. 1A in accordance with an embodiment of the disclosure.

Internal surface 200 may be a reflective surface that, when illuminated by light source 126, generates a light beam. Internal surface 200 may include facets 208 that extend from opening 202 to opening 204. Each facet 208 may be an undulating facet that includes longitudinal undulations along the facet running between opening 202 and opening 204. As shown, reflector 112 may include a lip 210 at the forward end that runs around the periphery of the forward end. Lip 210 may provide a structure for mounting and positioning reflector 112 into lighting device 100. For example, lip 210 may overhang the external surface 201 of reflector 112 so that a rearward surface of lip 210 rests against internal mounting structure 122 (see FIG. 1B) when the reflector is installed in the device. Lip 210 may include one or more structures such as a flat portion 212. For example, flat portion 212 may be an alignment feature configured to be received by a corresponding flat portion (not shown) of internal support structure 122.

Facets 208 may extend to the edges 205 and 203 so that edges 205 and 203 each define a polygonal hole (e.g., openings 202 and 204) at each end of reflector 112. In the example of FIG. 2A, opening 202 and opening 204 each are 20-sided polygonal holes formed by the ends of 20 facets. However, this is merely illustrative. In other embodiments, reflector 112 may include any suitable number of facets or reflector 112 may include no facets at all.

Facets 208 and lip 210 may be formed as separate structures or may be formed as a single monolithic structure. For example, reflector 112 may be a single molded monolithic structure.

Figure 2B:
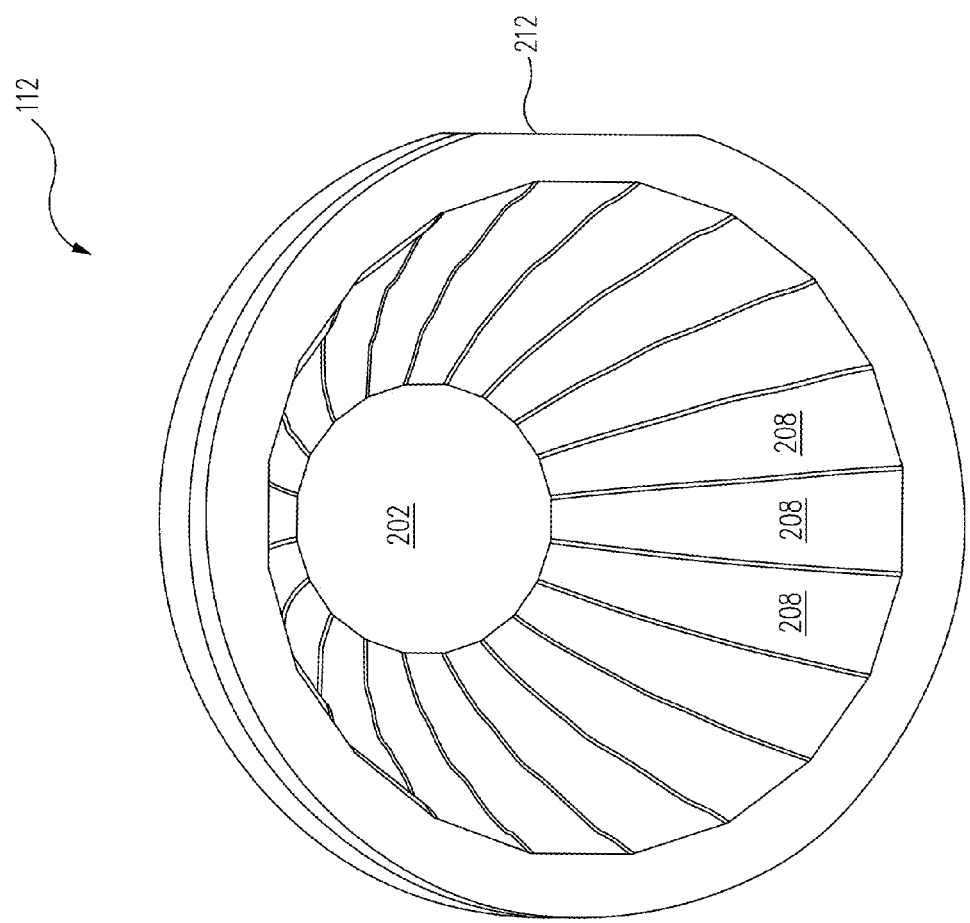
FIG. 2B illustrates a top perspective view of the reflective element of FIG. 2A in accordance with an embodiment of the disclosure.
Figure 2C:
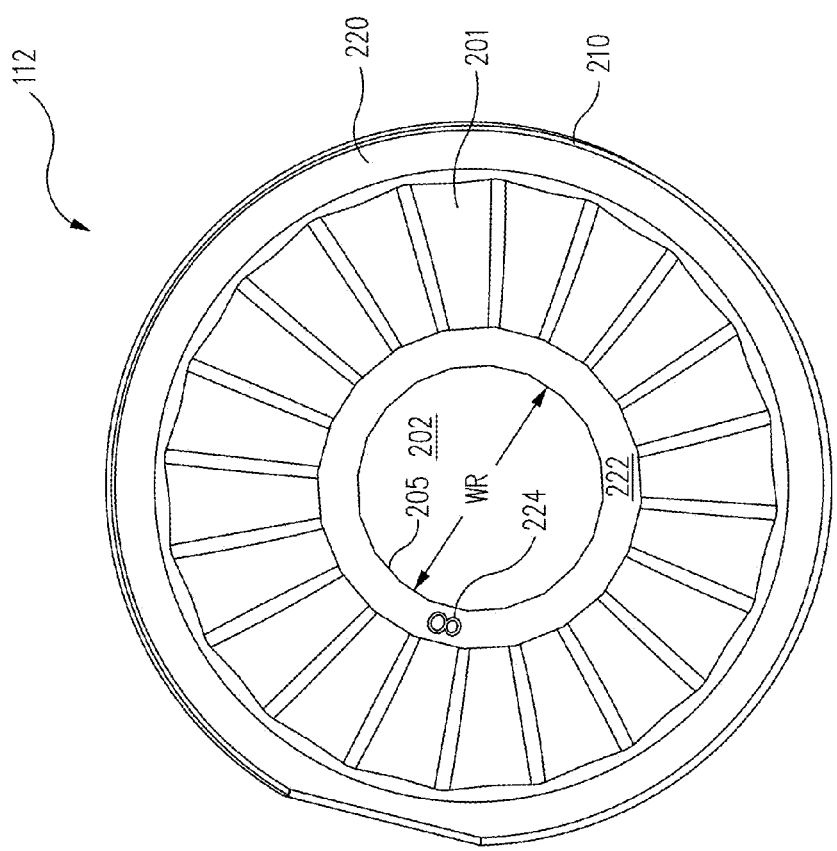
FIG. 2C illustrates a face-on rear view of the reflective element of FIG. 2A in accordance with an embodiment of the disclosure.

In the view of FIG. 2B, reflector 112 is shown rotated with respect to the view of FIG. 2A so that all 20 sides of rear opening 202 are visible. A rear view of reflector 112 is shown in FIG. 2C. As shown in FIG. 2C, lip 210 may include a rear facing surface 220 (e.g., a surface configured to rest against or otherwise be positioned adjacent to a corresponding surface of internal support structure 122). A rearmost surface 222 may be a flat surface that, when mounted in lighting device 100 rests against or is otherwise positioned adjacent to a forwardmost surface of lighting stack 124.

When mounted in lighting device 100, light source 126 may extend at least partially through opening 202 and into cavity 206 so that light source 126 can emit light onto internal surface 200 to generate a desired light beam. As shown in the rear view of FIG. 2C, surface 222 of reflector 112 may include one or more molded features such as surface feature 224. As examples, surface feature 224 may be a branding feature (e.g., a part number or company identifier) or an alignment feature.

Figure 2E:
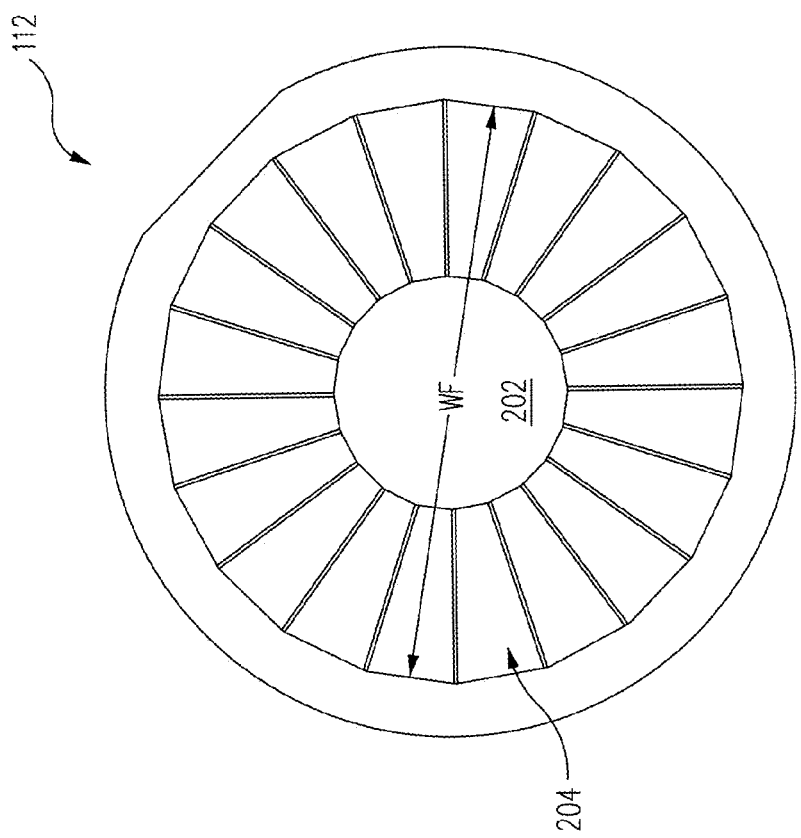
FIG. 2E illustrates a face-on front view of the reflective element of FIG. 2A of a lighting device in accordance with an embodiment of the disclosure.
Figure 2F:
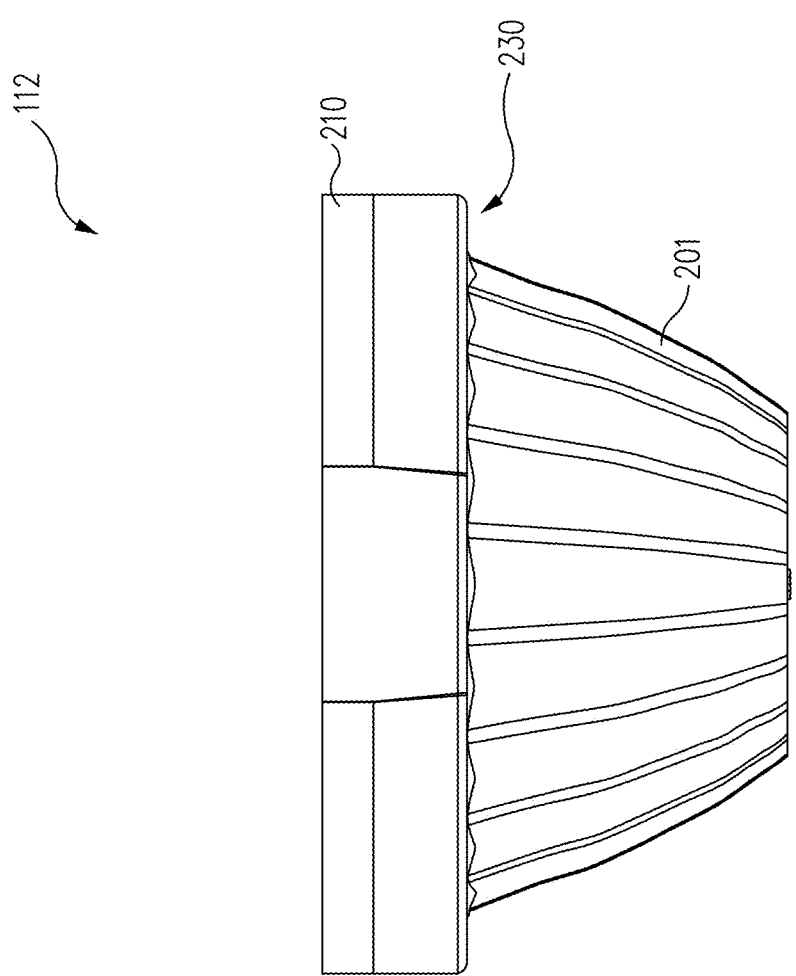
FIG. 2F illustrates a side view of the reflective element of FIG. 2A in accordance with an embodiment of the disclosure.

In the view of FIG. 2D, reflector 112 is shown rotated with respect to the view of FIG. 2C to show a rear side perspective view showing rear surface 222, external surface 201, flat portion 212 of lip 210, surface 220, and some of facets 208 visible through opening 202. FIG. 2E is a face-on view of reflector 112 showing the regular polygonal shape of openings 202 and 204. FIG. 2F is a side view of reflector 112 showing how lip 210 may include an overhang 230 and external surface 201 may have a curved and undulating faceted shape that mirrors the shape of internal surface 200. However, this is merely illustrative. External surface 201 may have any suitable shape that allows mounting of reflector 112 and light source 126 with light source 126 configured to provide light within cavity 206.

Figure 3A:
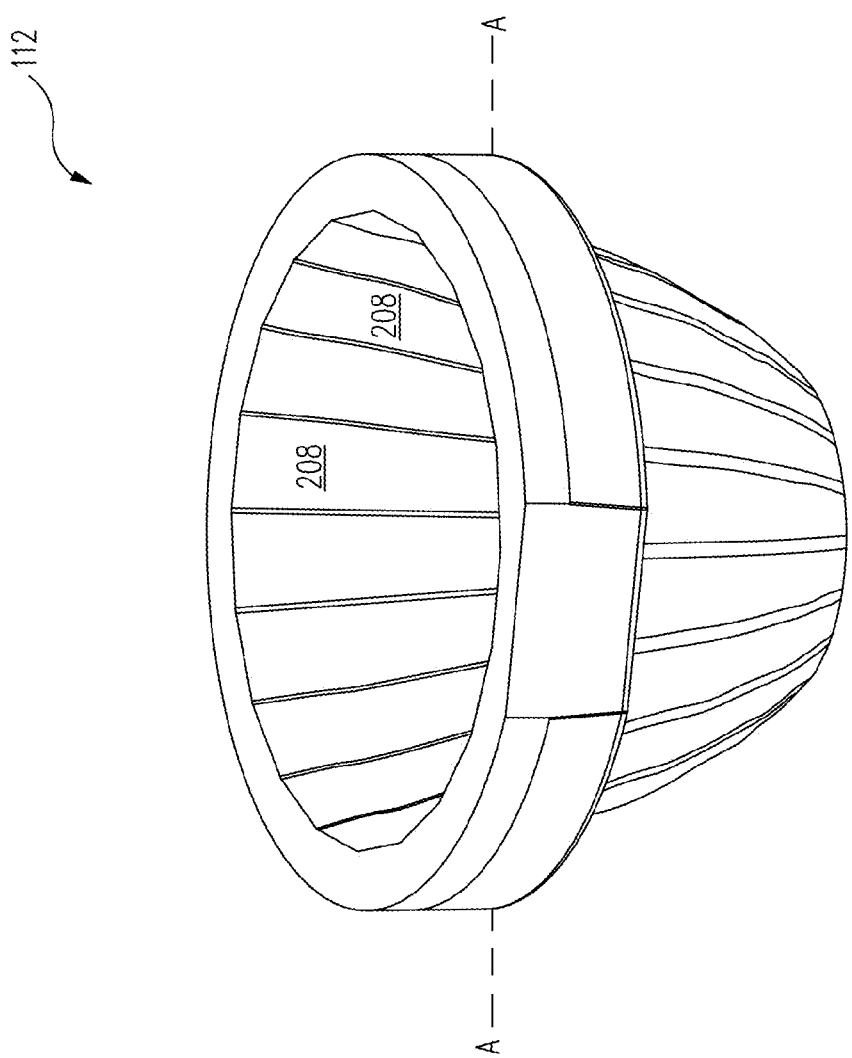
FIG. 3A illustrates a top front perspective view of the reflective element of FIG. 2A in accordance with an embodiment of the disclosure.
Figure 3B:
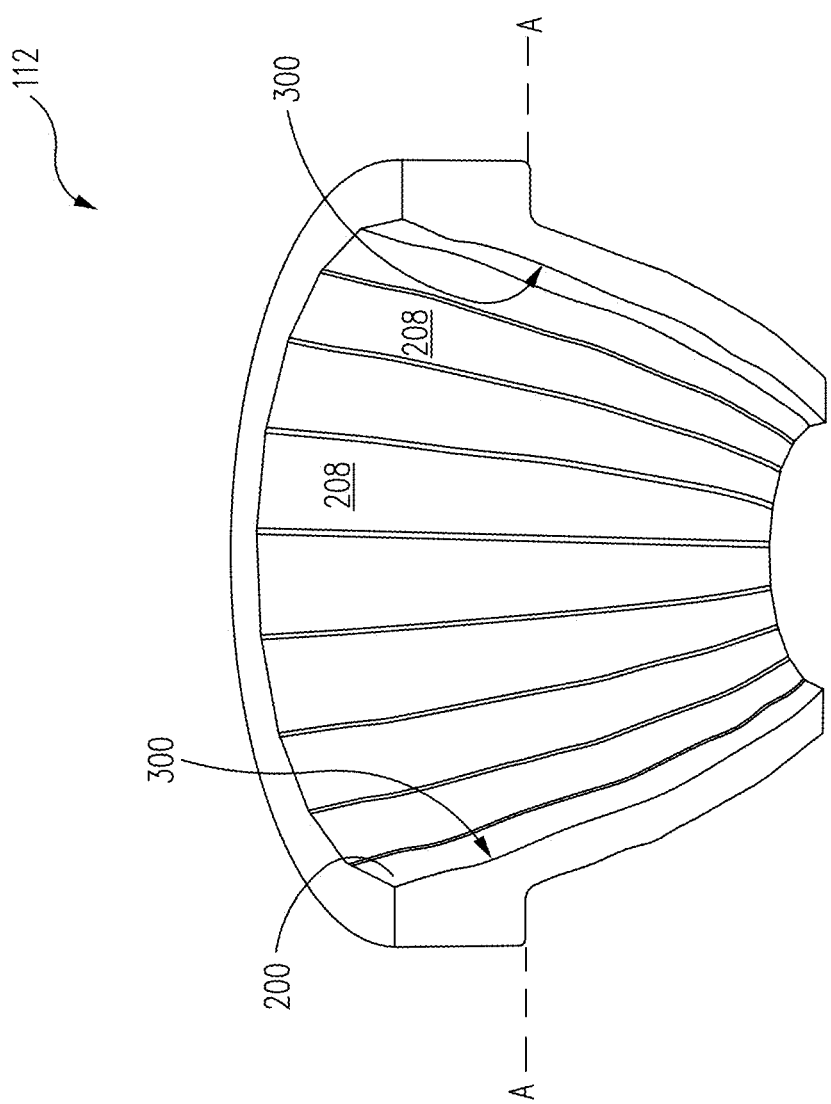
FIG. 3B illustrates a cross-sectional view of the top front perspective view of FIG. 3A in accordance with an embodiment of the disclosure.

FIGS. 3A and 3B respectively show perspective and cross-sectional perspective views of reflector 112 according to an embodiment. FIG. 3B shows a cross-sectional view of reflector 112 with the cross section taken long line A-A of FIG. 3A. In the cross-sectional view of reflector 112 in FIG. 3B, undulations 300 are visible on internal surface 200. As shown, undulations 300 may be longitudinal undulations along each facet 208 or, in other embodiments, undulations such as undulations 300 may be longitudinal undulations along an internal surface of a non-faceted non-paraboloidal reflective element. Undulations 300 may include regular undulations and/or irregular undulations and may be smoothly continuous undulations running from opening 202 to opening 204 along each facet 208 or, in other embodiments, along an internal surface of a non-faceted non-paraboloidal reflective element.

Undulations 300 and facets 208 may cooperate to reflect light from light source 126 to form a light beam for lighting device 100 having a desired shape as described in further detail hereinafter.

Opening 204 may be relatively larger than opening 202. As shown in FIG. 2C, opening 202 may have a width WR that defines a rear hole size for the reflector. Width WR may, for example, be between 3 millimeters (mm) and 5 mm, between 1 mm and 10mm, between 3.5 mm and 4.5 mm, less than 5 mm, less than 10 mm, greater than 1 mm or greater than 3 mm. As shown in FIG. 2E, opening 204 may have a width WF. Width WF, as measured between two parallel opposing sides of opening 204 may define a clear-aperture width of reflector 112. Width WF may, for example, be between 9 mm and 11 mm, between 5 mm and 15 mm, between 9.5 mm and 10.5 mm, less than 15 mm, less than 20 mm, greater than 1 mm or greater than 5 mm.

As shown, undulations 300 may be wavelike surface variations that run longitudinally between opening 202 and opening 204. In other embodiments, undulations 300 may be formed on only a portion of internal surface 200 and other portions of internal surface 200 may be smooth. Internal surface 200 may be substantially free of texturing structures such as texturing features and texturing material.

Figure 4A:
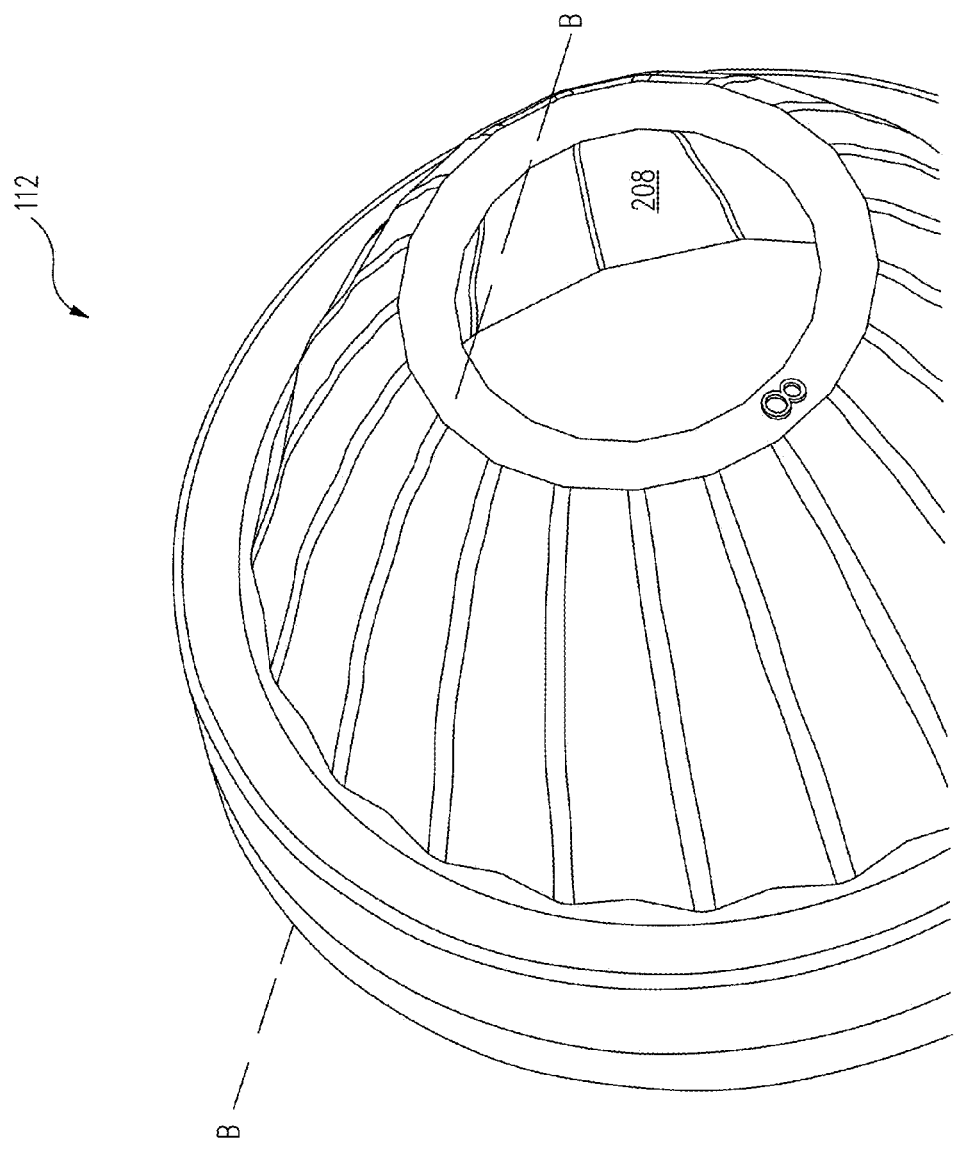
FIG. 4A illustrates a side rear perspective view of the reflective element of FIG. 2A in accordance with an embodiment of the disclosure.
Figure 4B:
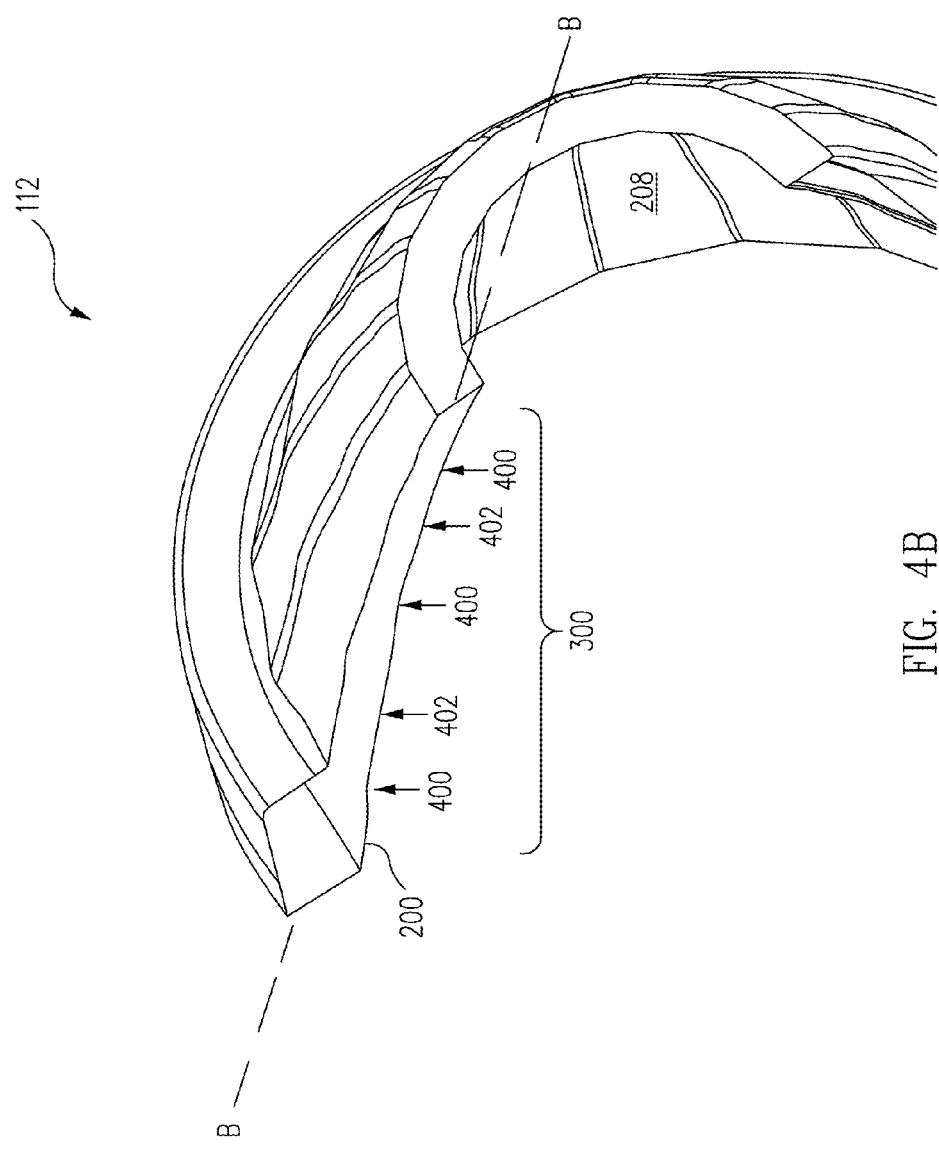
FIG. 4B illustrates a cross-sectional view of the side rear perspective view of FIG. 4A in accordance with an embodiment of the disclosure.

FIGS. 4A and 4B respectively show additional perspective and cross-sectional perspective views of reflector 112 according to an embodiment. FIG. 4B shows a cross-sectional view of reflector 112 with the cross section taken long line B-B of FIG. 4A. The cross-sectional view of reflector 112 in FIG. 4B shows how undulations 300 may be formed from alternating concave portions 400 and convex portions 402 of internal surface 200. Concave portions 400 and convex portions 402 may be smoothly joined together to form the undulations 300 on internal surface 200.

Internal surface 200 may have a shape that is relatively narrower than a paraboloid having an aperture of the same size. As discussed above in connection with FIGS. 2A-2F, the aperture of reflector 112 may be defined by opening 204.

Figure 5:
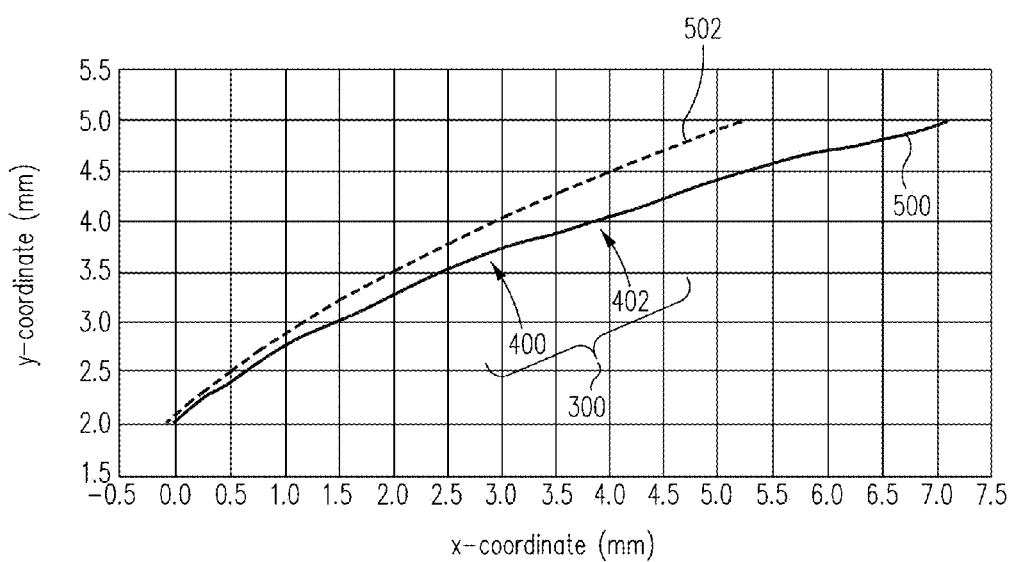
FIG. 5 is a diagram showing as a solid curve a shape profile of an internal surface of a non-paraboloidal reflective element having longitudinal undulations in comparison with the shape profile of a paraboloidal reflective element having the same rear hole size and exit-pupil size as the non-paraboloidal reflective element in accordance with an embodiment of the disclosure.

FIG. 5 is a graph showing the shape profile 500 of the internal surface 200 of reflector 112 in a plane that passes through the symmetry axis of surface 200. For example, the plane may pass through the optical axis of the reflector and the center of a facet 208 in an exemplary implementation in which the aperture width of reflector 112 (e.g., the width WF of FIG. 2E) is 10 mm and the width of rear opening 202 is 4 mm. For comparison, FIG. 5 also includes dashed curve 502 showing the shape profile of a 10-mm-diameter paraboloidal reflector having a 1-mm focal length and a 4-mm-diameter central hole.

As can be seen in FIG. 5, the shape profile 500 of internal surface 200 of reflector 112 includes smooth longitudinal undulations 300 formed from alternating concave portions 400 and convex portions 402. These undulations, in combination with the facets 208 in some embodiments, provide the desired intensity levels of the light beam generated by lighting device 100 at different angles off axis from the optical axis of lighting device 100. In addition, the undulations and facets smooth the output beam, eliminating spatial beam structure that would otherwise be produced by a reflector, such as an untextured paraboloid, that forms far-field images of structure present in the light source. As shown in FIG. 5, shape profile 500, is non-paraboloidal with or without the undulations 300.

It can also be seen in FIG. 5 that the beam-shaping reflector 112 may be substantially longer than a paraboloidal reflector having the same aperture size (e.g., an aperture size of 10 mm). This has the desirable effect of reducing the angular extent of the surround beam of the generated light beam, allowing more light to be sent to angular regions in mid-range off-axis angles closer to the center of the beam, where it can be of greater benefit to a typical user.

Figure 6:
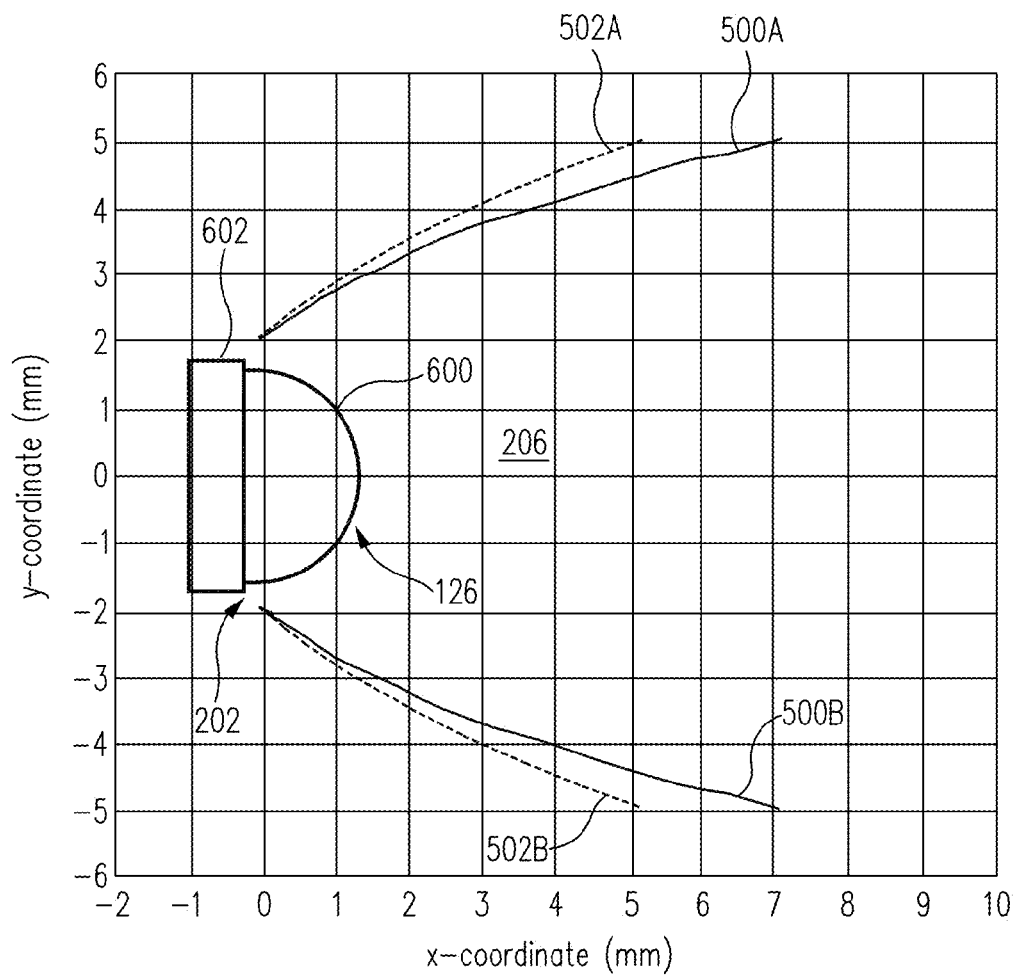
FIG. 6 is a diagram showing as solid curves a shape profile of an internal surface of two opposing sides of an internal surface of a non-paraboloidal reflective element each having longitudinal undulations in comparison with the shape profile of two opposing surfaces of a paraboloidal reflective element having the same rear hole size and exit-pupil size as the non-paraboloidal reflective element in accordance with an embodiment of the disclosure.

FIG. 6 is a graph showing the shape profiles 500A and 500B of two opposing sides of the internal surface of reflector 112 in a plane that passes through both the symmetry axis of reflector 112 and, for example, the center of the facets 208 in an exemplary implementation in which the aperture width of reflector 112 (e.g., the width WF of FIG. 2E) is 10 mm and the width of rear opening 202 is 4 mm. For comparison, FIG. 6 also includes dashed curves 502A and 502B showing the shape profiles of two opposing sides of a 10-mm-diameter paraboloidal reflector having a 1-mm focal length and a 4-mm-diameter central hole. In the graph of FIG. 6 the cross-sectional shapes of the encapsulant dome 600 and base 602 of an exemplary light source 126 (e.g., a Cree XP-G2 LED light source) mounted in opening 202 are also shown. As shown in FIG. 6, base 602 may be disposed behind reflector 112 and encapsulant dome 600 may extend through opening 202 and into cavity 206 of reflector 112 so that light generated by an LED (not shown) in encapsulant dome 600 can project light onto internal surface 200 of reflector 112 to generate a desired light beam.

Figure 7:
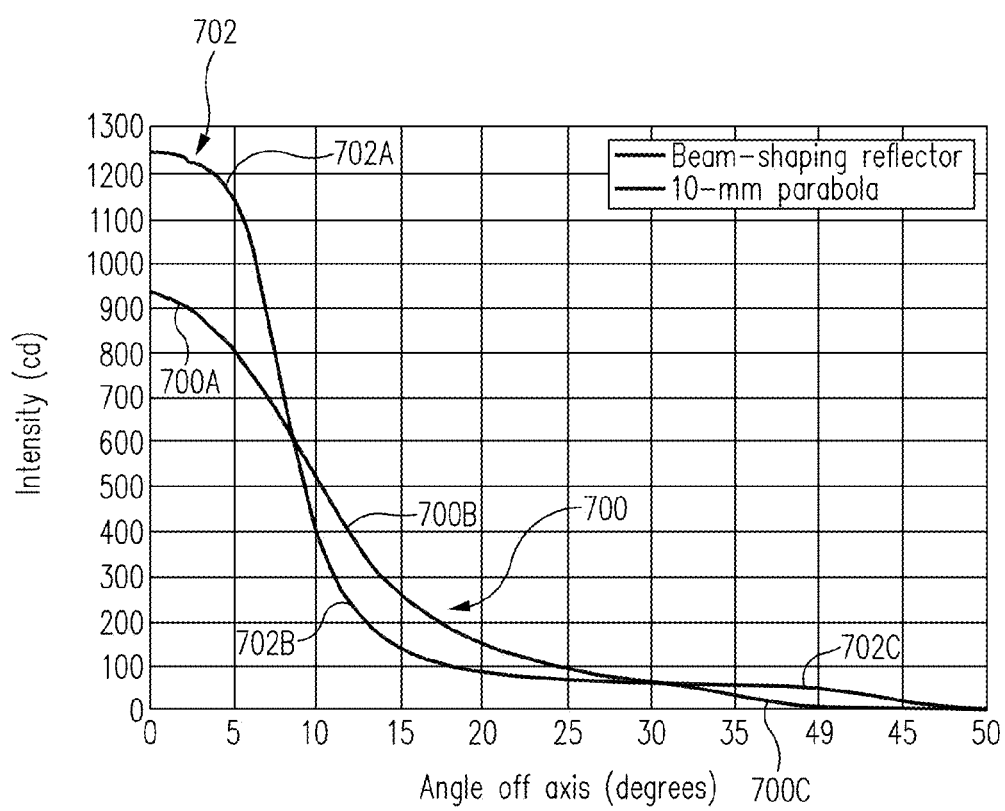
FIG. 7 is a graph showing the beam shape of a light beam generated by a monolithic faceted reflector having undulations in comparison with the beam shape of a light beam generated by a paraboloidal reflector having a common aperture size and hole size, where the same light source is used in each reflector in accordance with an embodiment of the disclosure.

FIG. 7 shows a graph of the far-field output intensity 700 as a function of angle off axis for the beam-shaping reflector 112. For comparison, the far-field output intensity 702 as a function of angle off axis generated by a 1-min-focal-length, 10-mm-diameter paraboloidal reflector using the same light source is also shown. The exemplary intensity distributions of FIG. 7 may be generated using an XP-G2 LED light source operating at 200 lm. Although the paraboloidal reflector provides higher intensity 702A between 0 and 8 degrees off axis than the intensity 700A of the beam shaping reflector 112 in the same angular region, the beam-shaping reflector 112 provides a significantly less spiky beam, with higher intensity 700B in the especially desirable angular zone between 8 degrees and 30.5 degrees off axis than the intensity 702B of the paraboloidal reflector. In addition, the beam-shaping reflector 112 intensity 700C cuts off at about 40 degrees off axis, compared with 50 degrees for the paraboloidal reflector intensity 702C in the same angular region. Thus, the beam-shaping reflector 112 transfers more flux to angles below 40 degrees than a paraboloidal reflector of the same aperture size, which may be more useful to a typical user.

Figure 8A:
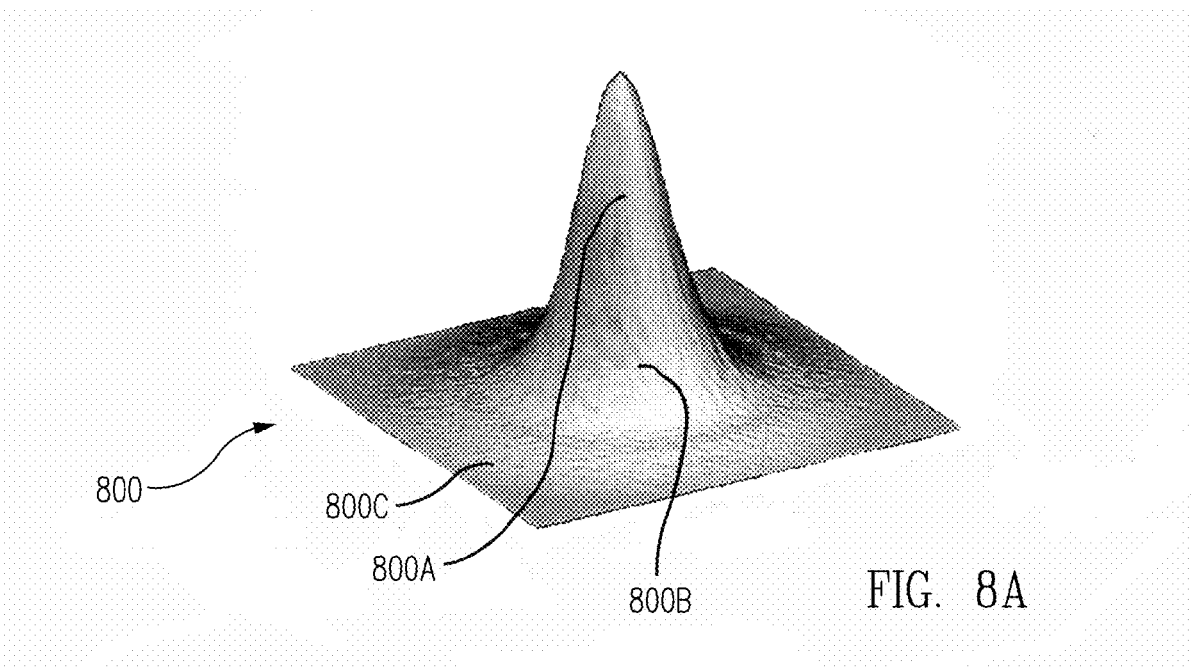
FIGS. 8A and 8B show three-dimensional beam profiles corresponding respectively to the beam-shaping reflector and paraboloidal reflector beam shapes shown in FIG. 7 in accordance with an embodiment of the disclosure.
Figure 8B:
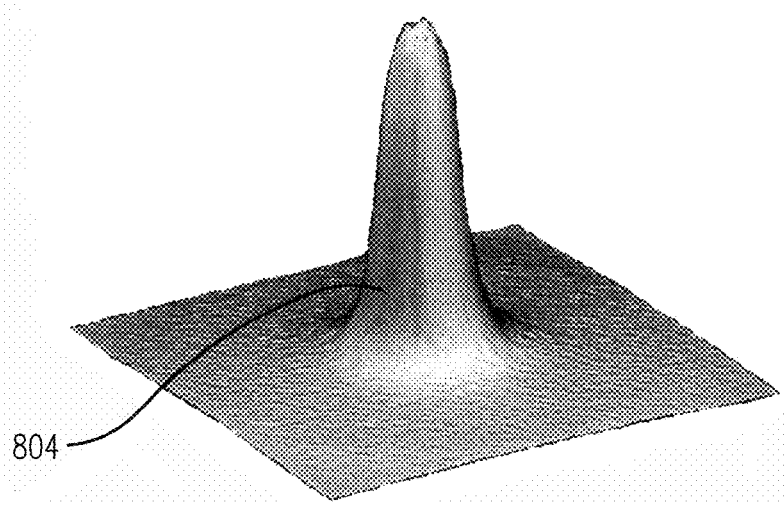
Figure 9A:
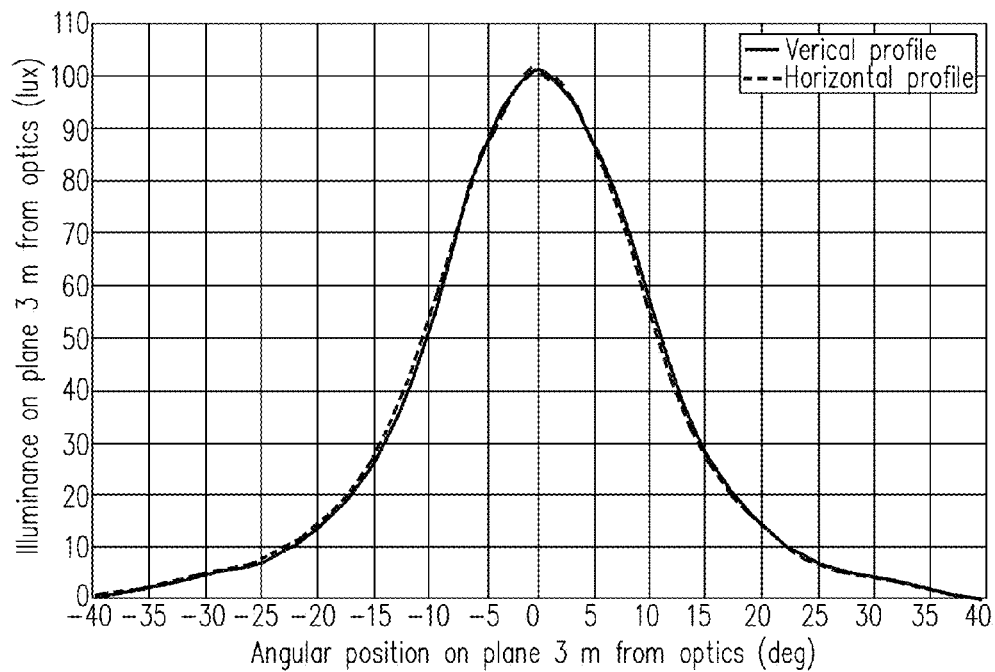
FIGS. 9A and 9B are graphs showing cross sections respectively of the beam profiles shown in FIGS. 8A and 8B in accordance with an embodiment of the disclosure.
Figure 9B:
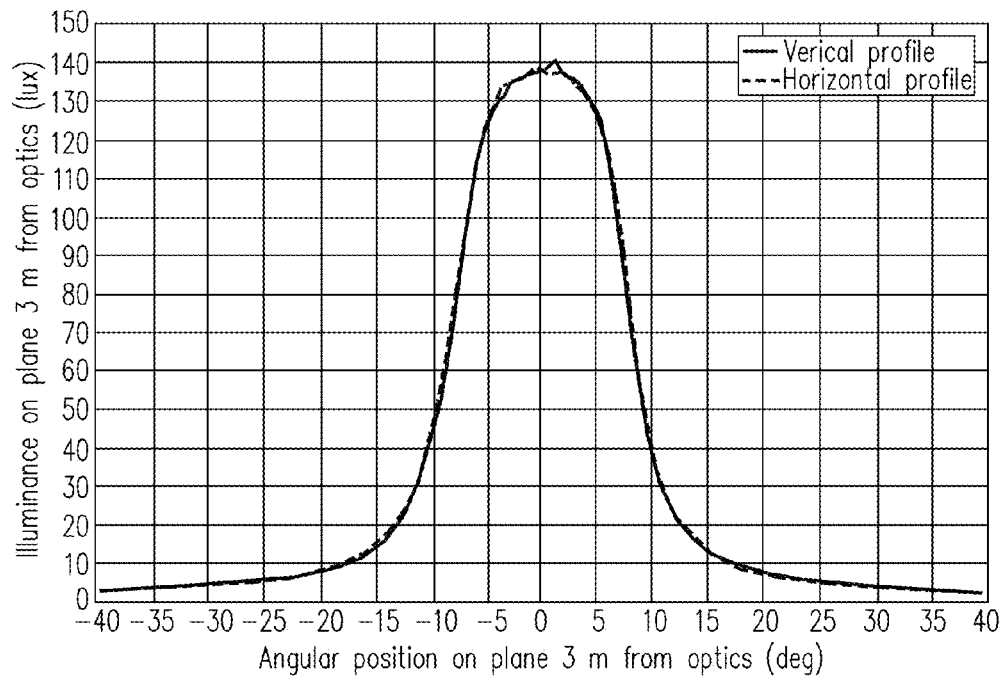

Surface plots of the illuminance distributions produced respectively by reflector 112 and a paraboloidal reflector having the same aperture size on a plane 3 m from their exit pupils are shown respectively in FIGS. 8A and 8B, with the corresponding horizontal and vertical illuminance profiles provided respectively in FIGS. 9A and 9B. Significant levels of high-spatial-frequency structure can be seen near the center of the beam profile 804 produced by the paraboloidal reflector in FIGS. 8B and 9B. This is due to imaging of spatial structures in the LED source, and would likely require surface texturing or a refractive diffuser to eliminate which can undesirably increase the cost and production complexity along with undesirably adding weight and size. Since this structure is not observed in the output beam 800 of the beam-shaping reflector 112, lighting device 100 can be provided without texturing on the reflector surface and without a refractive diffuser to produce a smooth output beam.

As shown in FIG. 8A, beam 800 may include portions 800A, 800B, and 800C corresponding to portions 700A, 700B, and 700C of the intensity distribution 700 of FIG. 7 that are respectively relatively fainter, brighter, and fainter than the corresponding portions of the beam generated by a paraboloidal reflector. Using a lighting device such as lighting device 100 having a beam-shaping reflector 112, a user may therefore be a able to light a scene by illuminating, with a light beam generated by a light source and a monolithic reflective optical element with an aperture size, a first portion of a scene (e.g., portion 800A) with a first brightness (e.g., brightness 700A) that is less than a brightness (e.g., brightness 702A) of a light beam of a paraboloidal reflector with the same aperture size and hole size, and using the same light source, illuminating a second portion of the scene (e.g., portion 800B) with a second brightness (e.g., brightness 700B) that is greater than the brightness (e.g., 702B) of the light beam of the paraboloidal reflector with the same aperture size and hole size, and using the same light source, and illuminating a third portion of the scene (e.g., portion 800C) with a third brightness (e.g., brightness 700C) that is less than the brightness (e.g., brightness 702C) of the light beam of the paraboloidal reflector with the same aperture size and hole size, and using the same light source, in which the second portion 800B surrounds the first portion 800A and the third portion 800C surrounds the second portion 800B.

Figure 10:
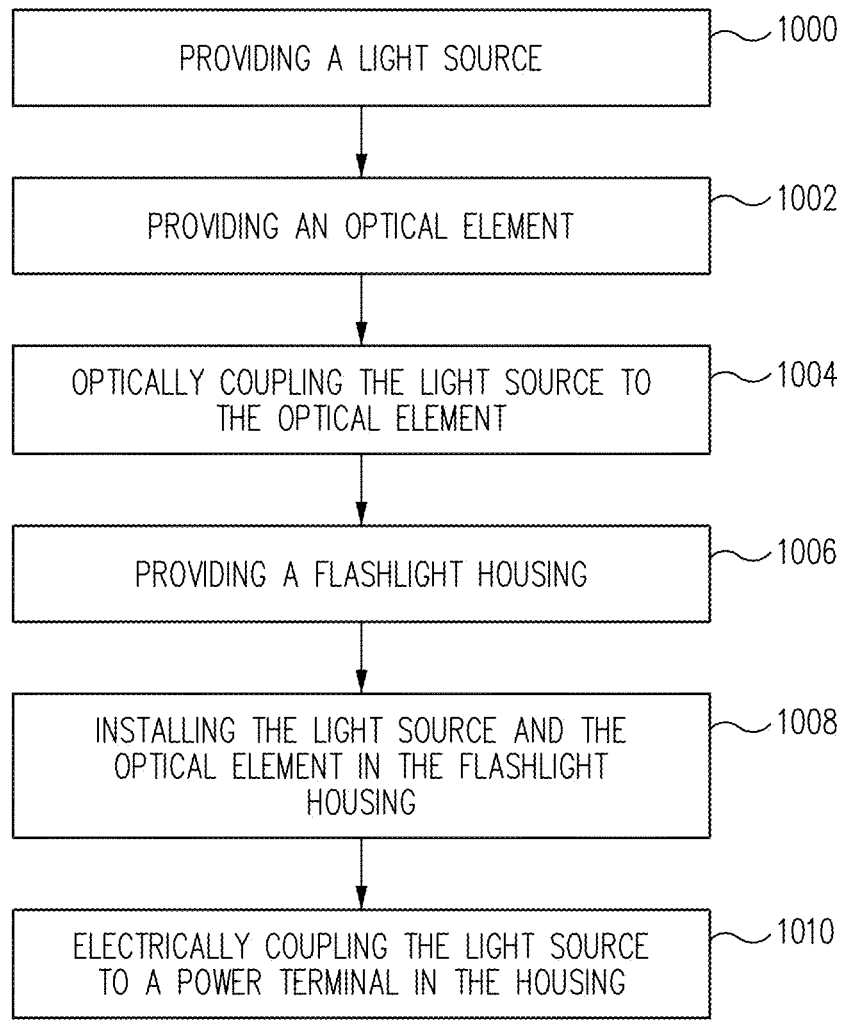
FIG. 10 is a flow chart illustrating a process of making a lighting device in accordance with an embodiment of the disclosure.

FIG. 10 is a flow chart illustrating a process of making lighting device 100 in accordance with an embodiment of the disclosure.

At block 1000, a light source such as light source 126 of FIG. 1 may be provided. The light source may, for example, be a light-emitting-diode (LED) light source. The light source may be mounted to a lighting stack such as lighting stack 124 that includes support structures, conductive interconnection structures, control circuitry such as one or more printed circuit boards and/or other components for operating the light source.

At block 1002, an optical element may be provided. In one embodiment, the optical element may be a monolithic, non-paraboloidal reflector such as reflector 112 having an internal surface; a cavity defined by the internal surface; a first opening at a first end; a second opening at an opposing second end that defines an aperture having the aperture size; longitudinal undulations that extend continuously and longitudinally from the first opening to the second opening; and in which the aperture, the non-paraboloidal surface, and the longitudinal undulations are configured to cooperate to form the light beam. In another embodiment, the internal surface of the reflector may be faceted. For example, the optical element may be a monolithic, non-paraboloidal reflector such as reflector 112 having an internal surface; a cavity defined by the internal surface; a first opening at a first end; a second opening at an opposing second end that defines an aperture having the aperture size; a plurality of facets on the internal surface that each extend continuously and longitudinally from the first opening to the second opening; in which each of the plurality of facets has a surface that forms a portion of the internal surface; in which the surface of each of the plurality of facets includes longitudinal undulations; and in which the plurality of facets, the aperture, and the longitudinal undulations are configured to cooperate to form the light beam.

At block 1004, the light source may be coupled to the optical element. Coupling the light source to the optical element may include inserting some or all of the light source through the first opening in the reflector and at least partially into the cavity so that, when operated, the light source illuminates the internal surface of the optical element. Coupling the light source to the optical element may include inserting the optical element and the light source into an internal support structure for the lighting device.

At block 1006, a housing such as a flashlight housing may be provided. The housing may, for example, include a front housing portion and a rear housing portion.

At block 1008, the light source and the optical element may be installed into the flashlight housing. The light source and the optical element may be installed into the flashlight housing before or after coupling the light source to the optical element.

At block 1010, the light source may be electrically coupled to a power terminal in the housing. The power terminal may be a terminal of a power source itself such as a battery terminal or may be conductive structure coupled between the light source and the power source.

Figure 11:
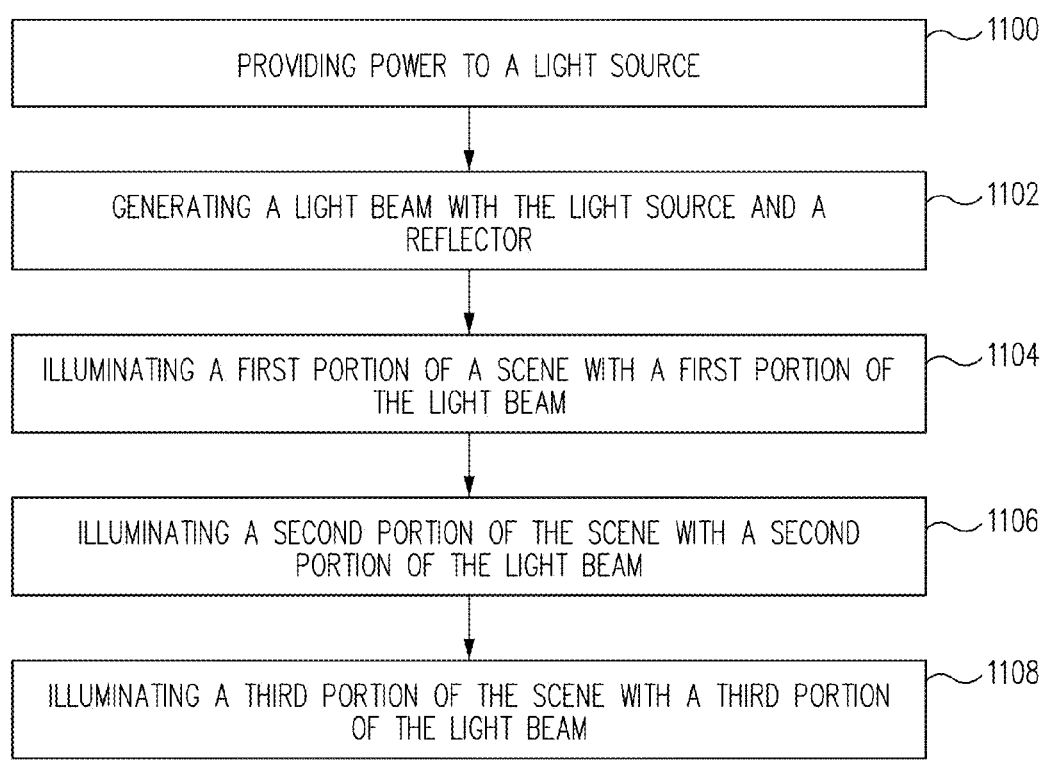
FIG. 11 is a flow chart illustrating a process of illuminating a scene using a lighting device in accordance with an embodiment of the disclosure.

FIG. 11 is a flow chart illustrating a process of illuminating a scene such as an area of interest using lighting device 100 in accordance with an embodiment of the disclosure.

At block 1100, power may be provided to a light source. The light source may be a light source such as light source 126 in a lighting device such as lighting device 100. The power may be provided from a power source such as a battery. The power may be provided when a user turns on the lighting device (e.g., by pushing a power button, twisting a portion of the lighting device, moving a switch, or the like).

At block 1102, a light beam may be generated with the light source and a reflector. The light beam may be generated by emitting light from the light source onto an internal reflective surface that is faceted or non-faceted and includes longitudinal undulations running between a rear end of the reflector and a front end of the reflector. The light source may be disposed within a cavity defined by the internal surface. The reflector may be a monolithic, non-paraboloidal, reflector such as reflector 112 as described herein according to various embodiments. The reflector may have an opening that defines an aperture of the reflector. The opening may be a polygonal opening of a faceted reflector or a circular opening in the case of a non-faceted reflector. The aperture may have an aperture size.

At block 1104, a first portion of a scene may be illuminated with a first portion of the light beam generated by the light source and the reflector with an aperture size. The first portion of the scene may be illuminated with a first brightness that is less than a brightness of a light beam, in the first portion, produced by a paraboloidal reflector with the same hole size, aperture size, and light source. The first portion may, for example, be a region within an angle 8 degrees from the optical axis of the reflector.

At block 1106, a second portion of the scene may be illuminated with a second portion of the light beam generated by the light source and the reflector with the aperture size. The second portion of the scene may be illuminated with a second brightness that is greater than a brightness, in the second portion, of a light beam of a paraboloidal reflector with the same hole size, aperture size and light source. The second portion may, for example, be a region within a range of angles of 8 degrees and 30.5 degrees from the optical axis of the reflector.

At block 1108, a third portion of the scene may be illuminated with a third portion of the light beam generated by the light source and the reflector with the aperture size. The third portion of the scene may be illuminated with a third brightness that is less than a brightness, in the third portion, of a light beam of a paraboloidal reflector with the same aperture size and the same light source. The third region may, for example, be a region at angles greater than 30.5 degrees from the optical axis of the reflector.

Figure 12A:
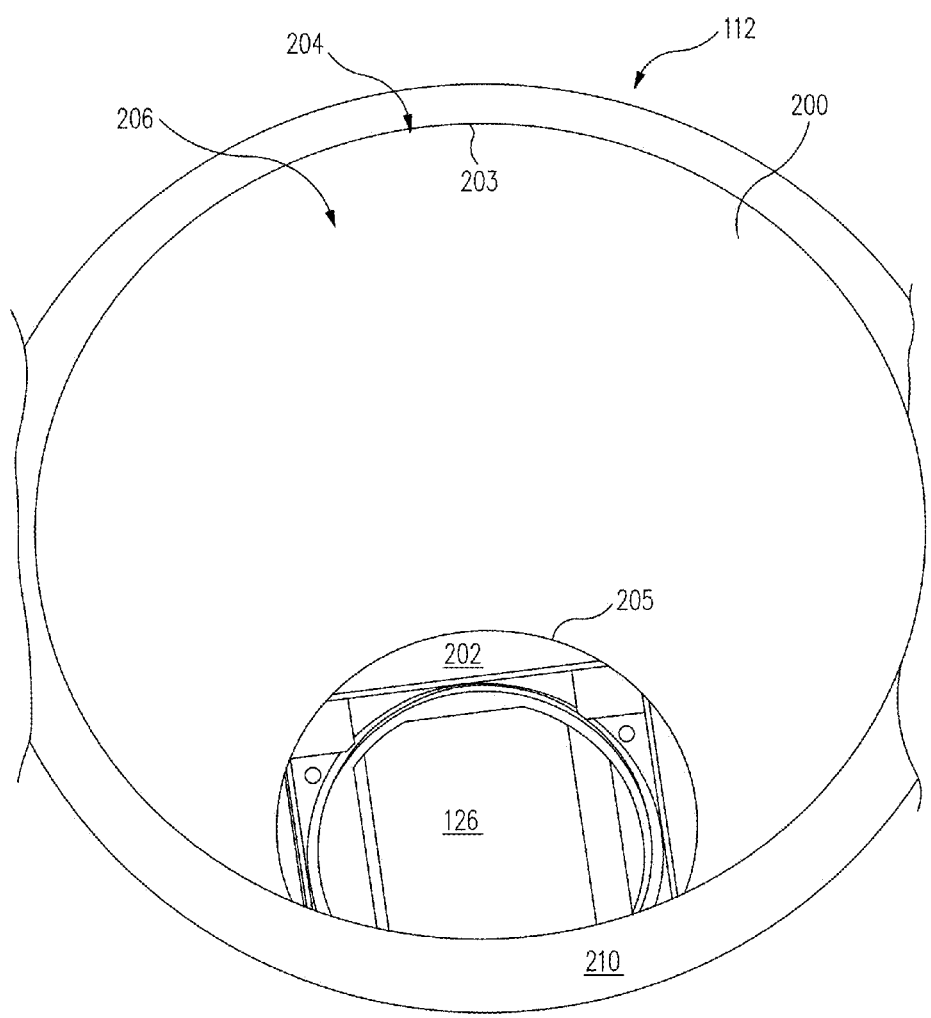
FIGS. 12A and 12B illustrate perspective and cross-sectional views of a reflector implemented without facets in accordance with an embodiment of the disclosure.
Figure 12B:
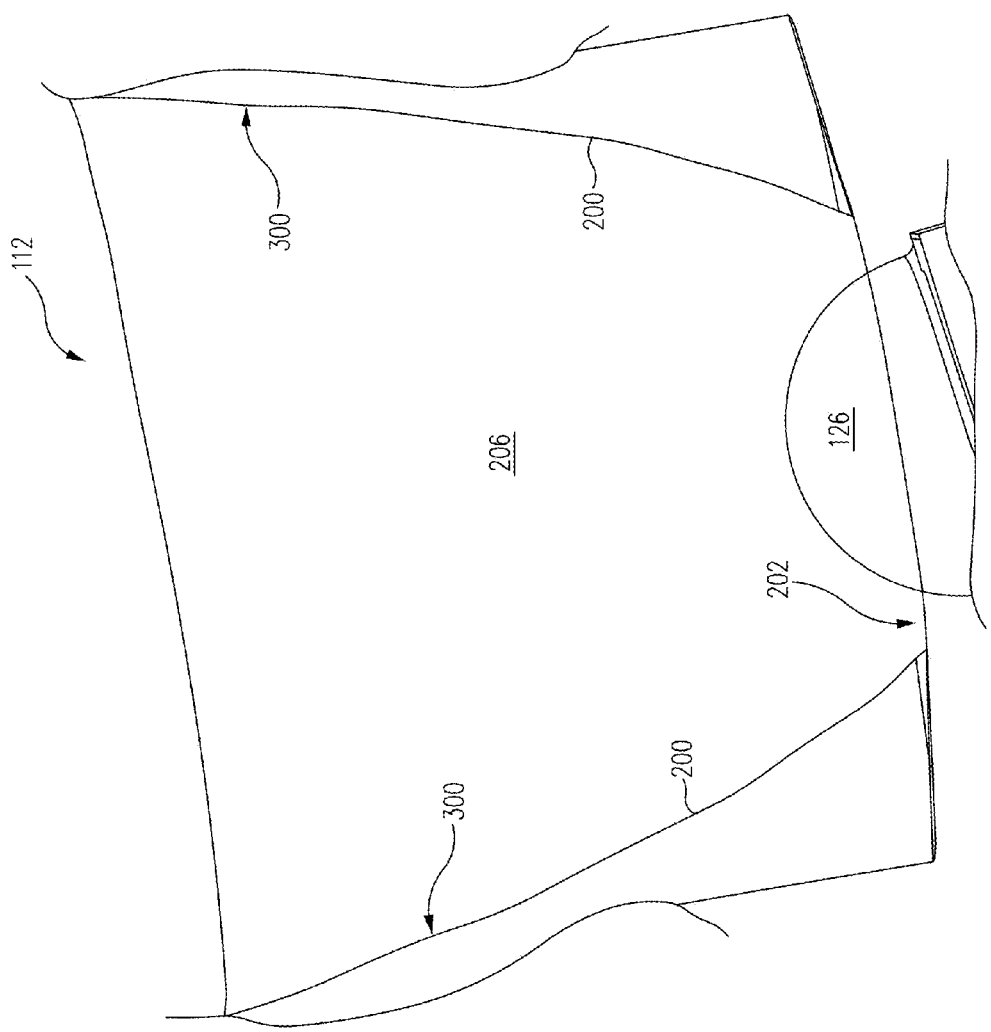

Various views of a reflector 112 implemented without facets are shown in FIGS. 12A and 12B. For example, a top side perspective view of reflector 112 having an internal surface 200 that is non-paraboloidal and non-faceted is shown in FIG. 12A according to an embodiment. As shown in FIG. 12A, reflector 112 may have an internal surface 200 that extends from first opening 202 at a rearward end of reflector 112 to a second opening 204 at a forward end of reflector 112 such that the internal surface 200 defines a cavity 206. Rear opening 202 may be defined by an edge 205. Opening 204 may be defined by an edge 203.

Internal surface 200 may be a reflective surface that, when illuminated by light source 126, generates a light beam. Internal surface 200 may be free of facets and may include longitudinal undulations (not visible in the perspective view of FIG. 12A, see FIG. 12B) that extend from opening 202 to opening 204. The longitudinal undulations may run between opening 202 and opening 204. As shown, reflector 112 may include a lip 210 at the forward end that runs around the periphery of the forward end. Lip 210 may provide a structure for mounting and positioning reflector 112 into lighting device 100.

In the embodiment shown in FIG. 12A, edges 205 and 203 each define a circular hole (e.g., openings 202 and 204) at each end of reflector 112. In the view of FIG. 12B, reflector 112 is shown rotated with respect to the view of FIG. 12A and shown in cross-section so that undulations 300 on the non-faceted internal reflective surface are visible. As shown in FIG. 12B, light source 126 may extend at least partially through opening 202 and into cavity 206 so that light source 126 can emit light onto internal surface 200 to generate a desired light beam.

As shown in FIG. 12B, undulations 300 may be longitudinal undulations. Undulations 300 may include regular undulations and/or irregular undulations and may be smoothly continuous undulations running from opening 202 to opening 204. Undulations 300 may cooperate with the non-paraboloidal shape of surface 200 to reflect light from light source 126 to form a light beam for lighting device 100 having a desired shape as described herein.

Because internal surface 200 in the embodiments shown in FIGS. 12A and 12B is non-faceted, internal surface 200 in these embodiments has axial symmetry of approximately infinite order about the symmetry axis of surface 200. Internal surface 200 in the embodiments of FIGS. 12A and 12B may have a shape profile in any plane containing the surface's symmetry axis that exhibits longitudinal undulations as described, for example, in FIGS. 5 and 6 in the context of a faceted internal surface.

As shown in FIG. 12B, reflector 112 may, in some embodiments, be mounted at an angle with respect to light source 126 (e.g., to direct the generated light beam in a particular desired direction). However, this is merely illustrative. In various embodiments, a non-parabolic undulating reflector with or without facets may be mounted in alignment with a light source disposed at least partially within its cavity or may be mounted an angle with respect to the light source.

Figure 13A:
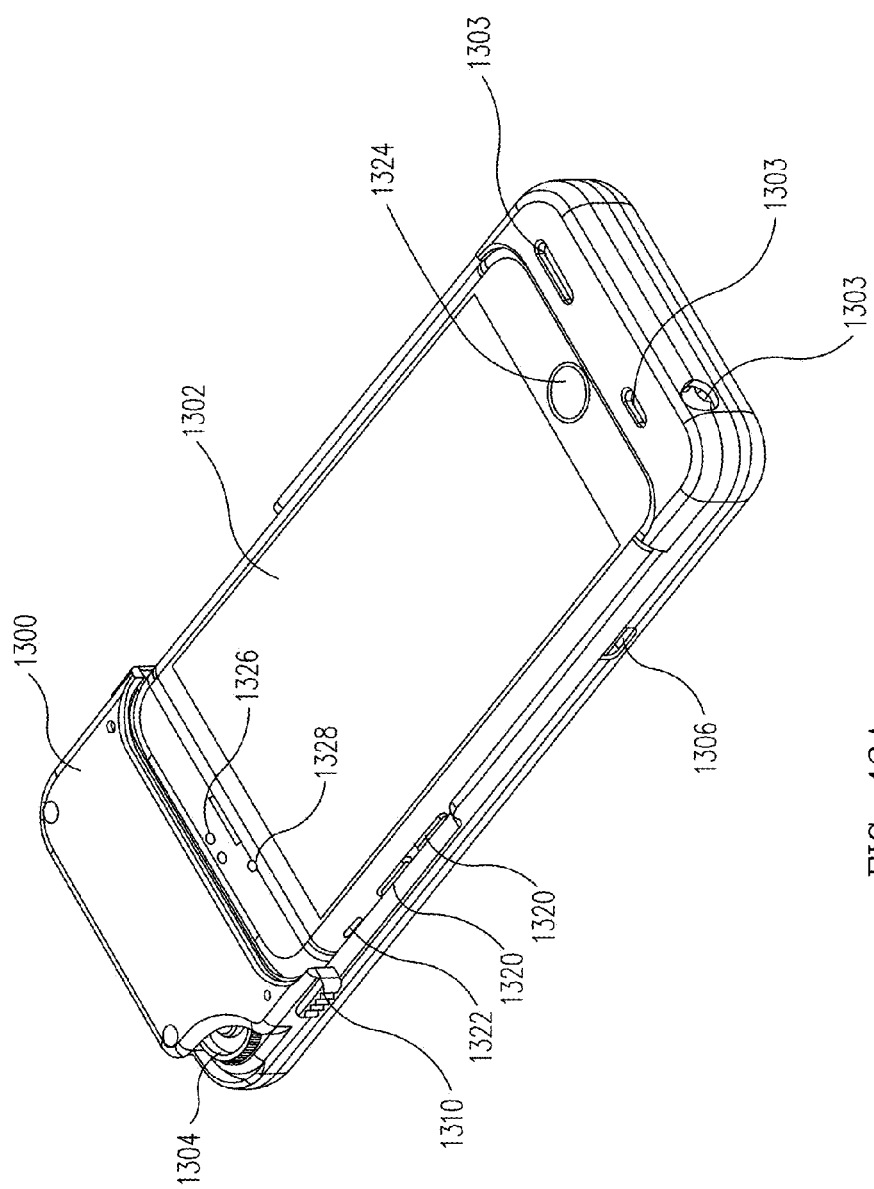
FIG. 13A illustrates a front perspective view of a lighting device attachment attached to mobile device in accordance with an embodiment of the disclosure.
Figure 13B:
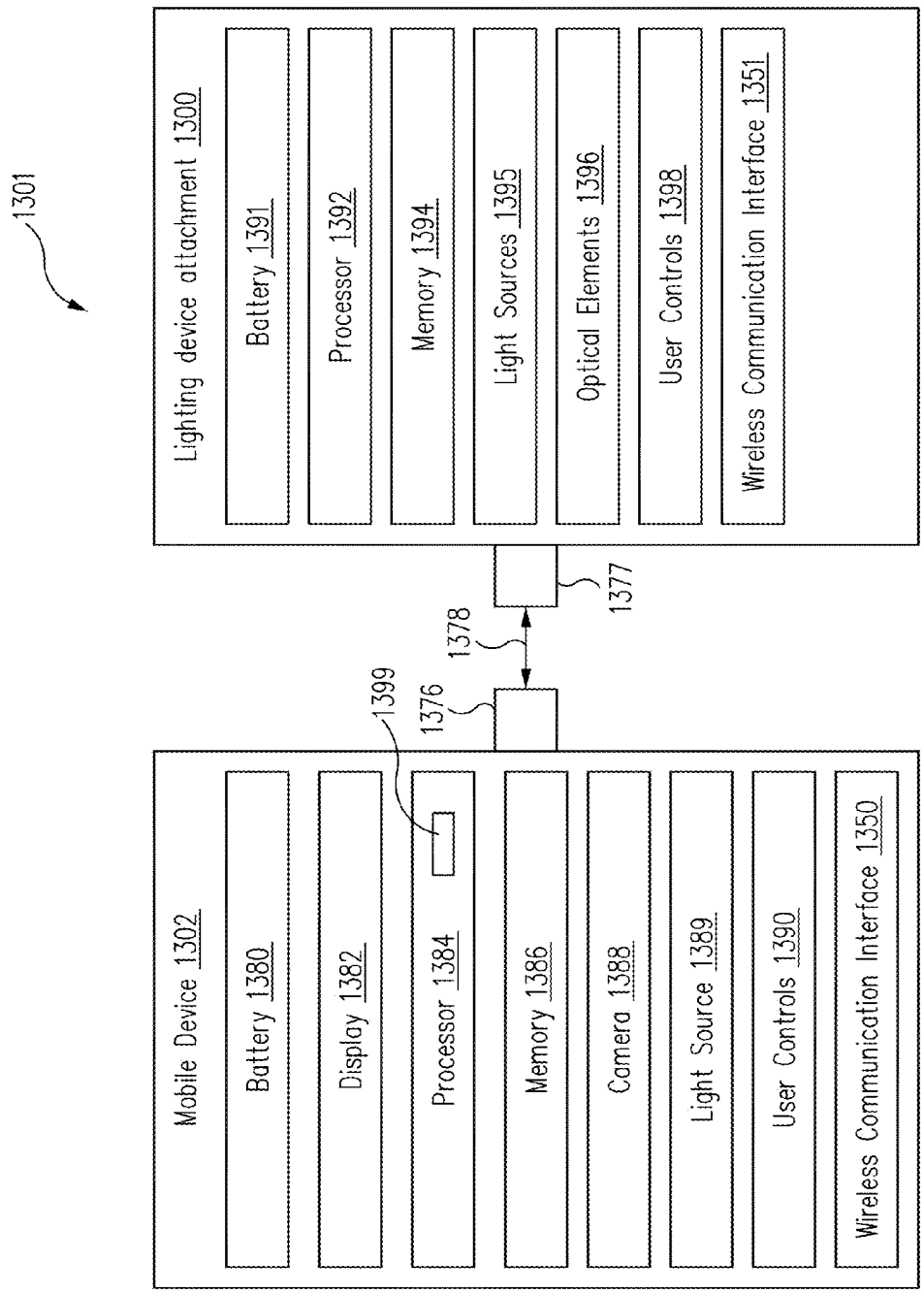
FIG. 13B illustrates a block diagram of a system that includes a lighting device attachment and a mobile device in accordance with an embodiment of the disclosure.

Although various embodiments described in connection with FIGS. 1A-12B have been described using the example of a lighting device implemented as a flashlight, this is merely illustrative and a reflector such as reflector 112 may be implemented in any suitable lighting device including, for example, a lighting device attachment configured to be attached to and provide enhanced lighting capabilities for another device such as mobile electronic device (e.g., to provide lighting up to or in excess of 1000-1200 Lumens). In various embodiments, such a lighting device attachment may incorporate two or more light sources, each paired with its own reflector so that the light sources of the lighting device attachment can be operated to function either as a flashlight or as an illuminator for low light videography and still photography, when used in conjunction with a smartphone. FIGS. 13A and 13B show an example of a lighting device attachment in accordance with an embodiment.

As shown in FIG. 13A, a lighting device attachment such as lighting device attachment 1300 may be provided that receives another device such as mobile device 1302 (e.g., a mobile phone, smart phone, tablet, or other portable electronic device). As shown in FIG. 13A, the mobile device 1302 may be engaged within a cavity formed by a housing of mobile device attachment 1300. As shown, the housing of mobile device attachment 1300 may include an engagement mechanism 1310 and/or various features for accommodating corresponding components of the mobile device. For example, features such as cutaways, housing portion shapes and/or openings such as openings 1303 may be provided that, when mobile device 1302 is attached to lighting device attachment 1300, provide access to components such as speakers, headphone jacks, light sources 1326, cameras 1328, buttons 1320 and/or 1324, switches 1322, a display, and/or other components of the mobile device 1302. The various housing members may be formed from plastic, glass, metal, combinations thereof, or other suitable materials. Engagement mechanism 1310 may, for example, be a squeezable or compressible member that, when pressed and released, respectively releases and captures (e.g., secures) mobile device 1302 or vice versa.

As shown in the example of FIG. 13A, lighting device attachment 1300 may include input/output components such as a control device 1304 and a port 1306. For example, control device 1304 may be an external switch such as a rotary switch for activating (turning on), dimming, brightening, or deactivating (turning off) one or more light sources associated with lighting device attachment 1300. Port 1306 may, for example, be a universal serial bus (USB) port, a mini-USB port, a micro-USB port, a Portable Digital Media Interface (PDMI) port, a 30-pin connector port, a power port or other input/output port configured to receive a cable or other connector. Port 1306 may be coupled to internal electronic components of lighting device attachment 1300 such as one or more batteries, memories, printed circuits, processors, or other internal components. As examples, port 1306 may be used to transfer data such as control settings to and/or from lighting device attachment 1300 to provide power to one or more light sources within lighting device attachment 1300, and/or to charge a battery of lighting device attachment 1300. When a charging cable is connected between portion 1306 and another device such as a computer while the mobile device is installed in lighting device attachment 1300, the mobile device and the computer may be synchronized or synched. A battery disposed in lighting device attachment 1302 may be adapted to power the light source of the attachment and may be configured to be charged via an external port (e.g., port 1306) or the mobile device 1302, and the battery or the external port may be adapted to charge an additional battery disposed in the mobile device 1302.

FIG. 13B is a block diagram of a system 1301 that includes lighting device attachment 1300 and mobile device 1302. As shown in FIG. 13B, lighting device attachment 1300 may include a coupling member 1377 for coupling mobile device 1302 to lighting device attachment 1300. Coupling member 1377 may be a mechanical and/or electrical coupling member. In one embodiment, coupling member 1377 may be an external coupling member that is attached to an outer surface of the housing of lighting device attachment 1300 and that is configured to receive and mechanically secure mobile device 1302 to attachment 1300. In another embodiment, coupling member 1377 may be formed, in part by one or more portions of a housing of lighting device attachment 1300 that form a cavity in the housing for receiving the mobile device. Coupling member 1377 may also include an electrical connector (e.g., a connector disposed in the cavity in the housing).

Figure 14:
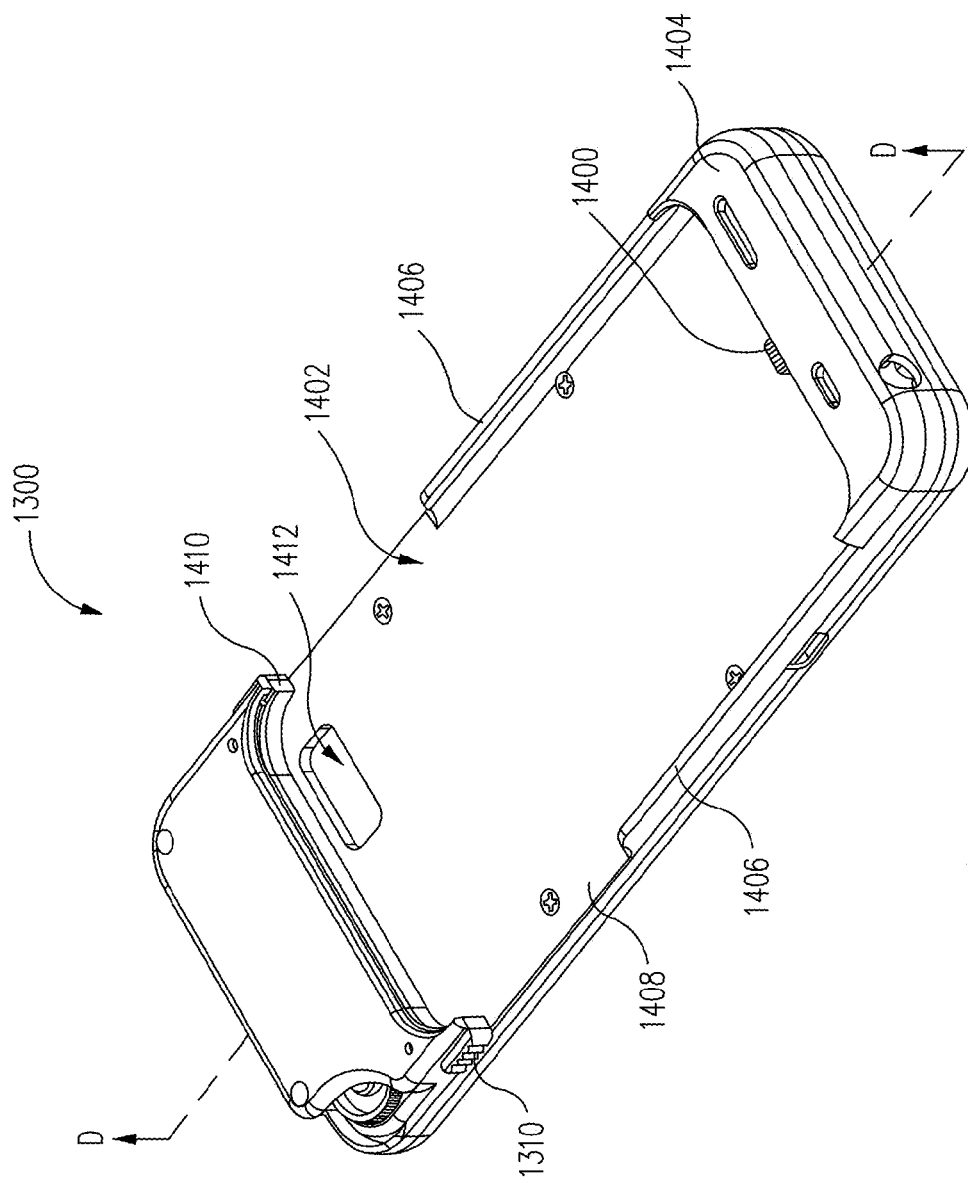
FIG. 14 illustrates a front perspective view of a lighting device attachment for attachment to mobile device in accordance with an embodiment of the disclosure.

For example, as shown in FIG. 14, which shows lighting device attachment 1300 with mobile device 1302 removed, lighting device attachment 1300 may include a connector 1400 disposed at least partially within a cavity 1402 configured to receive a mobile device. Connector 1400 may, for example, be a connector having circuitry meeting specifications associated with a particular brand or type of mobile device (e.g., a mobile device having an exterior shape corresponding to the shape of cavity 1402). For example, connector 1400 may extend from within a bottom front portion 1404 of the housing of lighting device attachment 1300 into cavity 1402 and may be a standard connector (e.g., a USB connector, a PDMI connector, or other standard connectors as provided in mobile devices) or may be a proprietary connector (e.g., an Apple® dock connector for iPod™, iPad™, and/or iPhone™ such as a "Lightning" connector or a 30-pin connector).

As shown in FIG. 14, cavity 1402 may be formed by bottom front housing member 1404, housing sidewalls 1406, a front surface 1408, and a top housing member 1410 such as a housing member coupled to engagement member 1310 so that, when a mobile device is inserted into cavity 1402, the mobile device is mechanically secured (e.g., by a press fit or by mechanical engagement) to lighting device attachment 1300. For example, a mobile device port at a bottom end of a mobile device may be placed onto connector 1400, engagement members 1310 on opposing sides of lighting device attachment 1300 may be squeezed simultaneously, the top portion of the mobile device may be lowered into cavity 1402, and the engagement members 1310 may be released to mechanically secure the mobile device to the lighting device attachment 1300.

As shown in FIG. 14, front surface 1408 may also include an opening such as an opening 1412. Opening 1412 may have a position, size, and shape for accommodating one or more optical elements of a mobile device such as a rear-facing camera and one or more light sources (e.g., so that the camera of the mobile device can view a scene through opening 1412 when the mobile device is attached to lighting device attachment 1300 as in FIG. 13A).

Referring again to FIG. 13B, mobile device 1302 may have a coupling member 1376 (e.g., a port such as a 30-pin connector port or a "Lightning" port) that mechanically and/or electrically couples to lighting device attachment 1300. In some embodiments, lighting device attachment 1300 may be communicatively separate from mobile device 1302 (e.g., mobile device 1302 may be attached to lighting device attachment 1300 and both device 1302 and lighting device attachment 1300 may be operated separately and independently without any electrical coupling between the two). In other embodiments, mobile device 1302 may send and/or receive electrical power and/or communications signals to and/or from lighting device attachment 1300 via coupling members 1376 and 1377 (e.g., as indicated by arrows 1378). In this respect, coupling member 1376 of mobile device 1302 may form a connector interface (e.g., a wired communication interface) including, for example, circuitry such as one or more processors, integrated circuits, ports, or other circuitry for managing communications with lighting device attachment 1300. Coupling member 1377 may foul). a connector interface (e.g., a wired communication interface) for lighting device attachment 1300 including circuitry configured to manage communications with mobile device 1302 and/or other devices, and/or to route power to battery 1391 (e.g., a lithium ion or other battery) for charging battery 1391.

As shown, mobile device 1302 and lighting device attachment 1300 may include wireless communication interfaces 1350 and 1351, respectively, which may be implemented with appropriate circuitry such as one or more processors, integrated circuits, ports, antennas, or other circuitry for managing wireless communications between mobile device 1302 and lighting device attachment 1300 (e.g., to pass appropriate control signals or data therebetween using Wi-Fi, Bluetooth®, and/or other communication techniques).

As shown in FIG. 13B, lighting device attachment 1300 may include other components such as processor 1392, memory 1394, one or more light sources such as light sources 1395, one or more optical elements such as optical elements 1396 (e.g., lenses or reflectors such as one or more of reflector 112 as described herein), and user controls 1398 (e.g., buttons, switches, or other control mechanisms such as control device 1304 of FIG. 13A).

Processor 1392 may be implemented, for example, as a microcontroller, microprocessor, a Field Programmable Gate Array (FPGA), an Application Specific Integrated Circuit (ASIC), and/or any appropriate combination of these or other types of devices.

Memory 1394 (e.g., implemented as any appropriate type of volatile and/or non-volatile memory) may be used to store instructions and/or data. For example, in some embodiments, memory 1394 may be implemented as a non-transistory machine-readable medium storing various instructions which may be executed by processor 1392 to perform various operations such as receiving and processing operating instructions from mobile device 1302. In some embodiments, such a machine-readable medium may be provided within processor 1392 itself (e.g., as firmware and/or otherwise) and/or external to processor 1392. Processing 1392 may include processing circuitry disposed within the housing of lighting device attachment 1300 and configured to receive control signals from the mobile device 1302 via the coupling member 1377 and to operate the light sources 1395 in response to the control signals. The control signals may be generated by an application program interface 1399 of the mobile device 1302 based on user input.

Light sources 1395 may be implemented, for example, as light sources 126 as described herein (e.g., a light emitting diode (LED), an incandescent light bulb, a tungsten-halogen light bulb, a fluorescent light bulb, a high-intensity discharge light bulb, or any other singular or plural light source devices). Lighting device attachment 1300 may include one light source, two light sources, or more than two light sources. In embodiments in which lighting device attachment 1300 includes more than one light source the light sources may generate light of a common wavelength or color or the light sources may generate light of different wavelengths (e.g., different colors of visible light such as red light, blue light, violent light, green light, or combinations thereof and/or invisible light such as infrared light). In embodiments in which the light sources generate light of different colors, each light source may generate only or primarily the light of a desired color or the light sources may generate light of the desired color and additional colors and one or more filters may be provided (e.g., within or external to the light source) to prevent the additional colors from being emitted from lighting device attachment 1300. For example, two light sources may include an LED that produces relatively cool or blue colored light and another LED that produces relatively warm or red colored light.

Lighting device attachment 1300 may include one or more optical elements associated with each light source. For example, each light source may be disposed at least partially within a reflector that shapes the light into a beam that is projected from lighting device attachment onto an area of interest such as a scene viewed within the field of view of a camera 1388 of mobile device 1302.

Using, in one embodiment, two or more light-source/reflector pairs allows for additional control of the beam shape, because the output beam produced is a melding of the individual beams produced by each light-source/reflector pair. One embodiment is that of a multiple-reflector device in which each of the multiple light-source/reflector pairs would be mounted with its symmetry axis tilted at a non-zero angle (e.g., an angle of about 7.5 degrees) with respect to one or more of the symmetry axes of the other reflectors, in order to produce an oval-shaped combined output beam, rather than the circular beam produced by a single reflector. An oval-shaped combined beam may be a useful beam shape in various applications, such as lighting for video and still photography, where the desired field of view to be illuminated is typically wider in one direction than in the orthogonal direction, e.g., by a ratio of 16:9.

In one embodiment, the symmetry axes of the reflectors are oriented at different angles, while the light sources would all remain unfilled and mounted in the same plane. This would reduce costs and improve manufacturability by allowing all the light sources to all be mounted on a single flat surface.

The shapes of the multiple reflectors used in a single lighting device attachment could all have identical designs in one embodiment. Alternatively, a different design could be used for each reflector to provide more degrees of freedom in creating a desired melded output-beam shape in another embodiment.

In one embodiment, the multiple light sources used in a single lighting device are identical. Alternatively, in another embodiment, multiple light sources having different optical output characteristics are used in a single device. For example, two or more light sources with different output spectra may be used. By controlling the flux output of each of the multiple light sources, the white balance (spectrum) of the melded output beam, as well as the total flux output, may be continuously adjusted (e.g., during operation of the lighting device attachment). This type of white balance control may be particularly useful in photography and videography.

As shown in FIG. 13B, mobile device 1302 may include various components such as battery 1380, display 1382 (e.g., a liquid crystal display or a light-emitting diode display), processor 1384, memory 1386, one or more cameras such as camera 1388 (e.g., rear-facing camera and a forward-facing camera), light source 1389 (e.g., one or more LED light sources), user controls 1390 (e.g., buttons, switches, or touchscreen components), and/or other components as commonly implemented in mobile devices such as smartphones (e.g., positioning circuitry such as global-positioning system circuitry (GPS), one or more accelerometers, gyroscopes, compasses, etc.).

Processor 1384 may be implemented, for example, as a microcontroller, microprocessor, a Field Programmable Gate Array (FPGA), an Application Specific Integrated Circuit (ASIC), and/or any appropriate combination of these or other types of devices.

Memory 1386 (e.g., implemented as any appropriate type of volatile and/or non-volatile memory) may be used to store instructions and/or data. For example, in some embodiments, memory 1386 may be implemented as a non-transistory machine-readable medium storing various instructions which may be executed by processor 1384 to perform various operations such as operating a lighting device attachment application 1399 (e.g., an application program interface (API) for a user) for controlling lighting device attachment 1300 (e.g., for operating light sources 1395 to flash, turn on, turn off, or increase or decrease in brightness). In some embodiments, such a machine-readable medium may be provided within processor 1384 itself (e.g., as firmware and/or otherwise) and/or external to processor 1384.

Light sources such as light sources 1395 may be operated by user controls 1398 and/or an API of the mobile device. For example, hardware controls may be provided with lighting device attachment 1300 (e.g., an on/off switch, a rotary encoder, buttons, etc.) and the lighting device attachment may be attached to a mobile device such as a phone in such a way that control signals from the phone operating system or app can be sent to a light controller of the lighting device attachment and manipulations of the hardware controls of the lighting device attachment may be transmitted back to the phone operating system or app.

The hardware controls themselves may directly manipulate the light by causing the light controller to turn on/off, increase or decrease in intensity, or go into a strobe mode, as an example. These hardware controls may inform the software app running on the phone that these actions are being taken, which would cause the app to update a display indicating to the user the current state of the light emitting device (e.g., the light intensity, strobe duration, etc.). Additionally, the app on the phone may receive user inputs from the user causing the light controller of the lighting device attachment to either override the hardware controls of the lighting device attachment, or, in conjunction with the hardware controls, cause the light controller to cause the light being emitted to behave a certain way.

In this way, the capabilities of a phone host device may be conferred into the lighting device attachment. In one example use case, a GPS-controlled lighting device may be provided in which built-in GPS functionality of a phone can be accessed and used to activate or deactivate the light source(s) of an attached lighting device attachment based on a location of the phone and attachment (e.g., a GPS-determined location provided by the phone's GPS circuitry). In another example use case, a motion-controlled lighting device may be provided in which an accelerometer of other motion detection circuitry in a phone that is attached to the lighting device attachment can provide information about the motion of the phone and attachment. The information can be provided to processing circuitry in the phone or the attachment which, in response to the motion information may cause the light sources of the lighting device attachment to react (e.g., turn on, turn off, flash, strobe, increase or decrease in brightness, etc.) based on the orientation, rate, direction, or pattern of movement. In another example use case, a network-controlled lighting device may be provided in which a phone that is attached to a lighting device attachment acts as a device receiving network signals via the Internet, Bluetooth® or other communications circuitry or protocols that then cause processing circuitry in the phone or the attachment to react to those signals and operate the light sources of the attachment accordingly (e.g., to turn on, turn off, flash, strobe, increase or decrease in brightness, etc. of the light sources in response to the received network signals). For example, the received network signals may be generated by a remote user such as a parent of a child in possession of the phone and attachment (e.g., to help locate the child or communicate with the child) or by a user of the phone and attachment (e.g., to activate the light source to help locate a missing phone or capture an image remotely).

In one embodiment, the interface between the lighting device attachment and the phone or other mobile device may be a published or downloadable application programming interface (API). The API may be an open API, thereby allowing third parties to publish software that can be downloaded on a mobile device to control the light generated by lighting device attachment and/or one or more light sources in the mobile device. For example, an API may be provided that generates stop-motion strobe photography functionality, using the phone's camera capabilities in conjunction with timed strobing of the light sources in the lighting device attachment.

A lighting device attachment API on a mobile device may grant software of the mobile device the ability to turn the light sources of the mobile device attachment on and off, set the intensity, schedule or time durations of light being on with light being off (e.g., strobing, or signaling), and/or ramp the intensity from one value to another (as examples).

Figure 15:
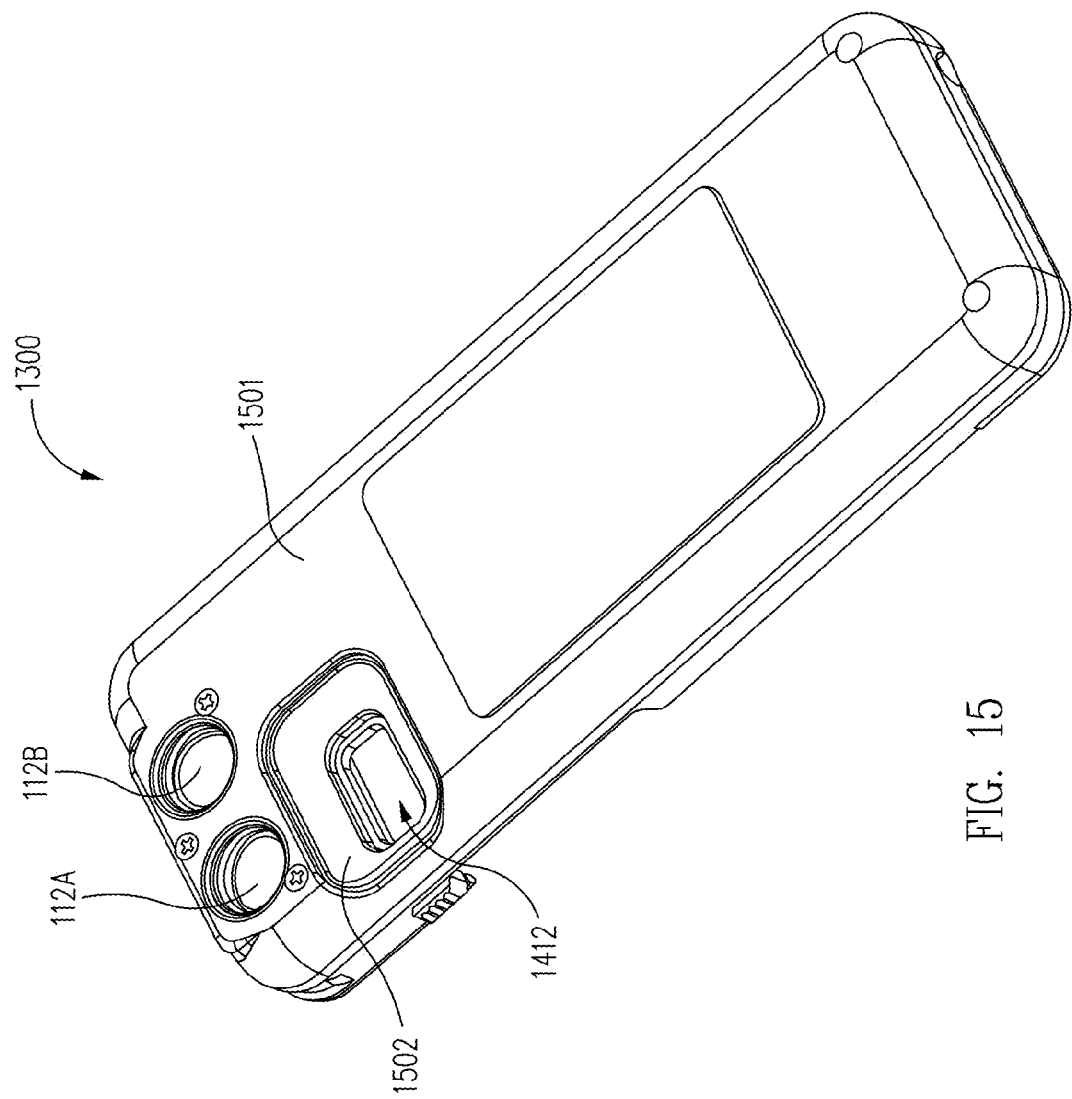
FIG. 15 illustrates a rear perspective view of a lighting device attachment for attachment to mobile device in accordance with an embodiment of the disclosure.

FIG. 15 is a rear perspective view of lighting device attachment 1300 according to an embodiment. As shown in FIG. 15, opening 1412 may extend entirely through lighting device attachment 1300 and rear surface 1501 may have a beveled portion 1502 that prevents the housing of lighting device attachment 1300 from obstructing the field of view of a camera and/or light source disposed behind and/or within opening 1412. As shown in FIG. 15, lighting device attachment 1300 may include one or more reflectors configured to project light from lighting device attachment 1300 (e.g., to illuminate a scene as viewed by a camera of an attached mobile device). Lighting device attachment 1300 may be provided with one or more paraboloidal or other reflectors, one or more lenses (e.g., a total internal reflection (TIR) lens), or, as in the example of FIG. 15, may be provided with first and second reflectors 112A and 112B (e.g., first and second implementations of a reflector 112 as described herein). In various embodiments, any light sources and/or light focusing members may be used to project light from lighting device attachment 1300.

In the example of FIG. 15, lighting device attachment 1300 includes two reflectors 112A and 112B (sometimes referred to herein collectively as reflectors 112). Reflectors 112 of lighting device attachment 1300 may receive and reflect light from respective light sources disposed partially within the reflectors as discussed herein to generate light beams of a desired shape (e.g., a beam configured to illuminate a scene defined by a field of view of the camera of the mobile device). The light sources for each reflector 112 of lighting device attachment 1300 may generate light of a common wavelength or the light sources may generate light of different wavelengths (e.g., different colors of visible light such as red light, blue light, violent light, green light, or combinations thereof and/or invisible light such as infrared light). Reflectors 112A and 112B of lighting device attachment 1300 may be aligned along substantially parallel optical axes or may be aligned off axis from each other to generate a relatively wider and/or a directed combined light beam.

Figure 16:
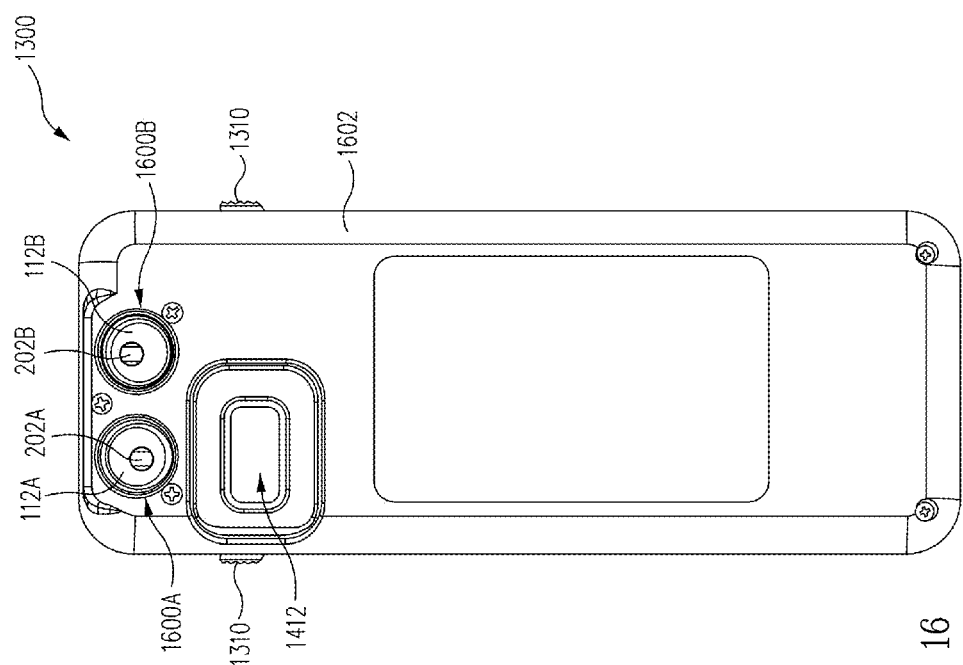
FIG. 16 illustrates a rear view of a lighting device attachment for a mobile device in accordance with an embodiment of the disclosure.

For example, as shown in the example rear view of FIG. 16, the differing relative positions of rear openings 202A and 202B of respective reflectors 112A and 112B with respect to the openings 1600A and 1600B in rear housing member 1602 in which the reflectors are disposed illustrate how reflectors 112A and 112B may be aligned along different (e.g., non-parallel) optical axes in some embodiments. It can also be seen in the rear view of FIG. 16 that engagement members 1310 may extend from the sides of lighting device attachment 1300 so that the engagement members can be gripped and squeezed if desired by a user.

Figure 17:
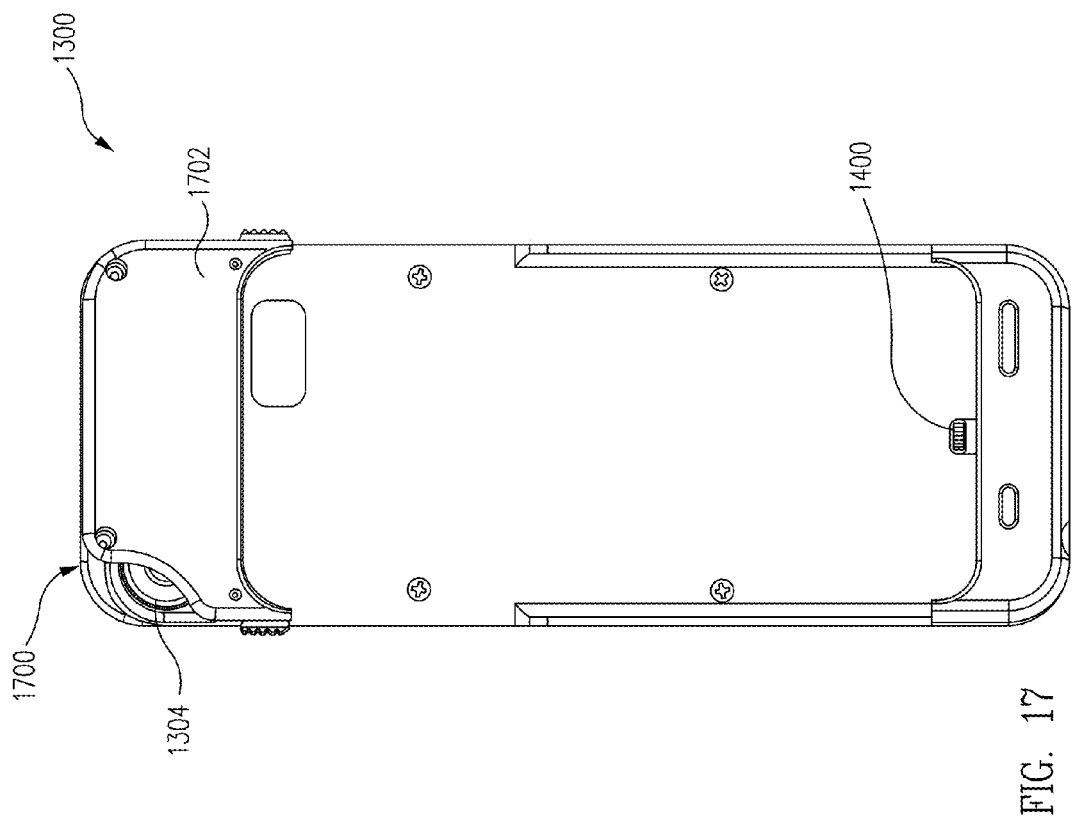
FIG. 17 illustrates a front view of a lighting device attachment for a mobile device in accordance with an embodiment of the disclosure.

In the front view of lighting device attachment 1300 of FIG. 17, it can be seen that a rotary member of control device 1304 may be disposed behind a recess 1700 in a front top housing portion 1702 of lighting device attachment 1300 to provide a user with access to the rotary member.

Figure 18:
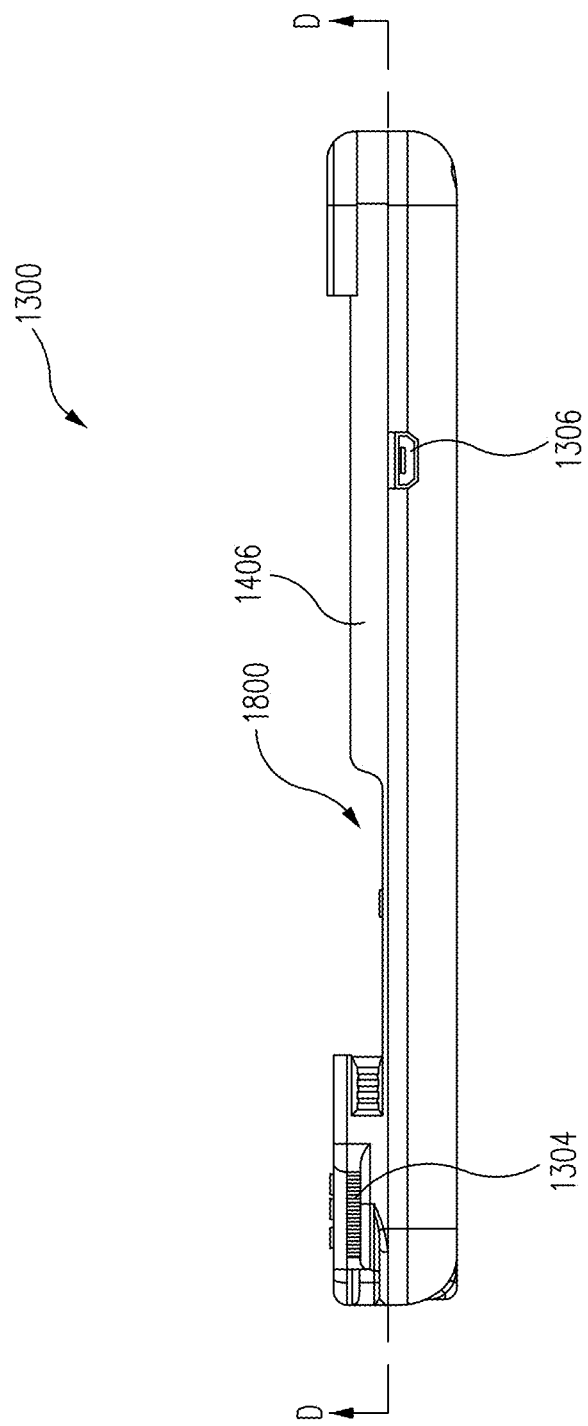
FIG. 18 illustrates a left side view of a lighting device attachment for a mobile device in accordance with an embodiment of the disclosure.
Figure 19:
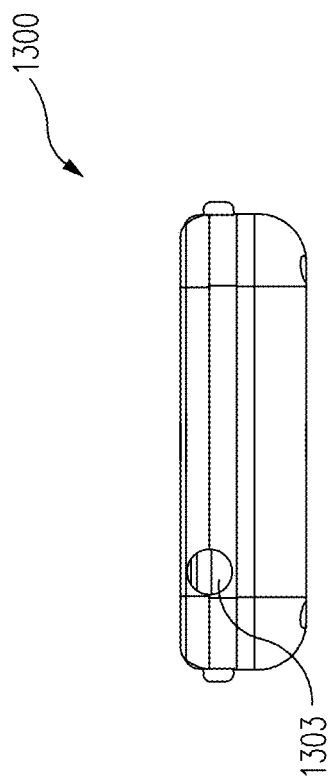
FIG. 19 illustrates a bottom view of a lighting device attachment for a mobile device in accordance with an embodiment of the disclosure.
Figure 20:
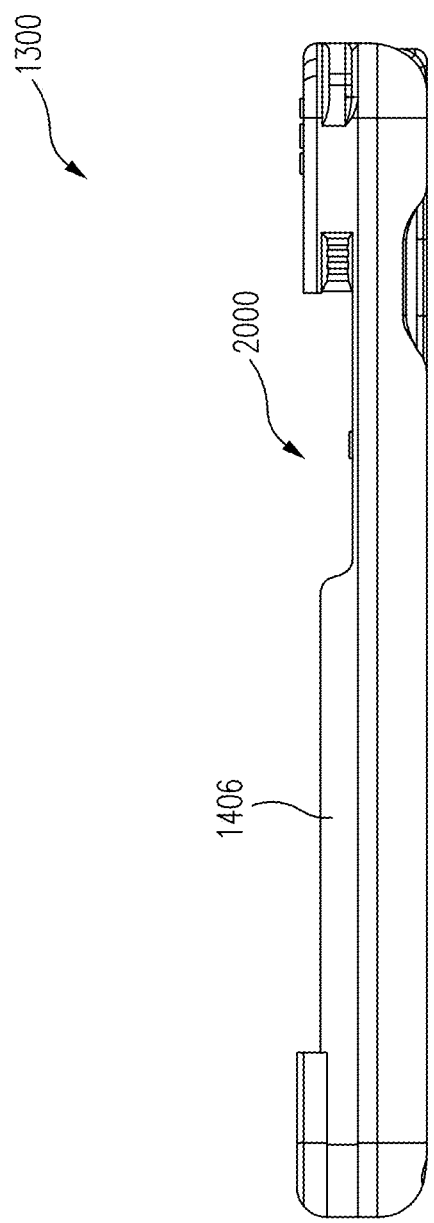
FIG. 20 illustrates a right side view of a lighting device attachment for a mobile device in accordance with an embodiment of the disclosure.
Figure 21:
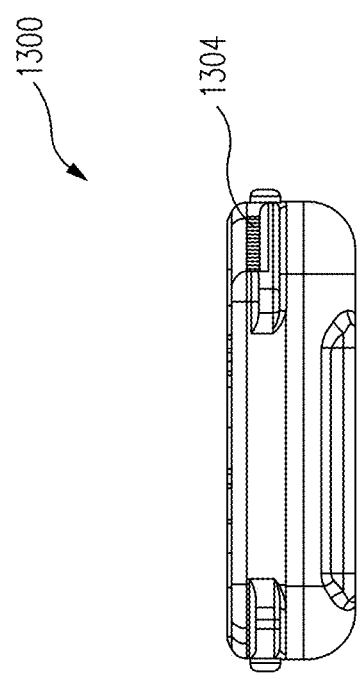
FIG. 21 illustrates a top view of a lighting device attachment for a mobile device in accordance with an embodiment of the disclosure.

FIG. 18 is a left side view of lighting device attachment 1300 showing how control device 1304 and port 1306 may be disposed on a common side of lighting device attachment 1300. However, this is merely illustrative and control device 1304 and port 1306 may be located at any suitable position on lighting device attachment 1300 as desired. A cutaway 1800 may be formed in, for example, sidewall portion 1406 of a housing of lighting device attachment 1300 to accommodate, for example buttons 1320 and/or switch 1322 (see FIG. 13A) of mobile device 1302 when lighting device attachment 1300 is attached to the mobile device. FIG. 19 is a bottom view of lighting device attachment 1300 showing how an opening 1303 (e.g., for receiving a headphone jack for a mobile device or allowing sound from a speaker to pass) may be disposed on the bottom (or any other) face of lighting device attachment 1300. FIG. 20 is a right side view of lighting device attachment 1300 showing how a cutout 2000 corresponding to cutout 1800 of FIG. 18 may be disposed on an opposing side of lighting device attachment 1300 to cutout 1800. FIG. 21 is a top view of lighting device attachment 1300 showing how control device 1304 (e.g., a rotatory member of the control device) may be accessible from the top of lighting device attachment 1300.

Figure 22:
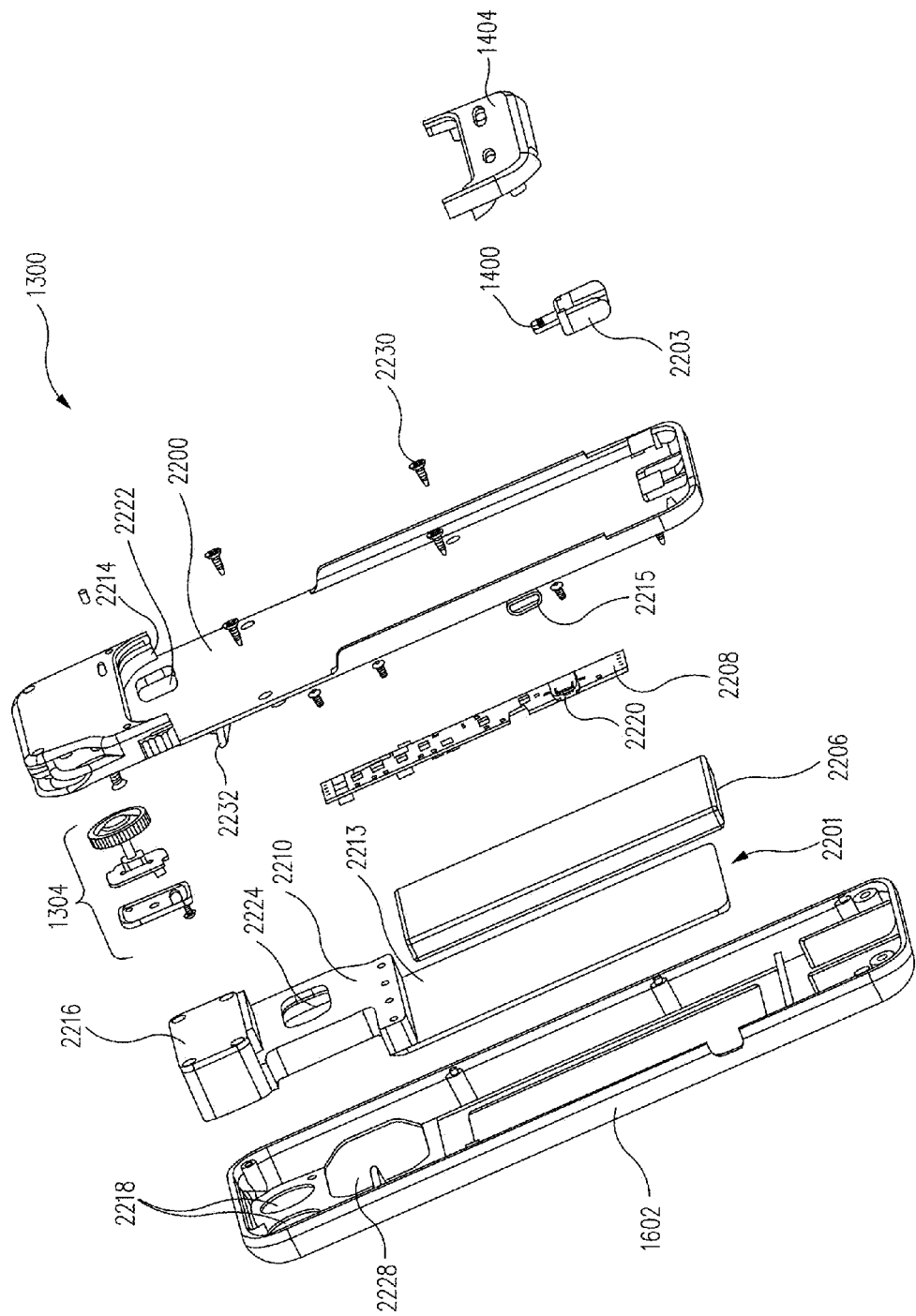
FIG. 22 illustrates an exploded front perspective view of a lighting device attachment for a mobile device in accordance with an embodiment of the disclosure.
Figure 23:
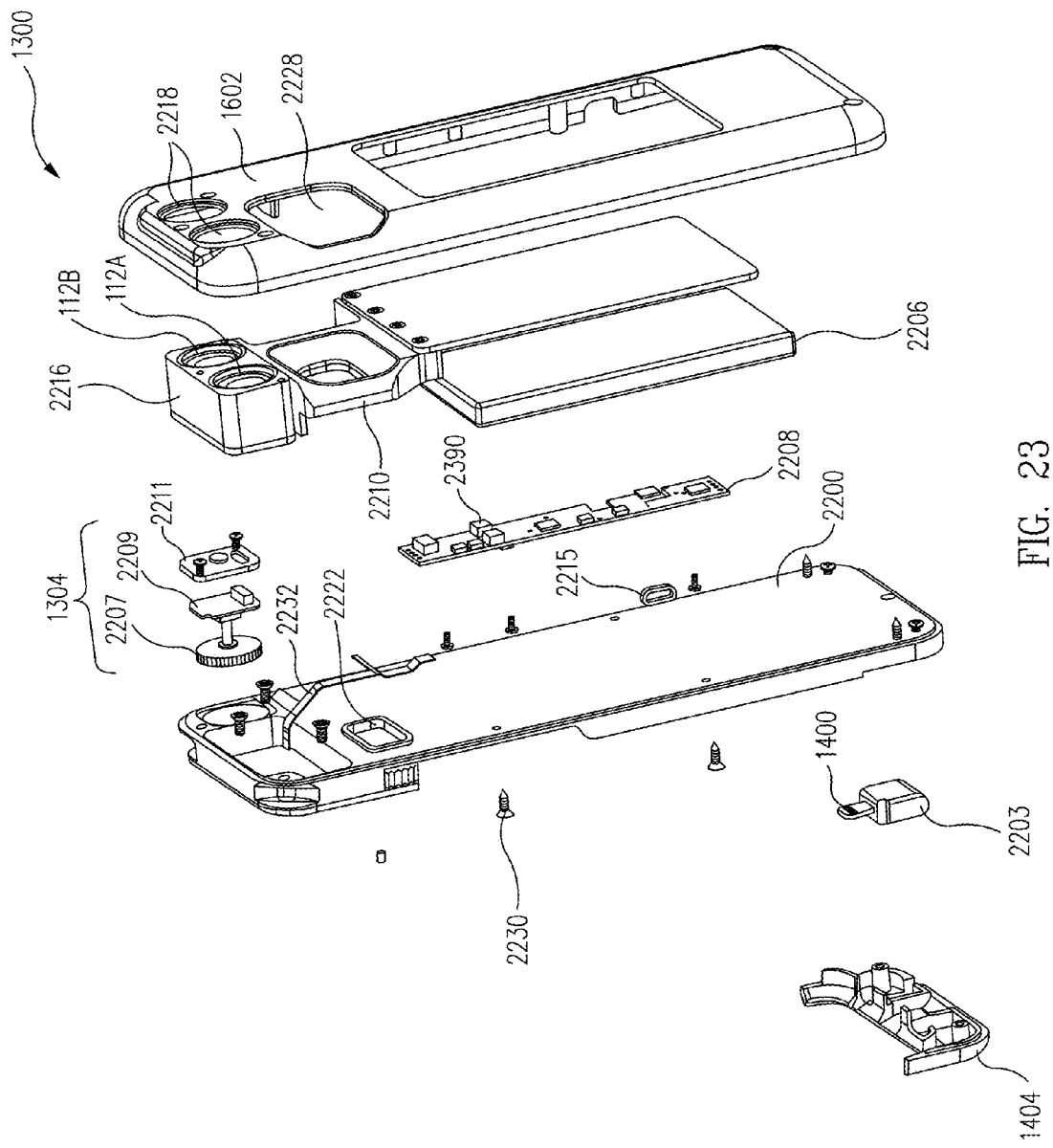
FIG. 23 illustrates an exploded rear perspective view of a lighting device attachment for a mobile device in accordance with an embodiment of the disclosure.

FIGS. 22 and 23 respectively show front and rear exploded perspective views of lighting device attachment 1300 according to an embodiment. As shown in the front perspective view of FIG. 22, housing member 2200 and rear housing member 1602 may substantially enclose internal components such as printed circuit board (PCB) 2208, battery 2206 (e.g., an implementation of battery 1391 of FIG. 13B), and lighting component 2201. As shown, housing member 2200 may function as a front surface for attachment 1300 and as a primary support structure or frame for lighting device attachment 1300. Housing member 2200 may be coupled to rear housing member 1602 with attachment members such as screws 2230 or using other attachment mechanisms or materials such as clips, snaps, engagement members, or adhesives.

Lighting component 2201 may be formed from multiple portions such as portions 2213, 2210 and 2216. Portions 2213 and 2210 may serve as mechanical support structures and/or thermal coupling structures that position internal lighting device housing 2216 (sometimes referred to herein as a reflector housing) and/or conduct heat generated by light sources within internal lighting device housing 2216 away from a mobile device attached to lighting device attachment 1300. Internal lighting device housing 2216 may be aligned with one or more openings 2218 in rear housing member 1602 so that light sources (e.g., using reflectors 112 or other reflectors or lenses) are arranged to project light through openings 2218 to illuminate an external scene.

Rear housing member 1602 may have an additional opening 2228 that aligns with a corresponding opening 2224 in lighting device component 2201 and opening 2222 in housing member 2200 to form opening 1412 in lighting device attachment 1300 (e.g., for alignment with a camera and/or a light source of the mobile device). Printed circuit board 2208 may be disposed within lighting device attachment 1300 and may include various electrical components, integrated circuits, processors, or other suitable components. For example, port circuitry 2220 may be coupled to printed circuit board 2208 and may be coupled to the external surface of lighting device attachment 1300 by a port frame 2215. One or more components as described above in connection with FIG. 13B (e.g., processor 1392 and/or memory 1394) may be implemented as components such as component 2390 on PCB 2208).

Internal circuitry 2232 may be coupled to housing member 2200 and may route power and/or other control signals from battery 2206 and/or printed circuitry board 2208 to light sources disposed in internal light source housing 2216.

Connector device 2203 may be mounted in a front portion of lighting device attachment 1300 (e.g., between front lower housing portion 1404 and housing member 2200) so that connector 1400 extends from front lower housing portion 1404. As shown in FIG. 23, control device 1304 may be formed from a rotary member 2207, control circuitry 2209 coupled to rotary member 2207, and a mounting member 2211 that couples control device 1304 to housing member 2200. Internal circuitry 2232 may provide conductive couplings between control circuitry 2209, printed circuit board 2208, and/or light sources disposed in internal light source housing 2216 so that, when rotary member 2207 is turned, the light sources turn on, turn off, and/or change in brightness.

Figure 24:
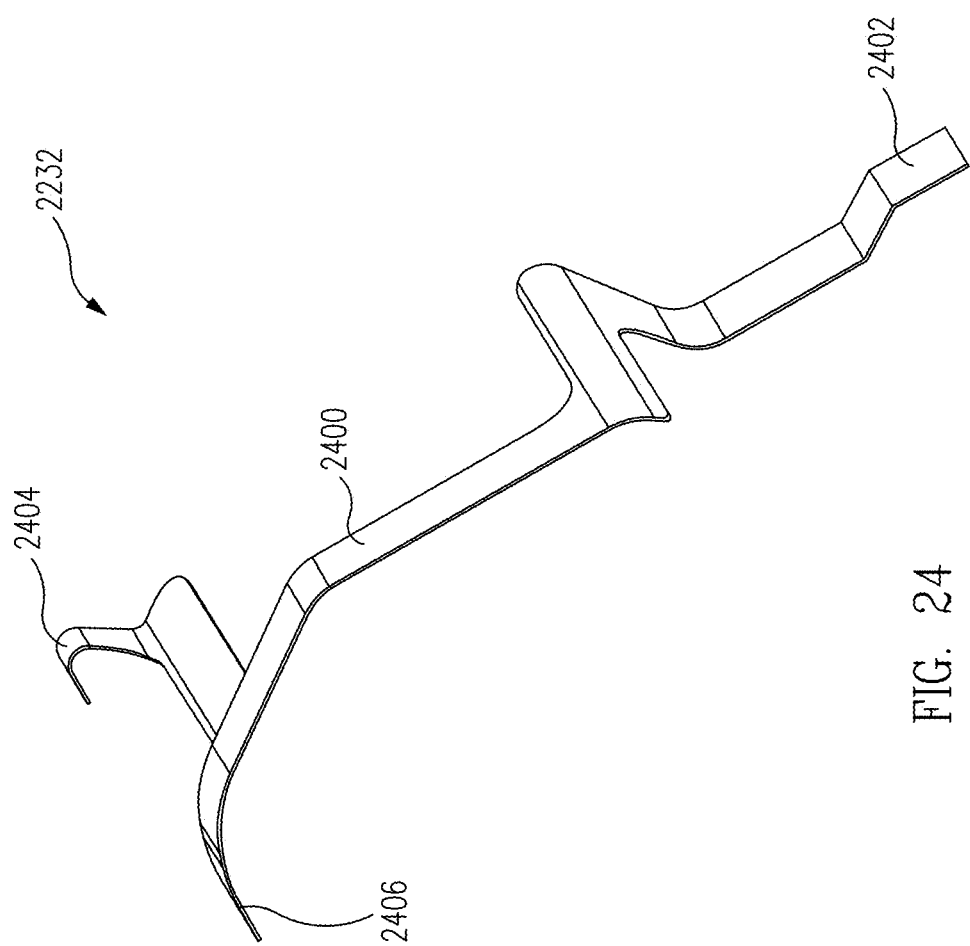
FIG. 24 illustrates internal circuitry for a lighting device attachment for a mobile device in accordance with an embodiment of the disclosure.

FIG. 24 shows a perspective view of internal circuitry 2232 which may be formed for example, from a flexible printed circuit or a relatively simpler conductor such as a metal (e.g., copper strip). As shown in FIG. 24, internal circuitry 2232 may include an extended central portion 2400 that extends between a lower contact portion 2402 and first and second branches 2404 and 2406 at an opposing upper end. Branch 2404 may be coupled to control circuitry 2209 of control device 1304. Branch 2406 may be coupled to light sources disposed in internal light source housing 2216. Lower contact portion 2402 may be coupled to printed circuit board 2208. Thus, internal circuitry 2232 may route control signals, power, or other signals from the battery or printed circuit board of lighting device attachment 1300 to the light sources based on the position of rotary member 2207. However, it should be understood that rotary control device 1304 is merely illustrative and that other control devices such as switches or buttons may be used. In one embodiment, lighting device attachment 1300 may be provided without a dedicated control device and the light sources of lighting device attachment 1300 may be controlled by an application in the mobile device (e.g., via control signals received from the mobile device through connector 1400 at printed circuit board 2208). In various embodiments, whether or not lighting device attachment 1300 is provided with its own control device, processing circuitry disposed within the housing of lighting device attachment 1300 (e.g., one or more processors associated with PCB 2208) may be configured to receive control signals from the mobile device via the connector 1400 and to operate the light sources within internal lighting device housing 2216 in response to the control signals.

Figure 25:
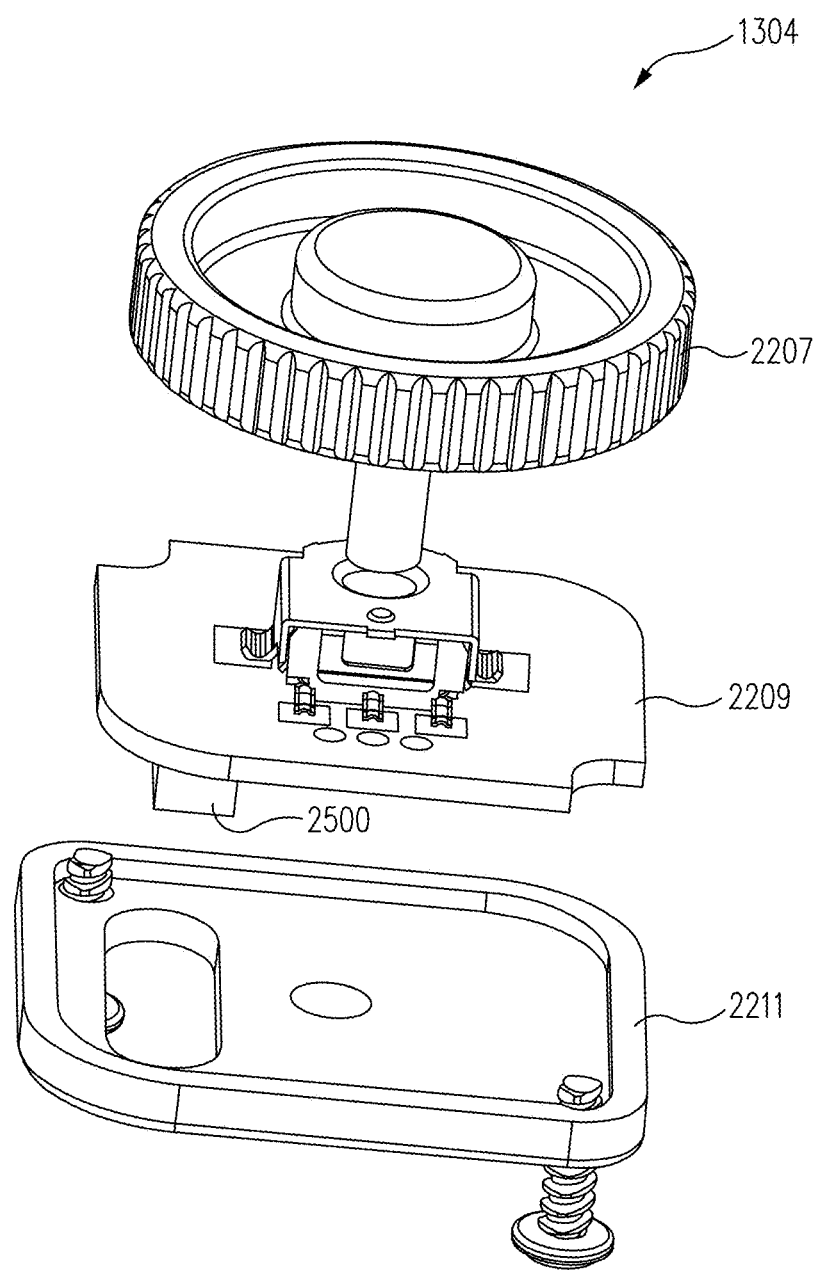
FIG. 25 illustrates a control device for a lighting device attachment for a mobile device in accordance with an embodiment of the disclosure.
Figure 26:
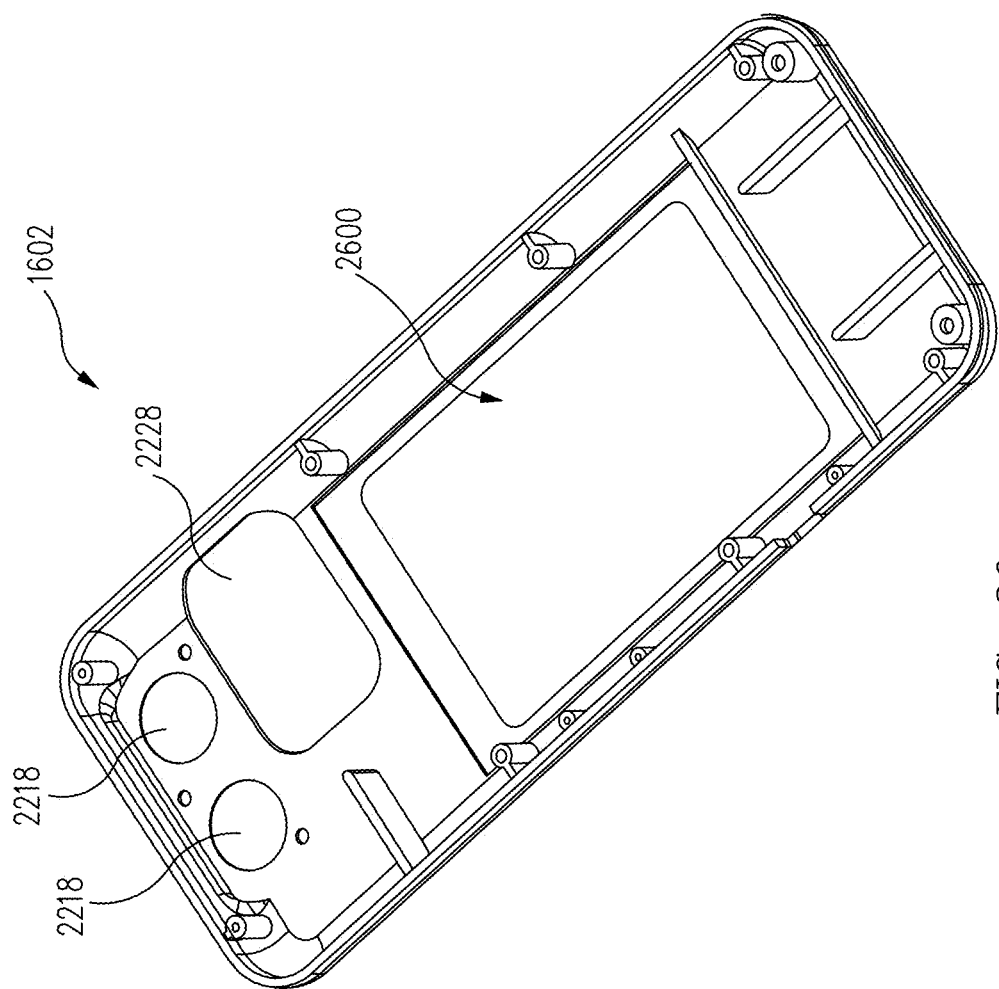
FIG. 26 illustrates a rear housing member for a lighting device attachment for a mobile device in accordance with an embodiment of the disclosure.
Figure 27:
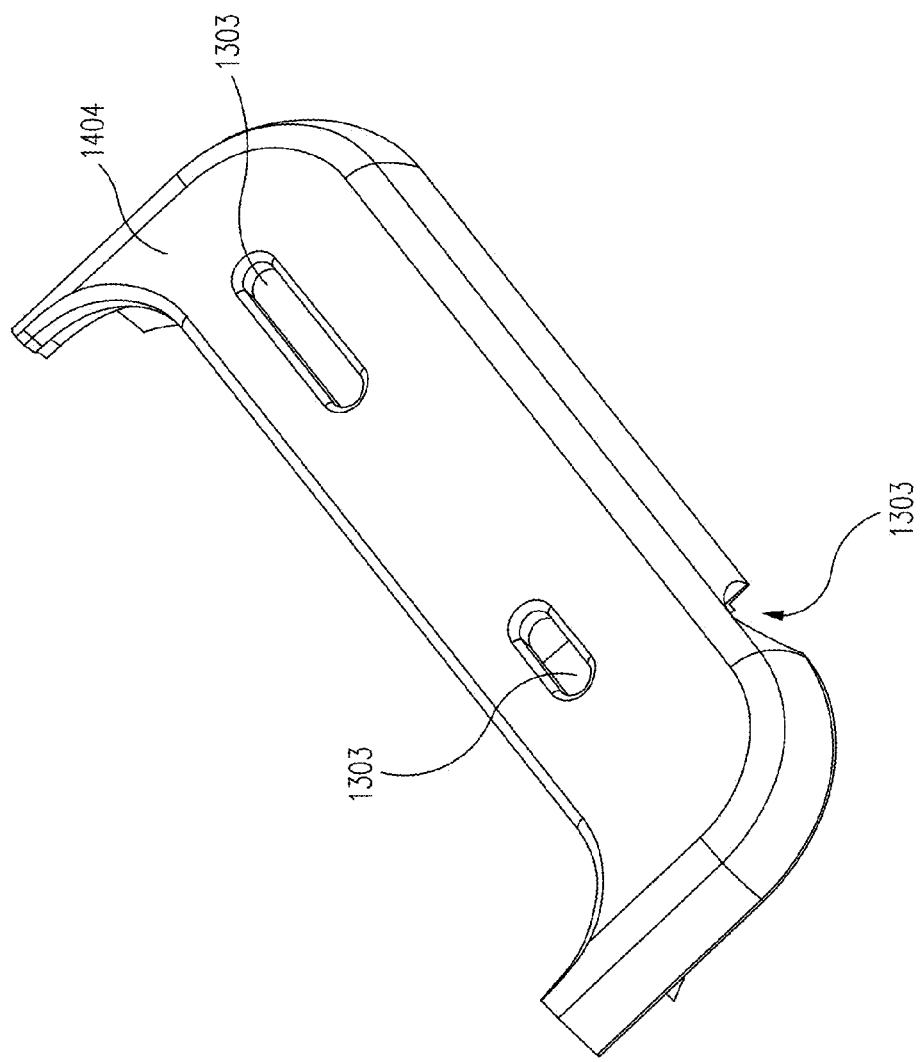
FIG. 27 illustrates a front housing member for a lighting device attachment for a mobile device in accordance with an embodiment of the disclosure.

FIG. 25 shows a more detailed exploded view of control device 1304 and shows how rotary member 2207 may have a post that extends into an opening in control circuitry 2209 so that, when rotary member 2207 is rotated, control circuitry 2209 may operate battery 2206 and/or printed circuit board 2208 to turn on, turn off, and/or adjust the brightness of light generated by light sources disposed within internal lighting device housing 2216. Branch 2404 of internal circuitry 2232 may couple to an extended portion 2500 of control circuitry 2209. FIG. 26 is a perspective view of rear housing member 1602 showing openings 2218 and 2228. As shown in FIG. 26, rear housing member 1602 may have an additional opening 2600. Portion 2213 of internal lighting component may be disposed in opening 2600 to form a part of a rear surface of lighting device attachment 1300. In some embodiments, portion 2213 may be formed from a material that conducts heat from light sources disposed in internal lighting device housing 2216 to be radiated from a rear surface of lighting device attachment 1300. FIG. 27 is a perspective view of front lower housing member 1404 showing openings 1303 for alignment with one or more speakers, sensors, or other components of a mobile device that receive or transmit information from or to the environment.

Figure 28:
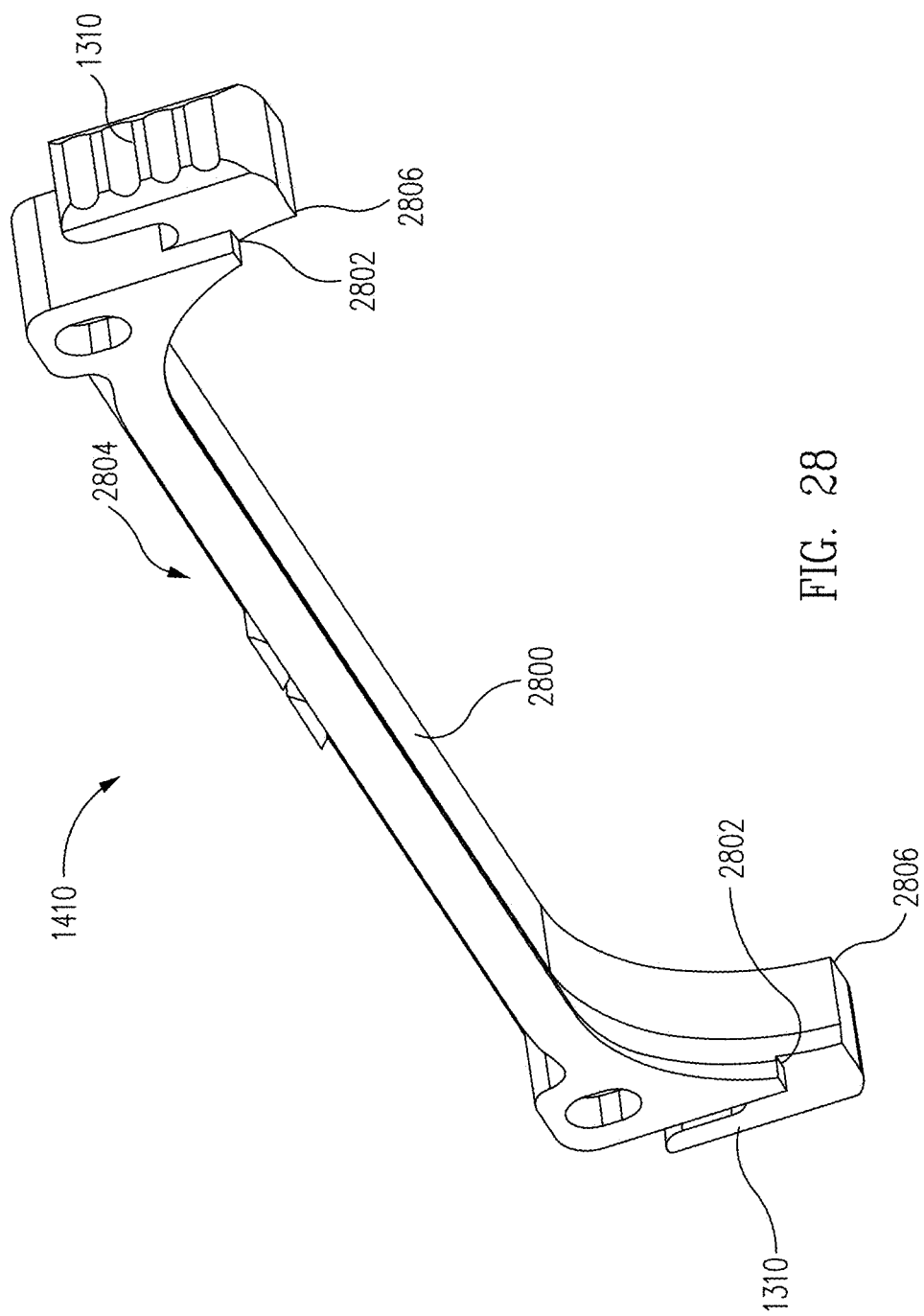
FIG. 28 illustrates a device engagement member for a lighting device attachment for a mobile device in accordance with an embodiment of the disclosure.
Figure 29:
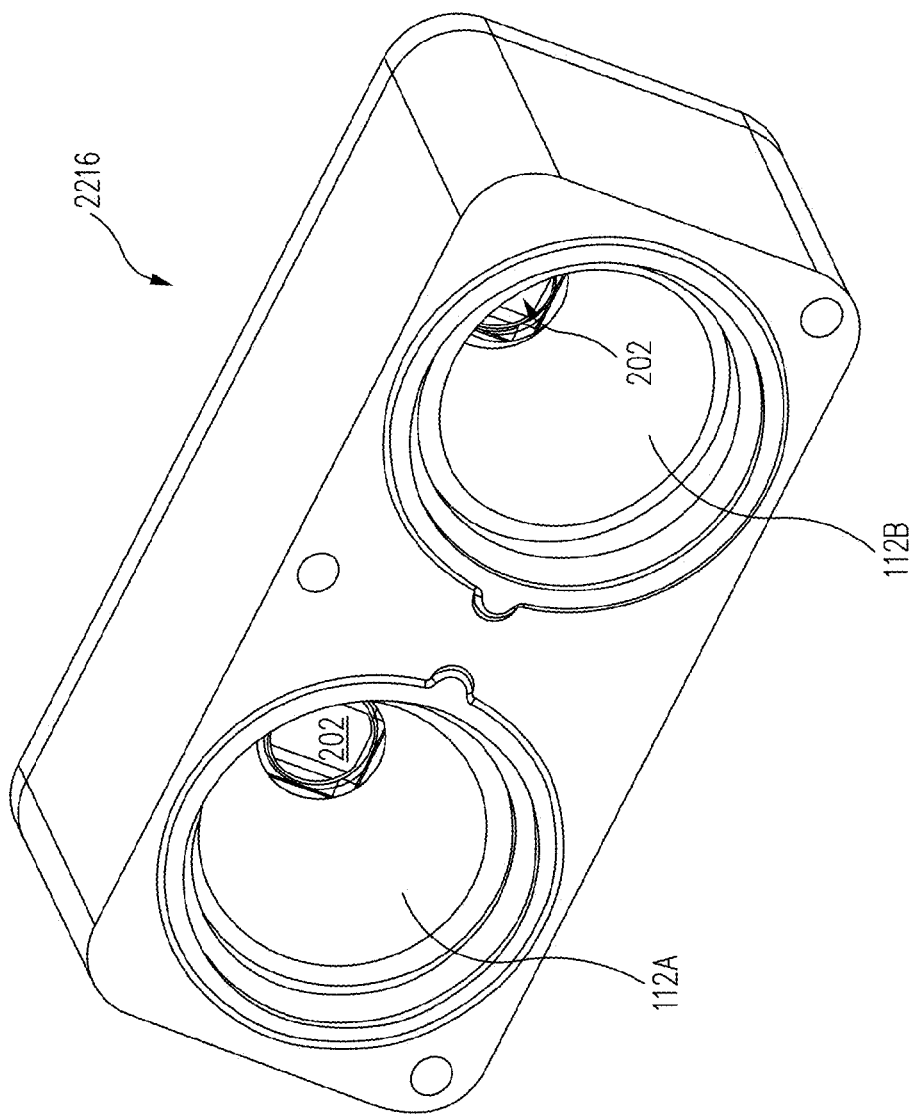
FIG. 29 illustrates a front perspective view of a reflector housing for a lighting device attachment for a mobile device in accordance with an embodiment of the disclosure.
Figure 30:
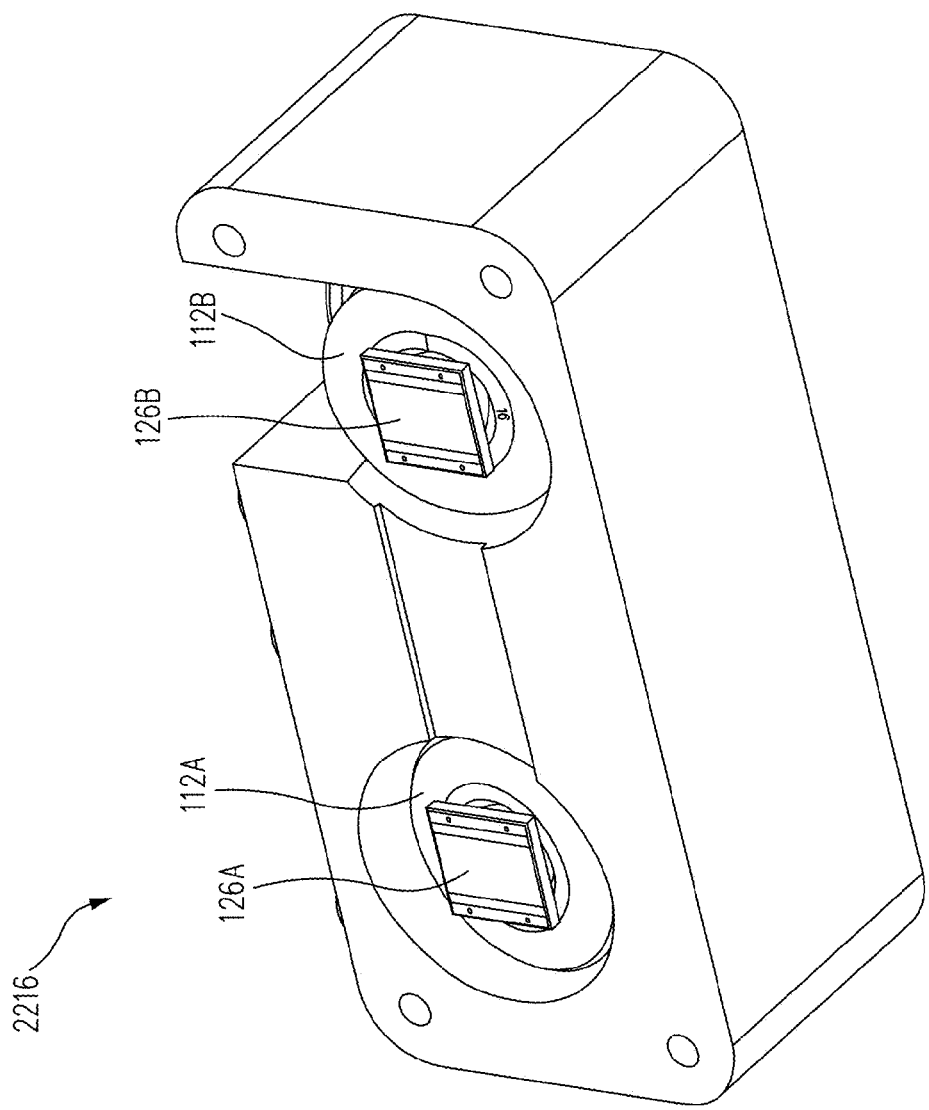
FIG. 30 illustrates a rear perspective view of a reflector housing for a lighting device attachment for a mobile device in accordance with an embodiment of the disclosure.

FIG. 28 is a perspective view of top housing member 1410 showing how a surface 2800 of member 1410 may have a shape that conforms to the exterior shape of the top of a particular mobile device. As shown in FIG. 28, member 1410 may include hinge portions 2802 that couple engagement members 1310 to a central portion 2804 so that, when engagement members 1310 are squeezed, bottom ends 2806 may be moved outward to release or make room for inserting a mobile device. When engagement members 1310 are released, bottom ends 2806 may be moved inward to secure a mobile device. It should be appreciated that engagement members 1310 are merely illustrative and that engagement members that operate differently or engagement members of other types such as clips, magnets, or a simple press fit may be used according to various embodiments.

Figure 31:
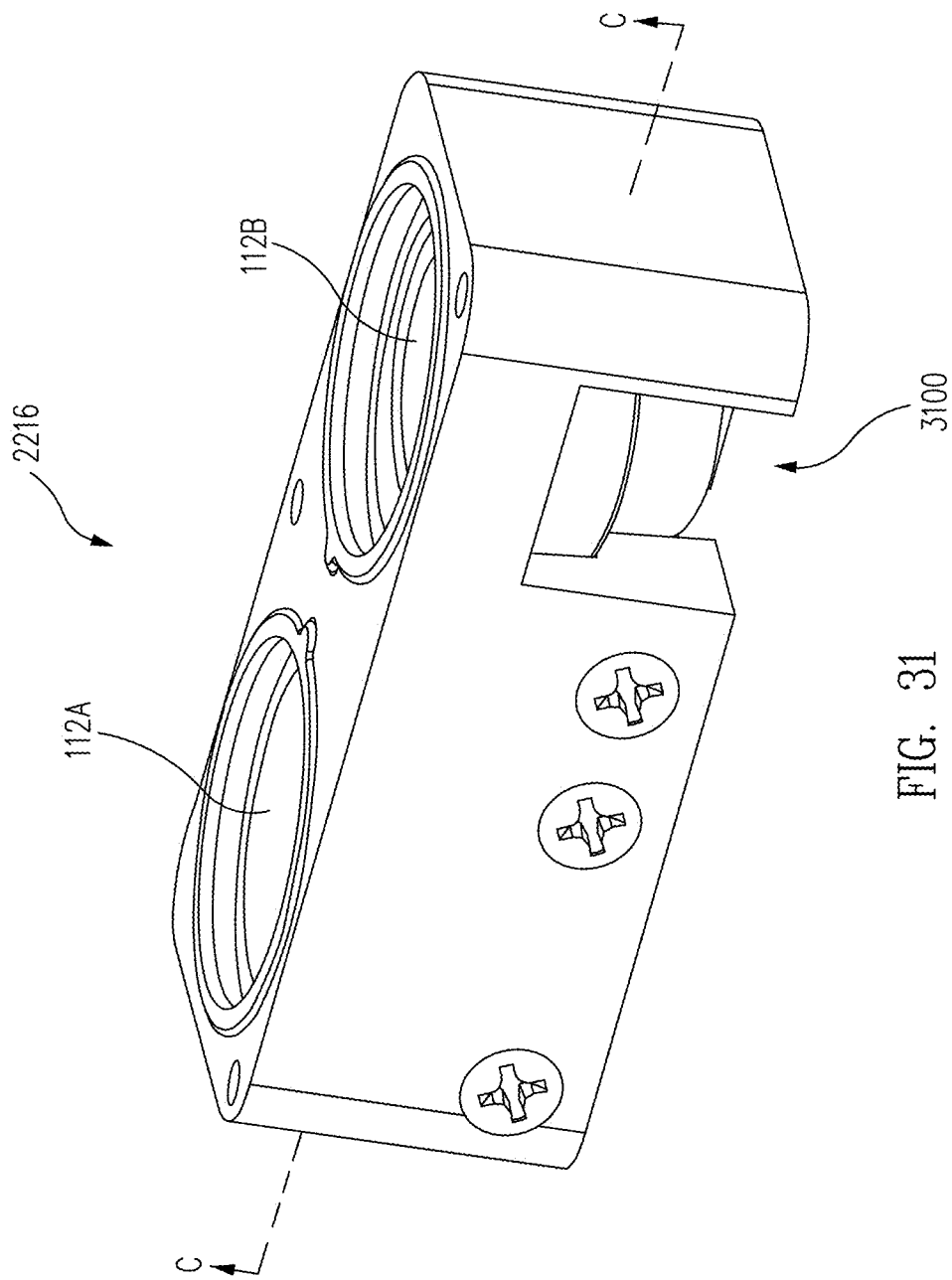
FIG. 31 illustrates a side perspective view of a reflector housing for a lighting device attachment for a mobile device in accordance with an embodiment of the disclosure.

FIGS. 29, 30, 31, and 32 show various views of internal lighting device housing 2216. As shown in the front perspective view of FIG. 29, two reflectors 112 (e.g., faceted and/or unfaceted reflectors as described herein) may be disposed within internal lighting device housing so that reflectors 112 project light from the rear of lighting device attachment 1300 (e.g., the front of internal lighting device housing 2216 may face the rear of lighting device attachment 1300). Rear openings 202 of reflectors 112A and 112B may receive light sources 126A and 126B as shown in the rear perspective view of FIG. 30. As shown in FIG. 31, internal lighting device housing 2216 may include a cutout 3100. In various other embodiments, light sources 126A and 126B may be configured to project light through openings 2218 of rear housing member 1602 via reflectors other than reflectors 112 and/or via one or more lenses.

Figure 32:
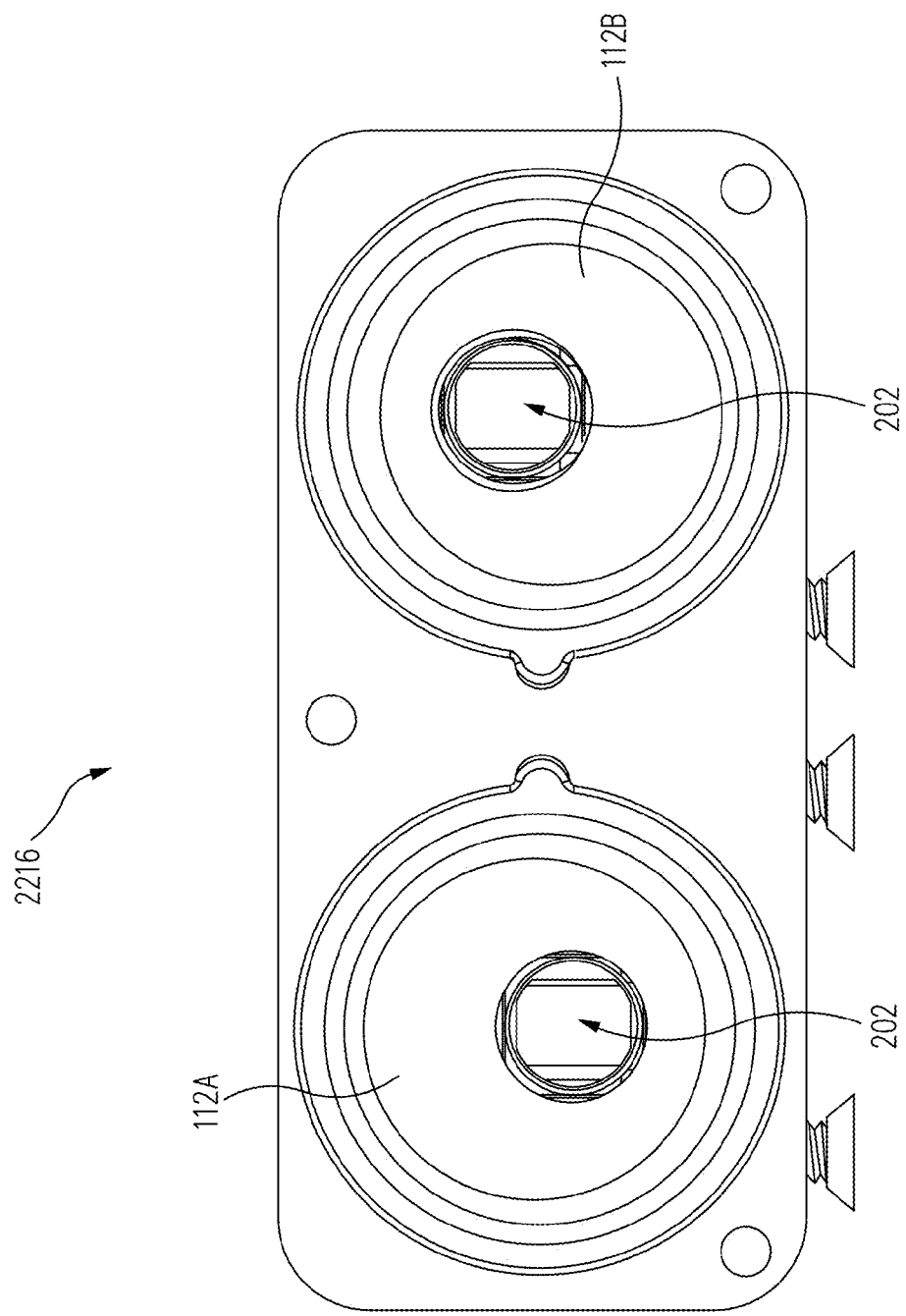
FIG. 32 illustrates a front view of a reflector housing for a lighting device attachment for a mobile device in accordance with an embodiment of the disclosure.
Figure 33:
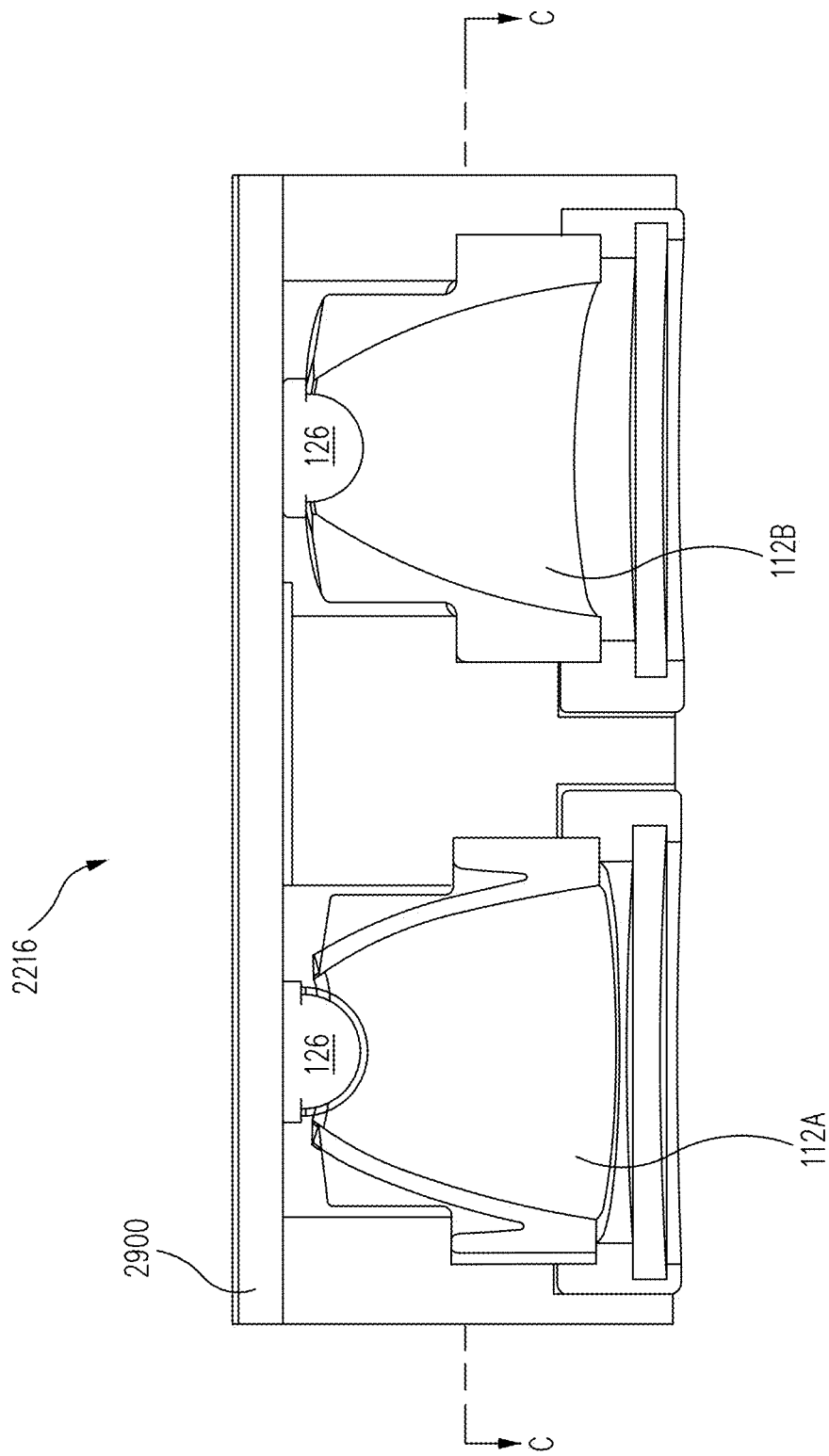
FIG. 33 illustrates a cross-sectional side view of the reflector housing of FIG. 31 in accordance with an embodiment of the disclosure.

FIG. 32 is a face-on view of internal lighting device housing 2216 in which the relative positions of rear openings 202 indicate how reflectors 112A and 112B may be aligned along different optical axes in some embodiments. FIG. 33 is a cross-sectional view of internal lighting device housing 2216, with the cross section taken long line C-C of FIG. 31, and showing how light sources 126 may be mounted to a rear wall 2900 of housing 2216 and reflectors 112 may be mounted at different angles with respect to their light sources 126 and with respect to the exterior surfaces and rear wall 2900 of internal housing 2216.

Figure 34:
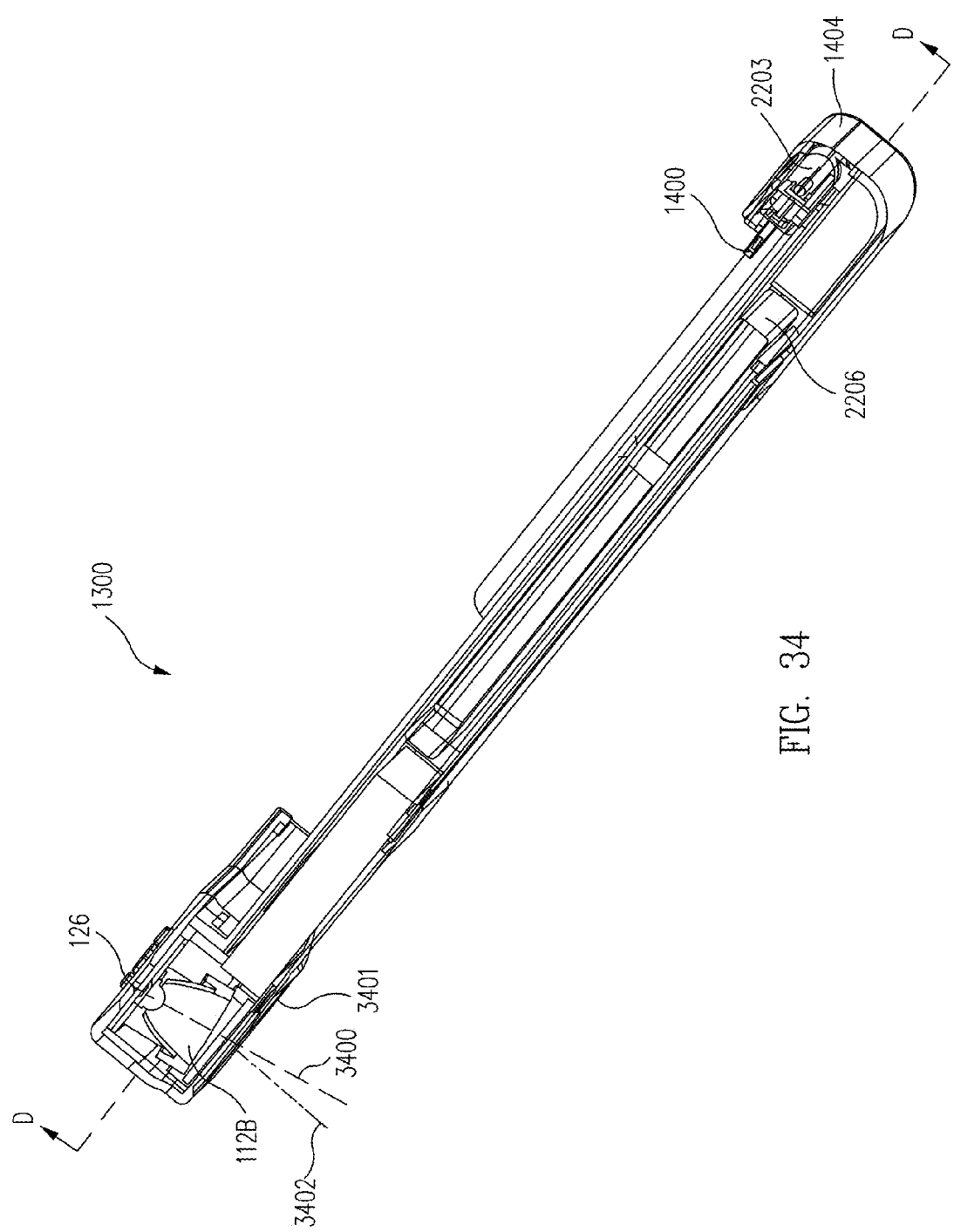
FIG. 34 illustrates a cross-sectional side perspective view of the lighting device attachment of FIGS. 14 and 18 in accordance with an embodiment of the disclosure.

FIG. 34 is a cross-sectional perspective view of lighting device attachment 1300, with the cross section taken long line D-D of FIGS. 14 and 18, in which it can be seen that one or more of reflectors such as reflector 112B may be mounted at an angle within lighting device attachment 1300 such that the optical axis 3400 of that reflector is aligned at a non-perpendicular angle with respect to the outer surface 3401 of lighting device attachment 1300 and/or with respect to an optical axis of a camera of an attached mobile device. In some embodiments, one of the optical elements (e.g., reflectors 112, other reflectors, and/or lenses) for projecting light from lighting device attachment 1300 may be mounted with lighting device attachment such that the optical axis of that optical element (e.g., the optical axis 3402 of FIG. 34) is aligned perpendicularly with respect to the outer surface 3401 of lighting device attachment 1300 and/or with respect to an optical axis of a camera of an attached mobile device. In various embodiments, the optical axes of light projecting elements in lighting device attachment 1300 may be aligned at a common perpendicular angle, at a common non-perpendicular angle, or at different angles. In this way, one or more reflectors such as reflectors 112 of lighting device attachment 1300 may be positioned within the housing along optical axes having different respective angles with respect to an outer surface of the housing to project a desired light beam (e.g., a single reflector light beam or a combined beam from multiple reflectors) having a desired shape and direction. For example the shape and direction of the beam may be arranged to illuminate the field of view of a camera of a mobile device attached to lighting device attachment 1300. FIG. 34 also shows how battery 2206 may be disposed within lighting device attachment 1300 and how connector 1400 of connector device 2203 may extend from housing member 1404.

Figure 35A:
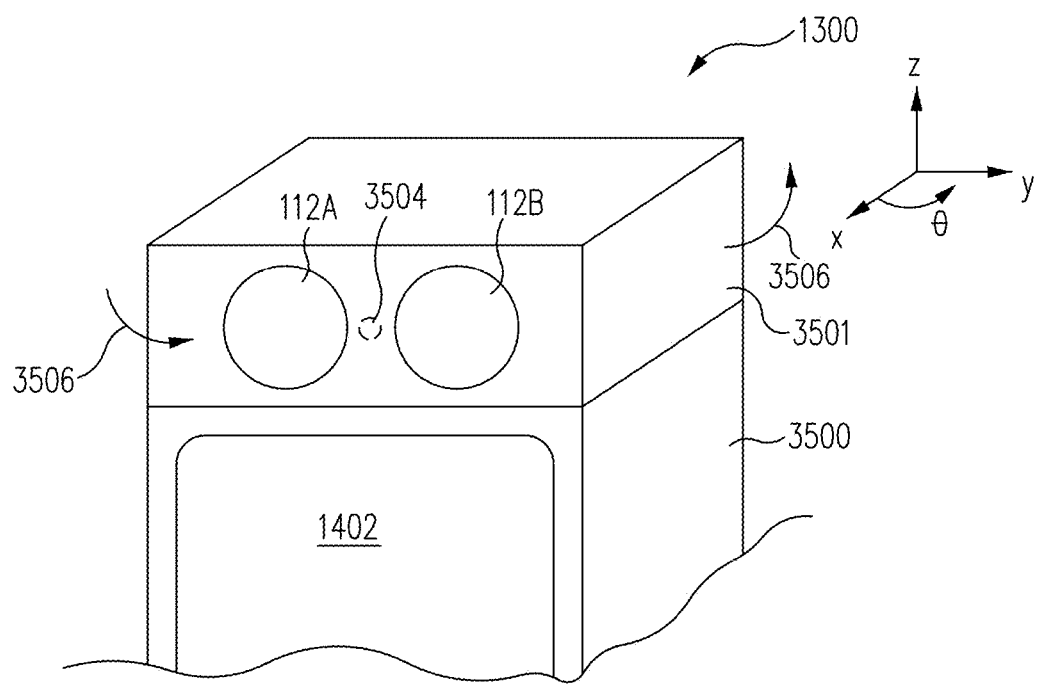
FIGS. 35A, 35B, and 35C illustrate perspective views of a lighting device attachment having a rotatable portion disposed at various rotation positions in accordance with an embodiment of the disclosure.

Although various embodiments have been described in which reflectors 112 face and project light from a rear side of lighting device attachment 1300, this is merely illustrative. As shown in FIG. 35A, in one embodiment, lighting device attachment 1300 may be provided with a lower portion 3500 and an upper portion 3501 that is rotatably attached to lower portion 3500 (e.g., by a pivot 3504) so that the upper portion 3501 can be rotated as, for example, indicated by arrows 3506 (e.g., in a theta direction as indicated in FIG. 35A). In the example of FIG. 35A, top portion 3501 in which reflectors 112 (and associated light sources, not shown) are disposed, has been rotated to a forward-facing position on the same side of lighting device attachment 1300 as cavity 1402 in which a mobile device may be attached. In this way, lighting device attachment 1300 may be used in cooperation with a forward-facing camera of the mobile device (e.g., for capturing a "selfie" image of the user).

Figure 35B:
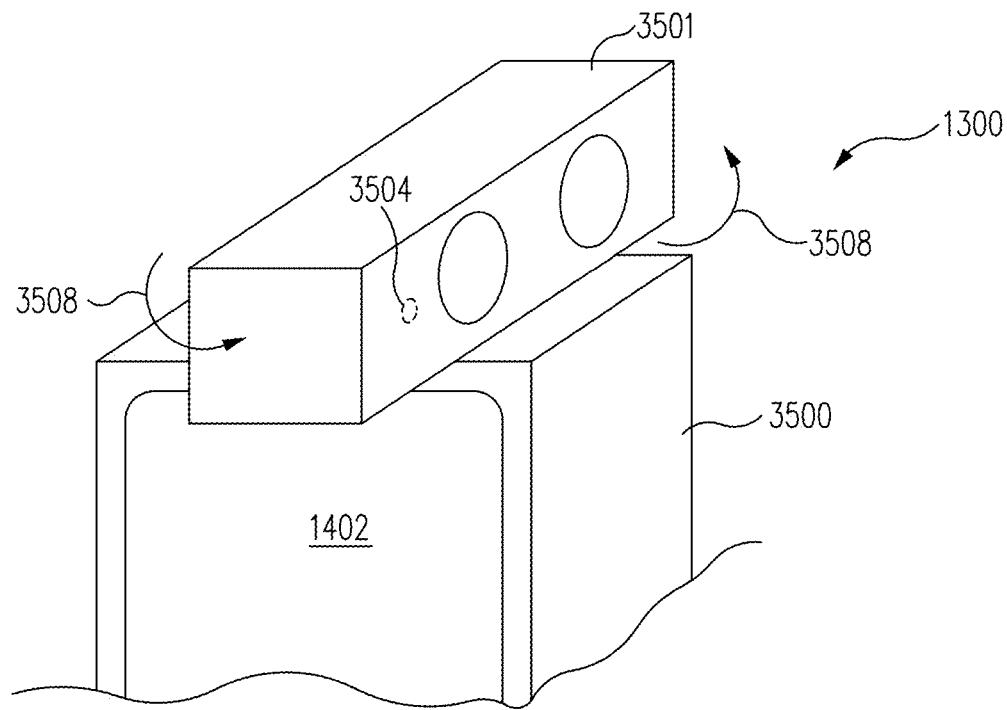
Figure 35C:
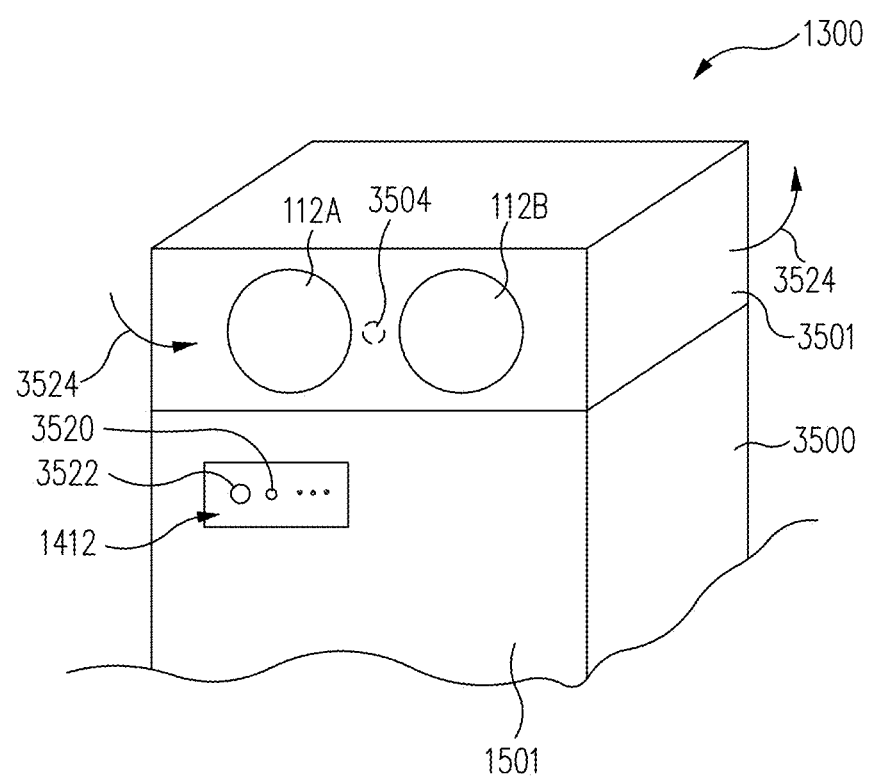

As shown in FIG. 35B, top portion 3501 may be rotated about pivot 3504 from the forward-facing position of FIG. 35A, as indicated by arrows 3508, toward a rear-facing position as shown in FIG. 35C in which reflectors 112 are positioned to project light from the rear surface 1501 of lighting device attachment 1300 (e.g., to illuminate a field of view of a rear-facing camera 3520 of a mobile device that views a scene through opening 1412). As shown, a light source 3522 (e.g., an LED flash) of the mobile device may be positioned behind opening 1412. In the embodiments of FIGS. 35A, 35B, and 35C, lighting device attachment 1300 includes a lower portion 1300 having the cavity 1402 configured to receive the mobile device and an upper portion 3501 having the light sources (e.g., one or more light sources 126). The upper portion 3501 is rotatable with respect to the lower portion 3500 from a first position (see, e.g., FIG. 35C) to a second position (see, e.g., FIG. 35A) in which, in the first position, the light sources are configured to illuminate a first scene viewed by a first camera of the mobile device that faces away from a user and is disposed on a first side of the mobile device and in which, in the second position, the light source is configured to illuminate a second scene viewed by a second camera of the mobile device that faces the user and is disposed on an opposing second side of the mobile device.

However, the embodiments of FIGS. 35A, 35B, and 35C are merely illustrative and lighting device attachment 1300 may be provided without a rotating top portion. In various embodiments, opening 1412 may be open or may be provided with a window (e.g., a glass or plastic window through which light can be detected by camera 3520 of the mobile device).

Figure 36:
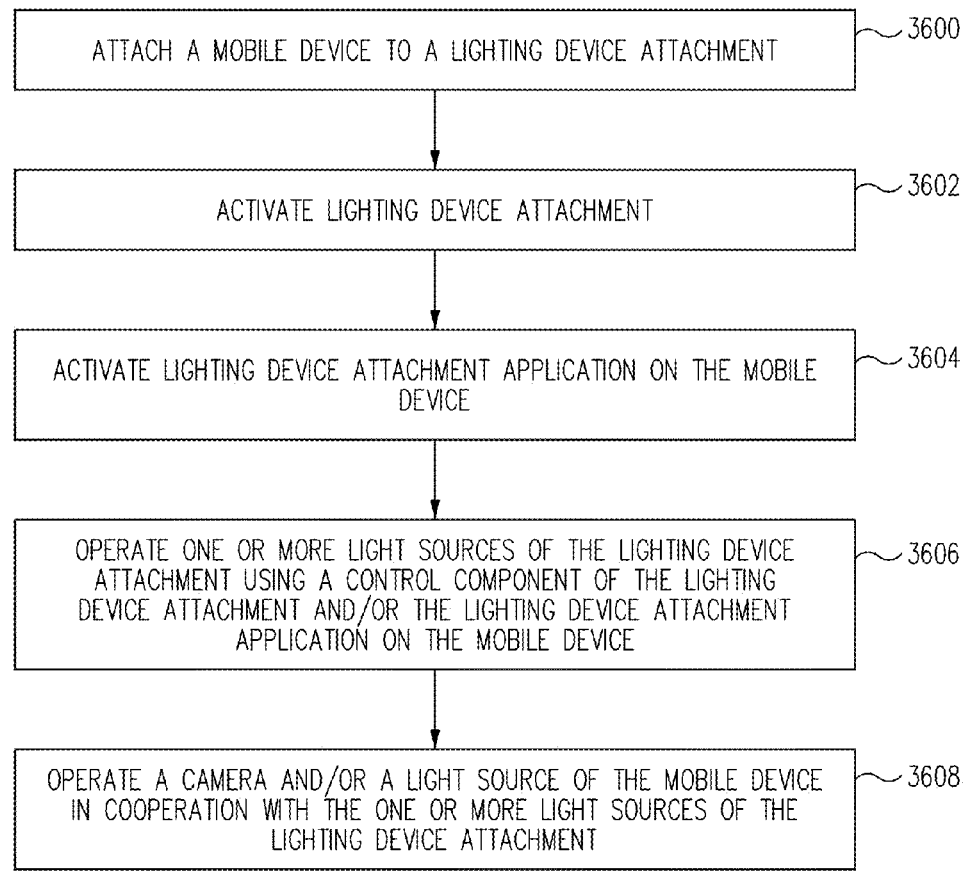
FIG. 36 is a flow chart illustrating a process of operating a lighting device attachment in accordance with an embodiment of the disclosure.
Figure 37:
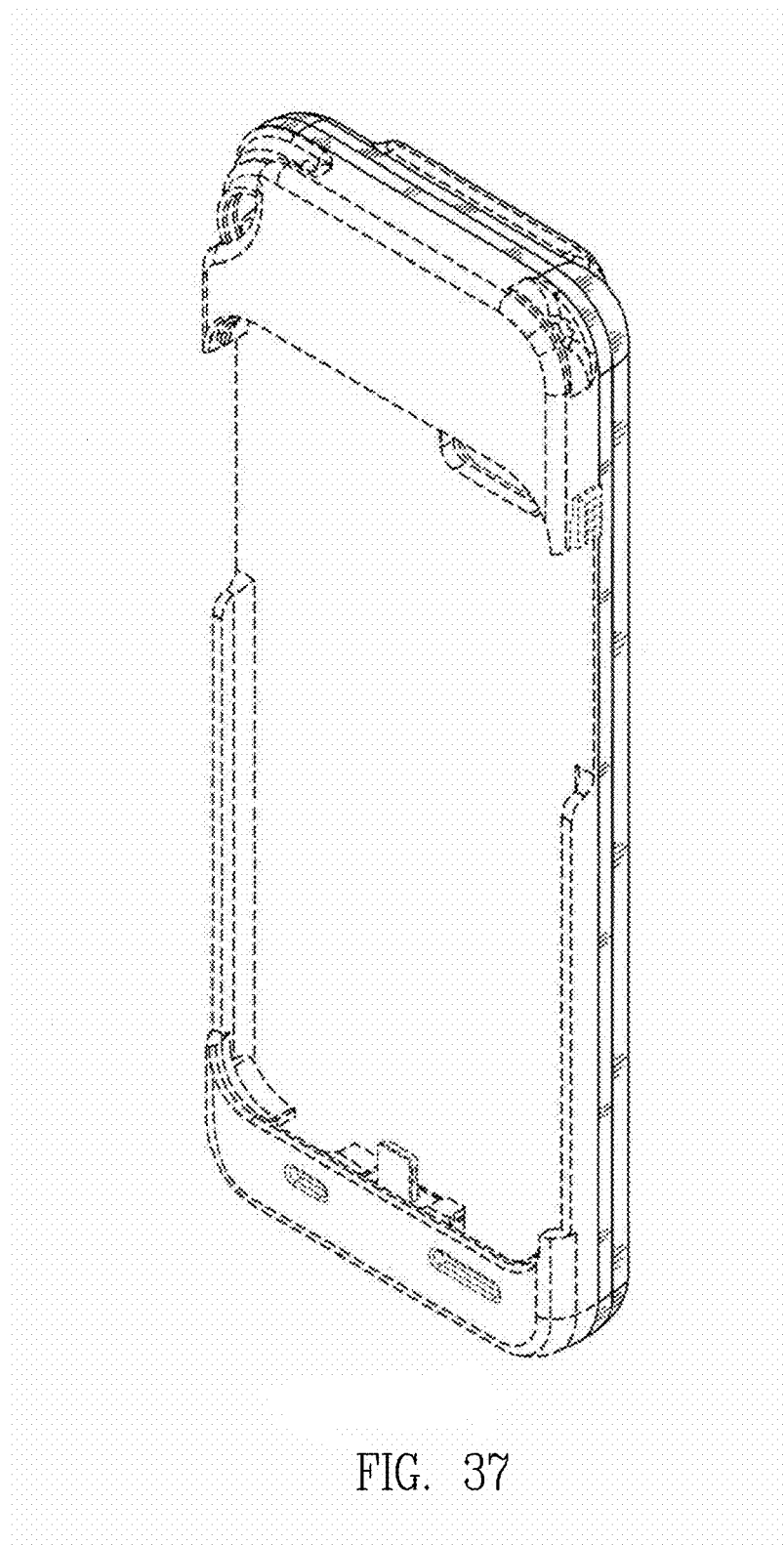
FIG. 37 is a front perspective view of a lighting device showing a design in accordance with an embodiment of the disclosure.
Figure 38:
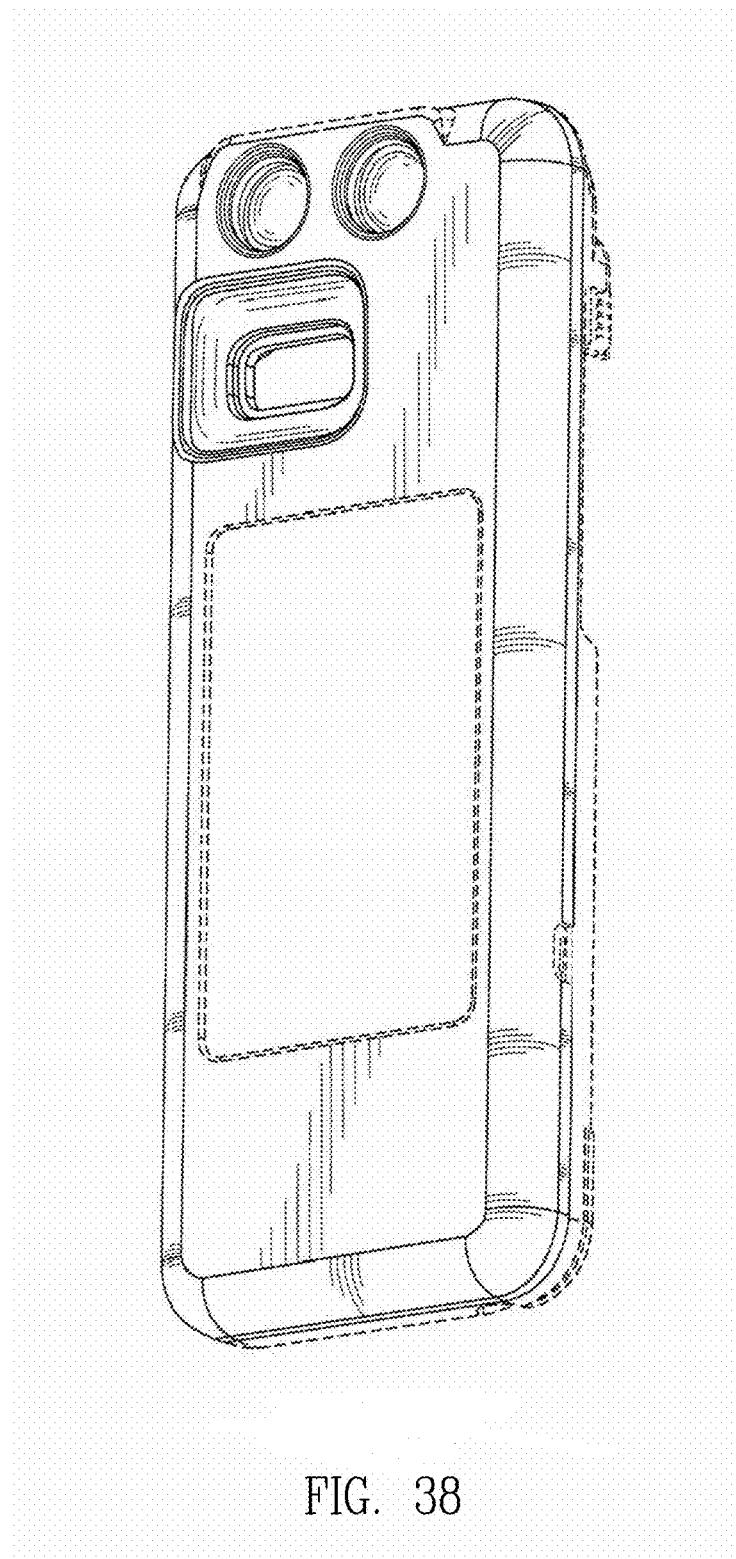
FIG. 38 is a rear perspective view of the lighting device of FIG. 37 in accordance with an embodiment of the disclosure.
Figure 39:
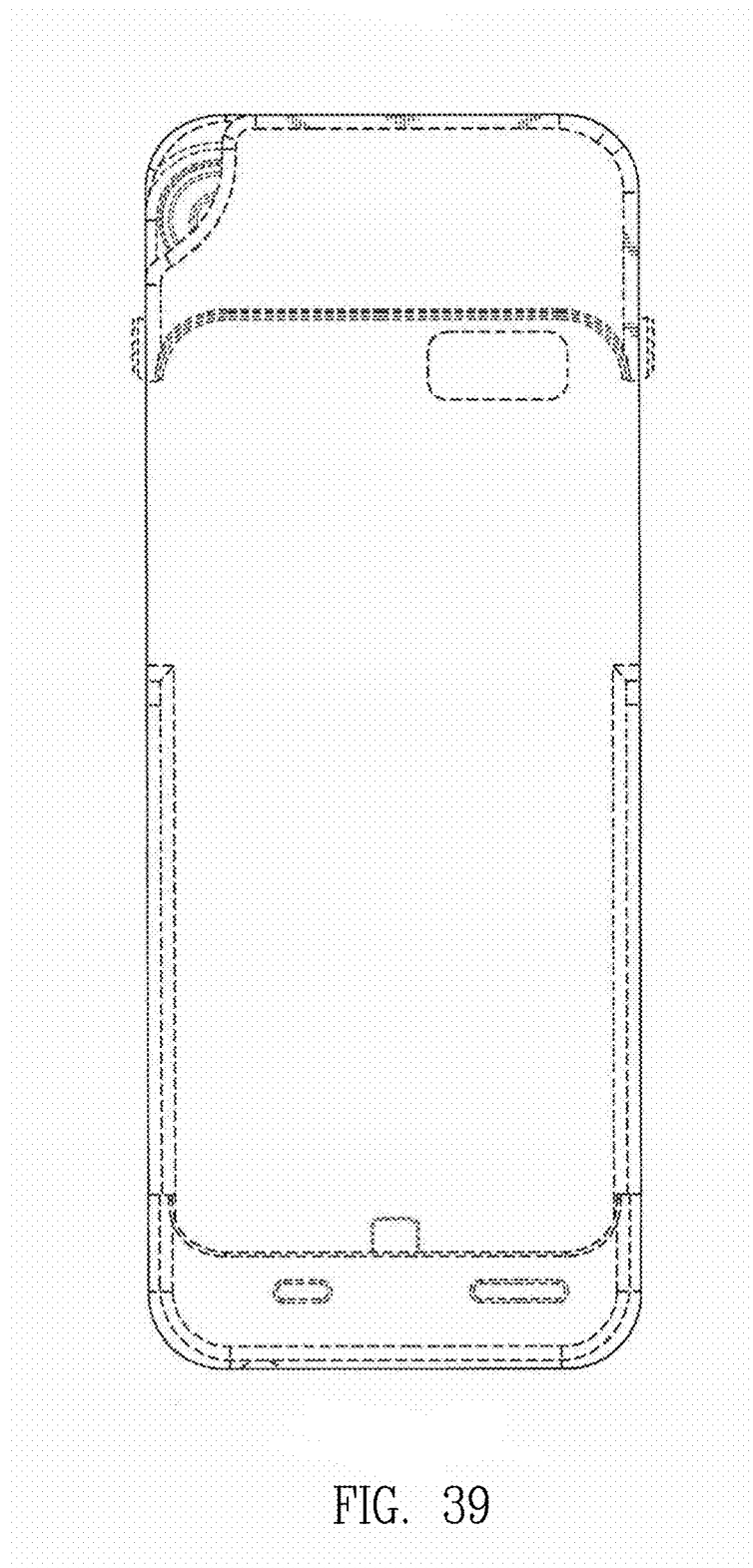
FIG. 39 is a front side elevational view of the lighting device of FIG. 37 in accordance with an embodiment of the disclosure.
Figure 40:
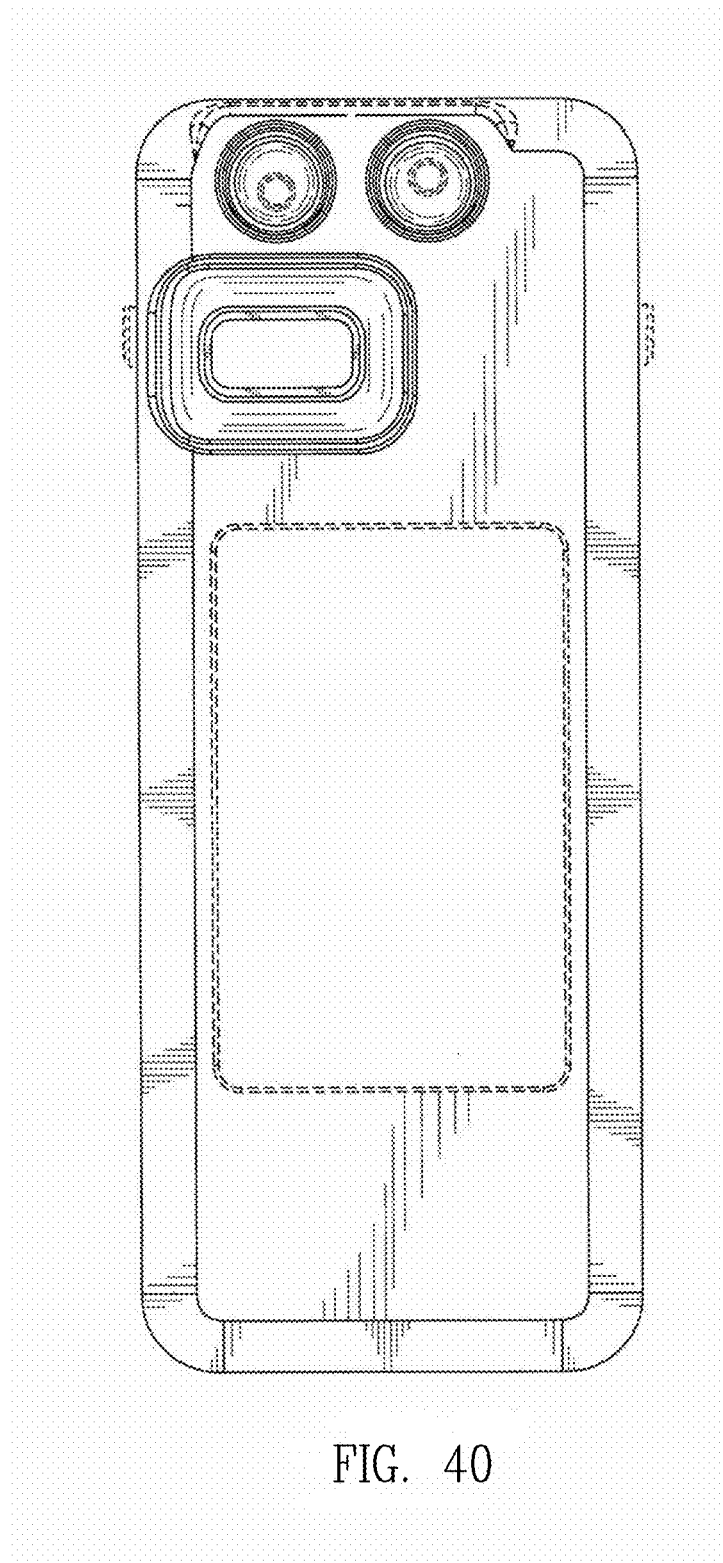
FIG. 40 is a rear side elevational view of the lighting device of FIG. 37 in accordance with an embodiment of the disclosure.
Figure 41:
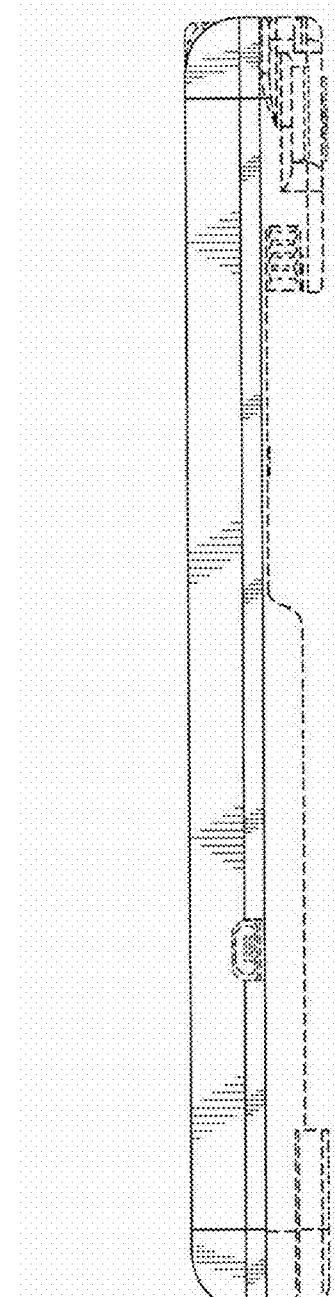
FIG. 41 is a left side elevational view of the lighting device of FIG. 37 in accordance with an embodiment of the disclosure.
Figure 42:
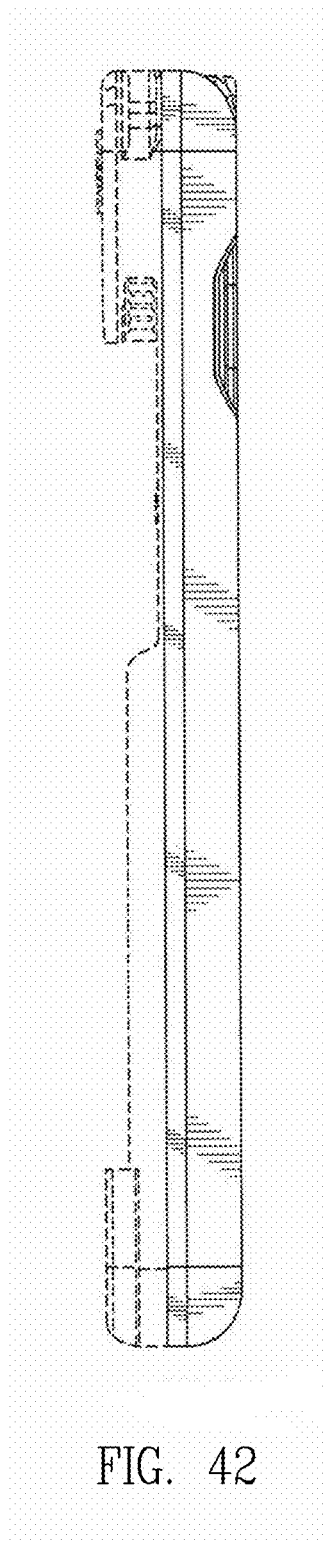
FIG. 42 is a right side elevational view of the lighting device of FIG. 37 in accordance with an embodiment of the disclosure.
Figure 43:
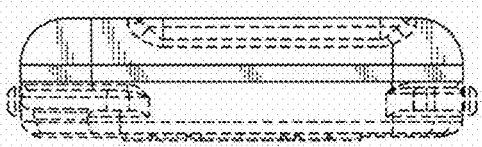
FIG. 43 is a top plan view of the lighting device of FIG. 37 in accordance with an embodiment of the disclosure.
Figure 44:
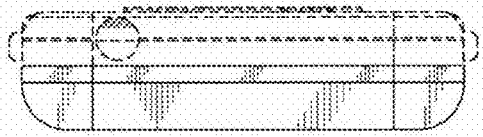
FIG. 44 is a bottom plan view of the lighting device of FIG. 37 in accordance with an embodiment of the disclosure.

FIG. 36 is a flow chart illustrating a process of illuminating a scene such as an area of interest using lighting device attachment 1300 in accordance with an embodiment of the disclosure.

At block 3600, a mobile device such as mobile device 1302 (see, e.g., FIGS. 13A and 13B) may be attached to a lighting device attachment such as lighting device attachment 1300. Attaching the mobile device to the lighting device attachment 1300 may include coupling a port of the mobile device to a connector of the lighting device attachment and/or placing the mobile device within a cavity formed by one or more housing members of the lighting device attachment. Attaching the mobile device to the lighting device attachment may include operating (e.g., by squeezing) one or more engagement members such as engagement members 1310 while inserting the mobile device into the cavity and releasing the engagement members to secure the mobile device within the cavity. When the mobile device is attached to the lighting device attachment, one or more light generating elements such as reflectors with associated light sources as described herein may be aligned with an optical element such as a camera and/or one or more light sources of the mobile device.

At block 3602, the lighting device attachment may be activated. For example, the lighting device attachment may be turned on using a switch or button of the lighting device attachment such as a rotary switch as described herein. Activating the lighting device attachment may include providing power from a battery of the lighting device attachment to one or more light sources at least partially disposed in a reflector such as one of reflectors 112 as described herein.

At block 3604, a lighting device attachment application on the mobile device may be activated. For example, a user may click an icon associated with the application to initiate communication between processing circuitry of the mobile device and processing circuitry of the lighting device attachment (e.g., via the connector of the lighting device attachment).

At block 3606, one or more light sources of the lighting device attachment may be operated using a control component of the lighting device attachment and/or using the lighting device attachment application on the mobile device. For example, power may be increased or decreased to the one or more light sources by rotating a rotary switch such as control component 1304 of (for example) FIG. 13A or by turning or otherwise adjusting a virtual dimmer or other virtual switch displayed on a touchscreen display of the mobile device (or by pressing a real button of the mobile device).

At block 3608, a camera and/or a light source of the mobile device may be operated in cooperation with the one or more light sources of the lighting device attachment. For example, a real or virtual shutter button on the mobile device may be clicked and, in response to the click, the one or more light sources of the lighting device attachment may be flashed or powered on when the camera of the mobile device captures an image or a video stream. In this way, the lighting device attachment may be used to provide a more powerful flash for capturing images and/or a more powerful illuminator for capturing video than a light source of the mobile device. If desired, one or more light sources of the mobile device may optionally be flashed along with the one or more light sources of the lighting device attachment when an image is captured. In one embodiment, prior to capturing the image/video while flashing the one or more light sources of the lighting device attachment, a rotatable top portion of the lighting device attachment containing the one or more light sources may be rotated to align the one or more light sources with a desired camera (e.g., a front-facing or rear-facing camera) of the mobile device.

Figure 45:
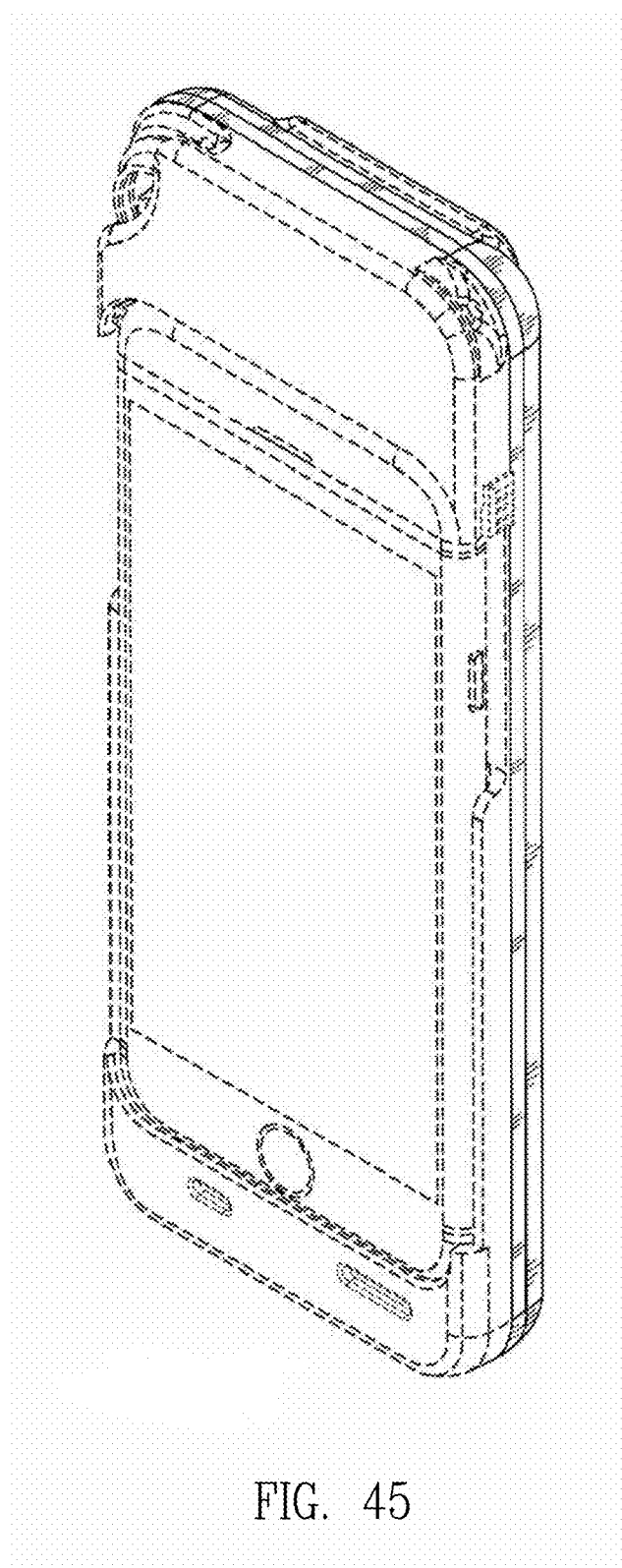
FIG. 45 is a front perspective view of the lighting device of FIG. 37 attached to an example mobile device, wherein the mobile device is disposed within a housing of the lighting device and the housing provides a case for the mobile device in accordance with an embodiment of the disclosure.

FIGS. 37-44 are various views of an example design for a lighting device housing which may be used for various types of lighting devices discussed herein. FIG. 45 is a front perspective view of the lighting device design of FIG. 37, attached to an example mobile device, wherein the mobile device is disposed within a housing of the lighting device and the housing provides a case for the mobile device. Optional features for some embodiments are identified in FIGS. 37-45 by broken lines. For example, in some embodiments, the broken lines in FIGS. 37-45 illustrate environmental features.

Although various embodiments for a lighting device attachment having a housing cavity for receiving a mobile device and an associated electrical connector in the cavity for communicatively coupling the lighting device attachment to the mobile device, these examples are merely illustrative. In other embodiments, lighting device attachment 1300 may include an external coupling member rather than a device-receiving cavity for attaching the mobile device to the lighting device attachment.

Figure 46:
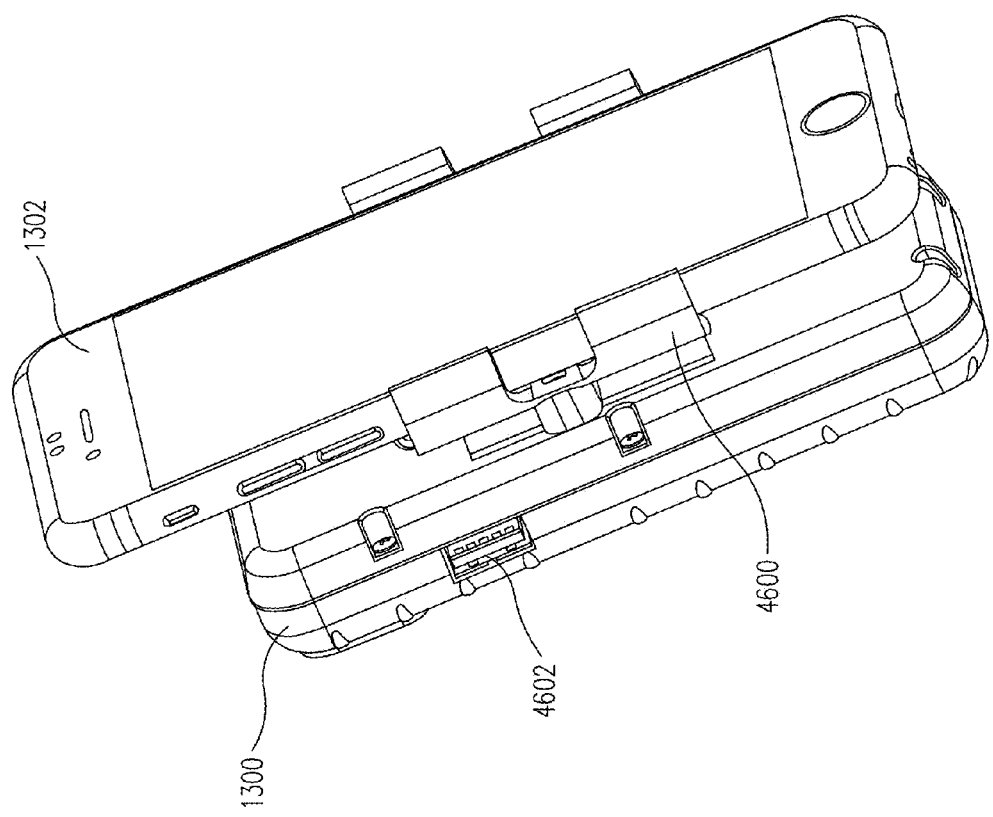
FIG. 46 is a front perspective view of a lighting device attachment having an external coupling member with an attached mobile device in accordance with an embodiment of the disclosure.

FIG. 46 shows a front perspective view of another embodiment of lighting device attachment 1300 implemented with an external coupling member 4600 that attaches mobile device 1302 to the lighting device attachment 1300.

As shown, a port 4602 may be formed in a lighting device attachment having an external coupling member.

Figure 47:
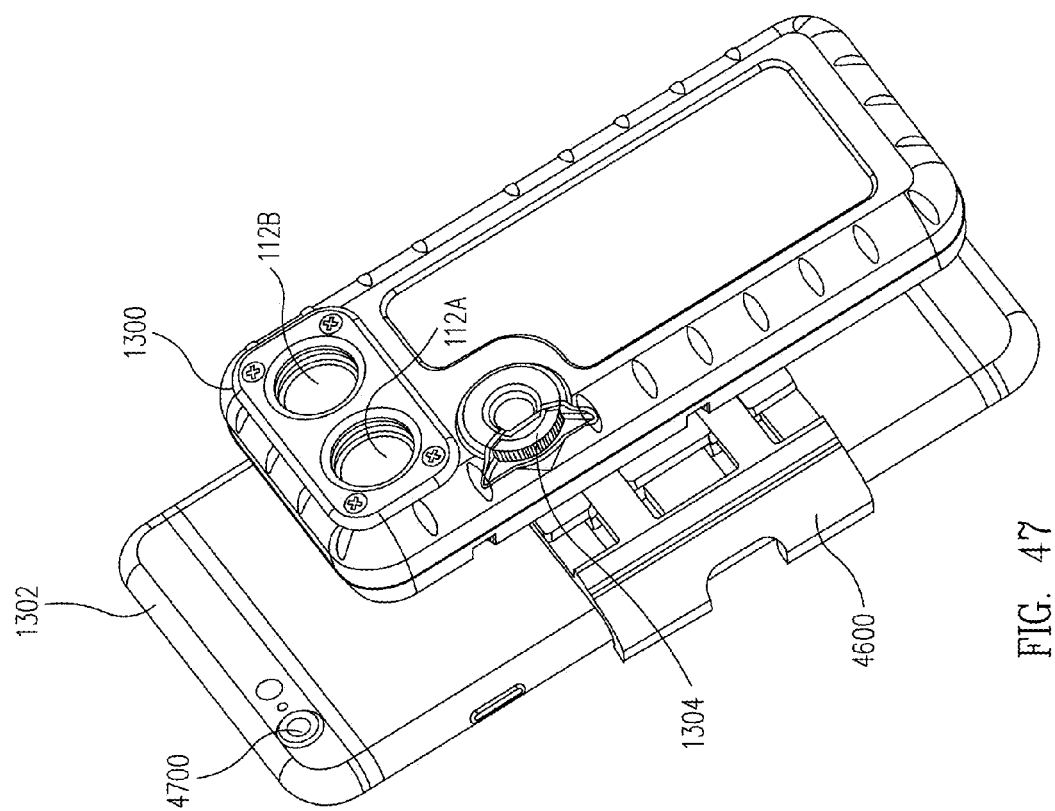
FIG. 47 is a rear perspective view of a lighting device attachment having an external coupling member with an attached mobile device in accordance with an embodiment of the disclosure.

FIG. 47 shows a rear perspective view of the lighting device attachment 1300 and mobile device 1302 of FIG. 46. As shown in FIG. 47, light source components such as reflectors 112A and 112B may be formed on a rear side of lighting device attachment 1300 that is opposite to a front side on which external connector 4600 is attached. In this configuration, reflectors 112A and 112B are configured to project light in the direction of the field of view of a rear-facing camera 4700 of mobile device 1302. However, this is merely illustrative and external coupling member 1304 may be coupled, if desired to the front side of mobile device 1302 (e.g., and aligned to project light onto the field of view of a front facing camera of the mobile device). As shown, control device 1304 may be formed on the same side of lighting device attachment 1300 from which light is projected.

Figure 48:
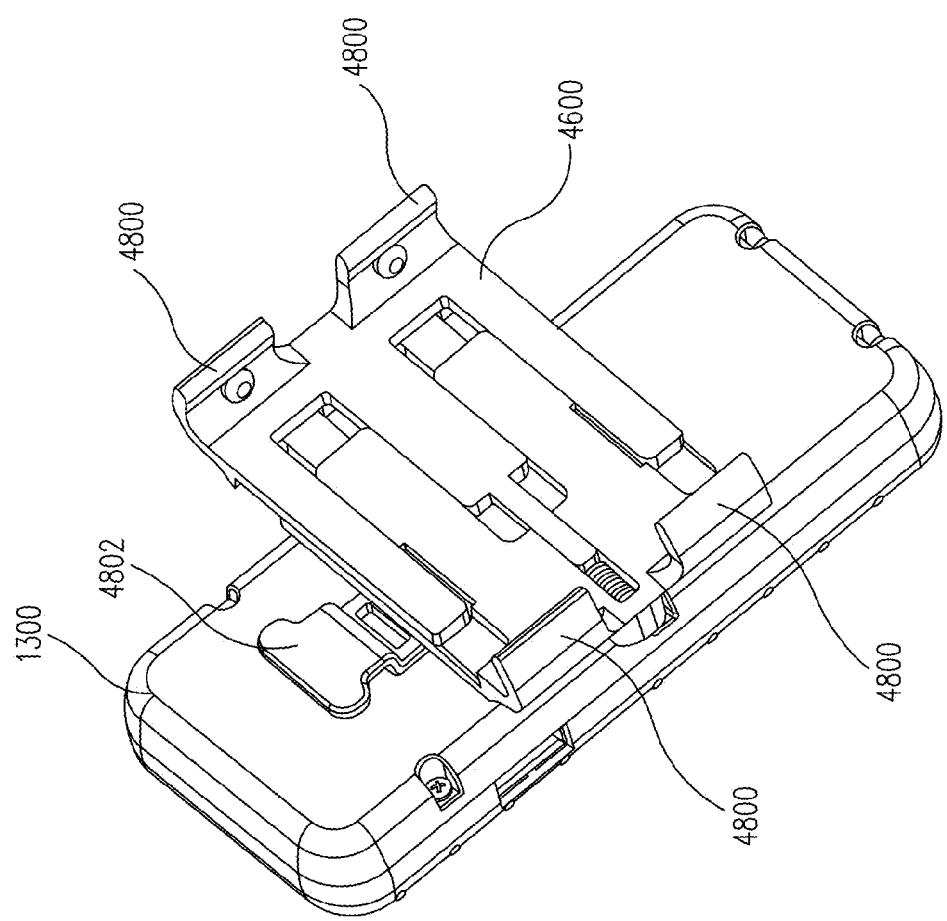
FIG. 48 is a front perspective view of a lighting device attachment having an external coupling member for a mobile device in accordance with an embodiment of the disclosure.

FIG. 48 shows a front perspective view of the lighting device attachment 1300 of FIG. 47 with mobile device 1302 removed to show how external coupling member 4600 may include rounded engagement portions 4800 configured to secure a mobile device to lighting device attachment 1300. As shown, external coupling member 4600 may also include a release member 4802 operable to remove external coupling member 4600 from lighting device attachment 1300.

Figure 49:
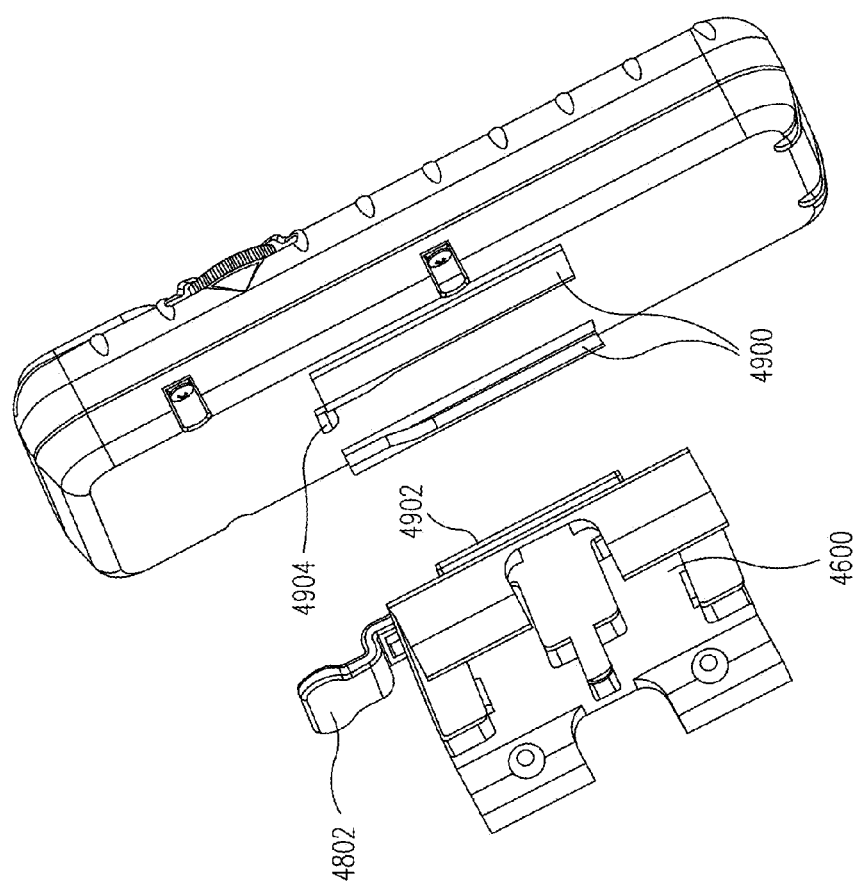
FIG. 49 is a front exploded perspective view of a lighting device attachment having an external coupling member for a mobile device in accordance with an embodiment of the disclosure.
Figure 50:
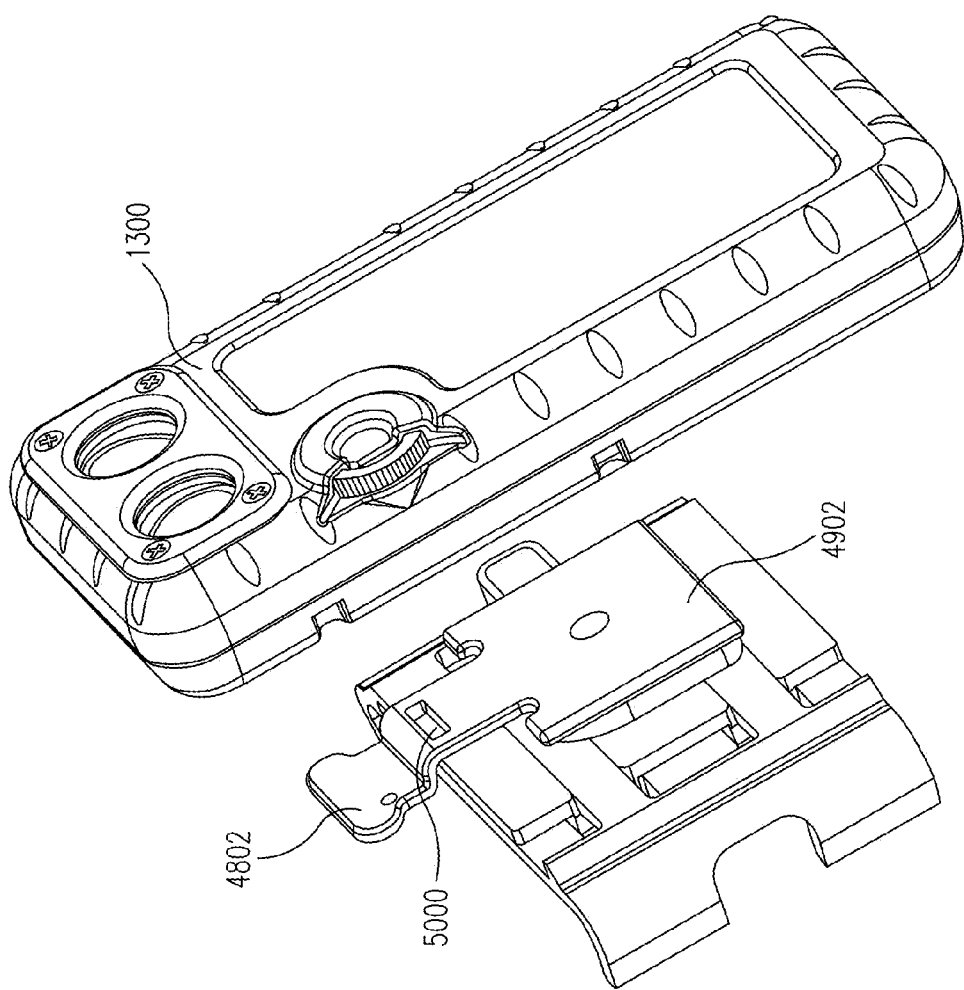
FIG. 50 is a front exploded perspective view of a lighting device attachment having an external coupling member for a mobile device in accordance with an embodiment of the disclosure.

FIG. 49 shows an exploded front perspective view of lighting device attachment 1300 of FIG. 48 in which external coupling member 4600 is removed from lighting device attachment 1300 and showing how lighting device attachment 1300 may include rail guides 4900 on an external surface of the housing of lighting device attachment 1300 that are configured to slidably receive a corresponding rail portion 4902 of external coupling member 4600 to attach external coupling member 4600 to lighting device attachment 1300. Release tab 4802 may then be pressed to allow rail member 4902 to slide out of rail guides 4900 to remove external coupling member 4600 from lighting device attachment 1300. An engagement feature 4904 may also be provided on the external surface of lighting device attachment 1300 for engaging a corresponding opening 5000 on external coupling member 4600 as shown in the rear exploded perspective view of FIG. 50 when release tab 4802 is not pulled away from the surface of lighting device attachment 1300.

Figure 51A:
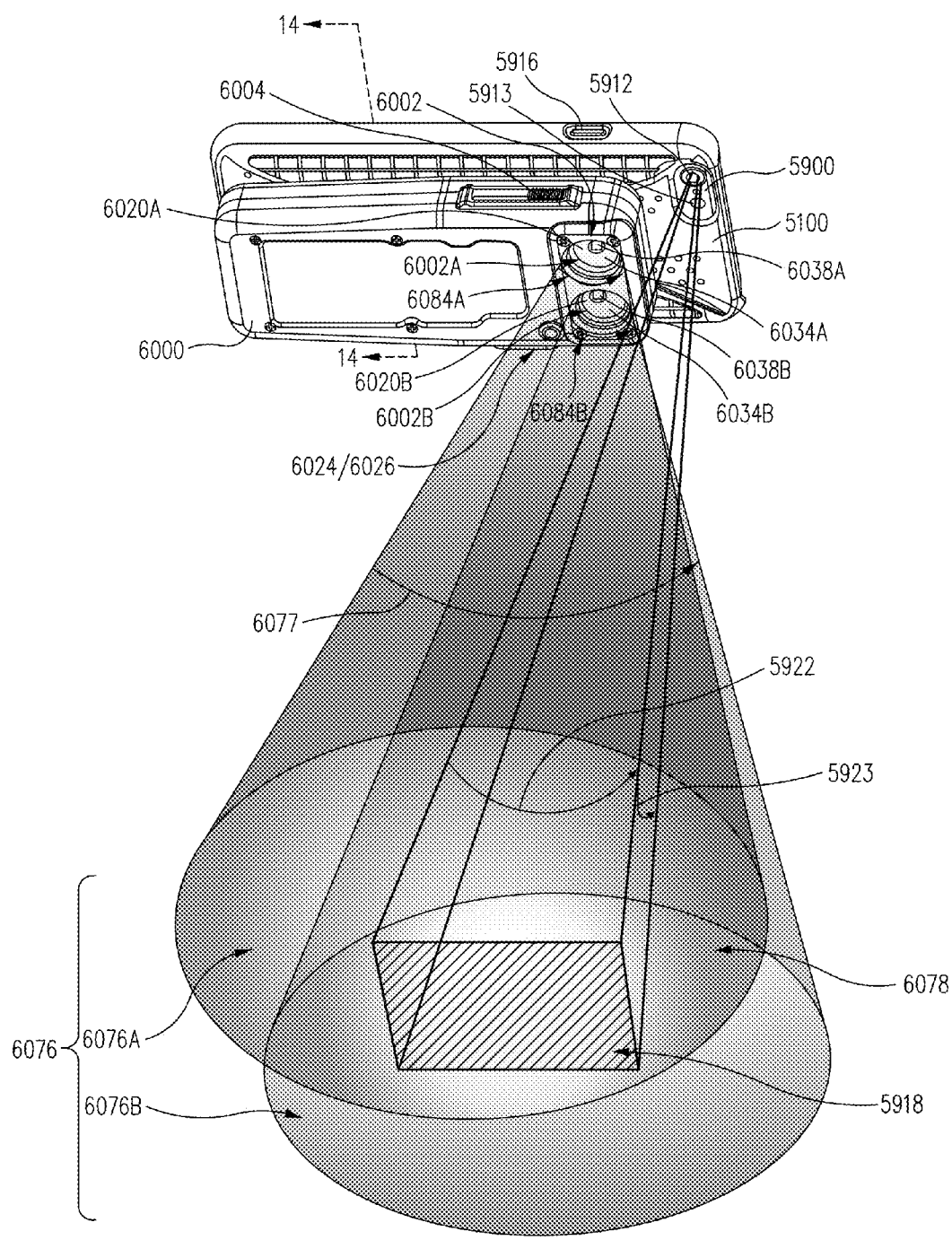
FIG. 51A illustrates a perspective view of an illumination device attached to a mobile device in accordance with an embodiment of the disclosure.
Figure 51B:
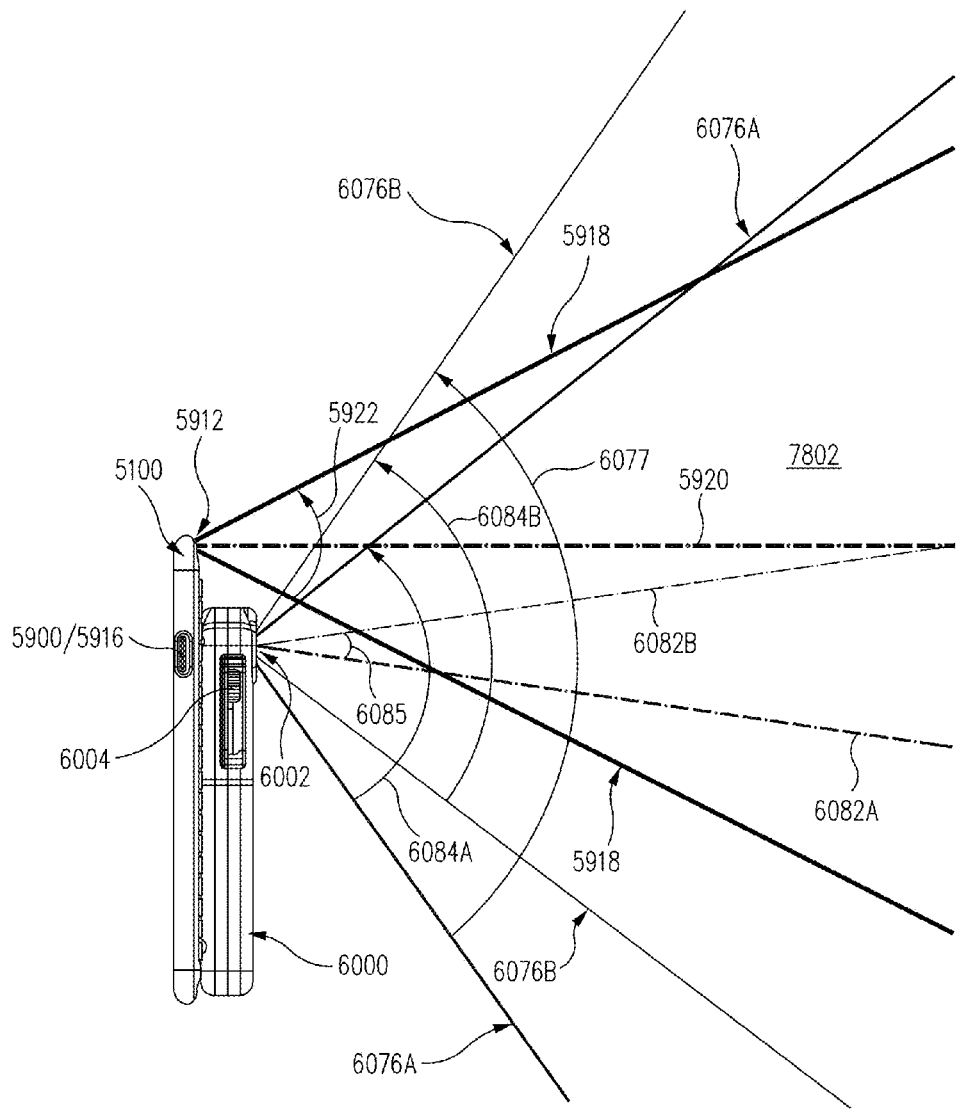
FIG. 51B illustrates an elevational view of the illumination device and mobile device of FIG. 51A in accordance with an embodiment of the disclosure.

In accordance with various techniques further described herein, portable illumination devices may be provided to perform videography and photography with mobile phones and other mobile devices. In some embodiments, such portable illumination devices may be implemented in accordance with the various beam-shaping reflector embodiments, attachment mechanism embodiments, and/or other embodiments discussed herein where appropriate. Referring now to the additional drawings wherein the showings are for purposes of illustrating embodiments of the present disclosure only, and not for purposes of limiting the same, FIGS. 51A-B show the projection of light provided by an illumination device 6000 (e.g., also referred to as a lighting device). FIGS. 51A-B include a perspective view and an elevational view, respectively, of illumination device 6000 attached to a case 5100 with a mobile device 5900 disposed at least partially within case 5100. Illumination device 6000 may be used as a flashlight and/or as an illuminator for videography and still photography when used in conjunction with an electronic device equipped with a built-in camera, such as mobile device 5900. However, as understood by one skilled in the art, illumination device 6000 may be used with various other cameras and is not restricted to use solely with a mobile phone as illustrated in FIGS. 51A-B. For example, illumination device 6000 may be attached to and used with a mobile device such as a laptop computer, tablet computer, video camera, point-and-shoot camera, SLR camera, DSLR camera, as well as with various other types of devices used in photography and videography. Since illumination device 6000 does not block light emitted by the illumination device 5913 (e.g., a flash) that is built into the mobile device 5900, both illumination devices 5913 and 6000 can, if desired, be used together for photography, videography, and/or as a flashlight.

In one or more embodiments, illumination device 6000 may be mechanically coupled to an appropriate mobile device with a compatible mount that may or may not include an electronic coupling to the mobile device (e.g., a hot shoe or a cold shoe) or may be used without being mechanically coupled to the mobile device for off-camera illumination (e.g., an off-camera flash) of scenes being photographed or recorded as videos by the camera in the mobile device. Illumination device 6000 can also be used as a flashlight both when it is coupled to the mobile device and when it is not. Even when illumination device 6000 is not mechanically coupled to the mobile device, it may still be electronically coupled to the mobile device. For example, illumination device 6000 may be connected to mobile device 5900 via a wired connection (e.g., via a USB port and cable) and/or via a wireless connection (e.g., a Bluetooth® connection). In some embodiments, when illumination device 6000 is electronically coupled to mobile device 5900, one or more applications (e.g., apps) on the mobile device may be used to control some or all of the various adjustable characteristics of the illumination (e.g., flux output or color temperature) provided by illumination device 6000.

Camera 5912 of the mobile device 5900 has an optical axis 5920 (see FIG. 51B) that may be substantially perpendicular to a front surface (e.g., a lens) of camera 5912. Camera 5912 has an FOV 5918 having a horizontal angle 5922 (e.g., approximately 50 degrees along the long axis of mobile device 5900) and a vertical angle 5923 (e.g., approximately 30 degrees along the short axis of mobile device 5900) that may define a portion of a real-world scene captured by camera 5912. FOV 5918 may be centered on optical axis 5920, both in the horizontal and vertical directions.

In the example of FIGS. 51A-B, illumination device 6000 includes an optical assembly 6002 with two light sources 6038A-B, two reflectors 6020A-B, and two transparent windows 6034A-B placed in front of the reflectors 6020A-B to protect the reflectors 6020A-B and light sources 6038A-B from contamination or damage due to foreign objects and liquids. In some embodiments, each of the windows 6034A-B may have parallel planar inner and outer surfaces, and the inner and/or outer surfaces of windows 6034A-B may be coated with various materials (e.g., thin-film interference coatings) to reduce reflection losses and/or alter the spectrum of light passing through the windows 6034A-B.

Thus, optical assembly 6002 provides two optical trains 6002A-B. In this regard, optical train 6002A is comprised of light source 6038A, its associated reflector 6020A, and its associated window 6034A, whereas optical train 6002B is comprised of light source 6038B, its associated reflector 6020B, and its associated window 6034B. Although optical assembly 6002 and optical trains 6002A-B have been described in terms of various particular components (e.g., light sources 6038A-B, reflectors 6020A-B, and windows 6034A-B), additional and/or other components may be provided (e.g., optical components such as lenses, optical filters, and/or optical diffusers).

The location of optical assembly 6002 at a proximate end of illumination device 6000 near camera 5912 is merely illustrative. In some embodiments, optical assembly 6002 may be located at an opposing distal end of illumination device 6000 away from camera 5912. In this regard, increasing the distance of optical assembly 6002 from camera 5912 in this manner may reduce the degradation of the quality of imagery captured by the camera due to light that is backscattered into FOV 5918 of camera 5912 from airborne particles illuminated by illumination device 6000 in some embodiments.

Reflectors 6020A-B may receive and reflect light from respective light sources 6038A-B disposed partially within the reflectors, as discussed herein. A large fraction of this reflected light may pass through windows 6034A-B. In addition, a significant fraction of the light emitted by light sources 6038A-B may pass directly through windows 6034A-B without reflecting off of reflectors 6020A-B. The light exiting illumination device 6000 through windows 6034A-B generates a combined output light beam having a characteristic non-rotationally symmetric intensity distribution as a function of vertical and horizontal angular coordinates (e.g., a beam configured to illuminate a scene defined by an FOV of the camera of the mobile device). In some embodiments, reflectors 6020A-B may be implemented, for example, as non-paraboloidal monolithic beam-shaping reflectors and/or in accordance with any of the various embodiments described and/or illustrated in the present disclosure, in U.S. Provisional Patent Application No. 62/104,038 filed Jan. 15, 2015, and/or of U.S. Provisional Patent Application No. 62/169,491, filed Jun. 1, 2015, all of which are hereby incorporated by reference in their entirety.

Optical trains 6002A-B of illumination device 6000 may output flux having the same spectrum or they may output flux having different spectra (e.g., in some embodiments, optical trains 6002A-B may both output white light, but optical train 6002A may produce light having a spectrum characterized by a warmer color temperature than that produced by optical train 6002B).

In some embodiments, using two or more optical trains 6002A-B allows for additional control of the shape of the overall light beam 6076 provided by illumination device 6000. In this regard, the overall light beam 6076 is a combination (e.g., a melding) of individual light beams 6076A-B produced by optical trains 6002A-B.

In some embodiments, reflectors 6020A-B of illumination device 6000 may be aligned along substantially parallel optical axes. In some embodiments, as illustrated in the example embodiments FIGS. 51A-B, reflectors 6020A-B of illumination device 6000 may be aligned along respective non-parallel optical axes 6082A-B (also referred herein as symmetry axes) tilted off axis from each other by a non-zero angle (e.g., an angle of about 15 degrees such as angle 6085 in FIG. 51B) to generate a relatively wider combined light beam 6076.

In some embodiments, an off-axis implementation permits combined light beam 6076 to exhibit oval intensity contours (e.g., see the intensity distribution of FIG. 53A), rather than a beam having substantially circular intensity contours, as is typically produced by a single axisymmetric reflector. The combined beam 6076 having oval intensity contours may be useful in various scenarios, such as lighting for video and still photography, where the desired field of view (e.g., camera FOV 5918) to be illuminated is typically wider in one direction than in the orthogonal direction (e.g., a ratio of 16:9 in some embodiments).

For example, illumination device 6000 may project a directional output light beam 6076 from optical assembly 6002. Beam 6076 may be a product of the combination of individual beam 6076A and individual beam 6076B produced by optical trains 6002A and 6002B, respectively, where the angular beam width 6077 of beam 6076 in at least one meridian (e.g., horizontal) may be greater than the angular beam widths 6084A-B of either of the individual beams 6076A-B. For example, in some embodiments, the angular beam width may correspond to the full angular width at half maximum of the intensity profile of a given beam measured along a straight line parallel to a specified meridian and passing through the beam's peak intensity value.

In one or more embodiments, each of the optical trains 6002A-B may be separately tilted such that the optical axes 6082A-B of the reflectors 6020A-B are not parallel to each other and/or are not parallel to camera optical axis 5920. For example, optical trains 6002A-B may be oriented such that optical axes 6082A-B may have an angular offset of 15 degrees relative to each other in the horizontal meridian, with each axis offset by 7.5 degrees in opposite directions relative to camera optical axis 5920 as shown in FIG. 51B (e.g., one optical train may point 7.5 degrees to the left of the camera optical axis 5920, while the other points 7.5 degrees to the right, thus providing an overall offset of 15 degrees between optical axes 6082A-B). As a result of these angular offsets of the optical trains 6002A-B, light beams 6076A-B may only partially overlap (e.g., denoted by overlap area 6078). In other embodiments, beams 6076A-B may be individually oriented in other directions (e.g., independently oriented in two different directions, where each direction is defined in terms of a horizontal and/or a vertical angular offset relative to camera optical axis 5920).

In one or more embodiments of the present disclosure, the combined intensity distribution produced by the light beams 6076A-B of optical trains 6002A-B may extend significantly beyond the edges of FOV 5918 in one or more directions. For example, in some embodiments, optical assembly 6002 may project an output light beam that extends substantially beyond FOV 5918 in all angular directions, thus compensating for parallax between camera 5912 and optical trains 6002A-B and allowing for use of illumination device 6000 with cameras having varying FOVs (e.g., varying FOV sizes and shapes).

In one or more embodiments, the optical axes 6082A-B of the reflectors 6020A-B are oriented at different angles while the light sources 6038A-B and/or windows 6034A-B all remain unfilled. As a result, costs may be reduced and manufacturability may be improved by allowing all light sources 6038A-B to be mounted on a single flat surface and/or a single common window to be used for all the optical trains 6002A-B.

In some embodiments, light sources used in a single illumination device are identical. Alternatively, in other embodiments, light sources may be implemented with different optical output characteristics in a single illumination device. For example, two or more light sources with different output spectra may be used. By controlling the flux output of each of the multiple light sources, the spectrum of the melded output beam, as well as the total flux output, may be continuously adjusted (e.g., during operation of the illumination device). This technique allows, for example, the color temperature of the white-light beam produced by a single illumination device to be adjusted over a useful range, thereby providing an effective means for altering color casts in still photographs and videos.

In some embodiments light sources may be implemented as LEDs, however other implementations are also contemplated (e.g., incandescent light bulbs, tungsten-halogen light bulbs, fluorescent light bulbs, high-intensity discharge light bulbs, or any other singular or plural light source devices). Although two light sources 6038A-B are illustrated, illumination device 6000 may be implemented with one, two, or more light sources. In embodiments where illumination device 6000 includes more than one light source, the optical trains 6002A-B may provide light having the same or different spectra. In embodiments where different spectra are provided, the desired spectrum to be produced by each optical train may be obtained by selecting an appropriate light source having substantially the desired spectrum. In some embodiments, coatings on the reflectors 6020A-B, windows 6034A-B, and/or other optical components inserted into the optical trains 6002A-B could be used to alter the spectrum of the light emitted by the light sources, thereby producing a desired output spectrum.

As depicted in FIGS. 51A-B, in one or more embodiments of the present disclosure, when illumination device 6000 is mechanically coupled to mobile device 5900, the exit pupils of optical trains 6002A-B (e.g., corresponding to the outside diameter of reflectors 6020A-B and/or windows 6034A-B from which light beams 6076A-B project in some embodiments) may be separated from the entrance pupil of the camera 5912 (e.g., corresponding to the outside diameter of a lens or window of camera 5912 through which light is received from an externally imaged scene) by distances that are substantially larger than the separation between the entrance pupil of the camera 5912 and the exit pupil of built-in illumination device 5913 (e.g., the outside diameter of illumination device 5913 from which light is projected). In some embodiments, the distances separating the exit pupils of optical trains 6002A-B may be on the order of the largest spatial dimension of the mobile device 5900. Making these separation distances that large or larger has the advantage of significantly reducing the degradation of the quality of imagery captured by the camera due to light that is backscattered into the FOV 5918 of the camera 5912 from airborne particles (e.g., dust) illuminated by illumination device 6000.

As shown in FIG. 51B, the combined output beam 6076 from optical assembly 6002 may partially or substantially intersect FOV 5918 of camera 5912 as defined by region 7802. Optical assembly 6002 may provide illumination that a conventional illumination device 5913 is incapable of providing. For example, in some embodiments, one or more control interfaces (e.g., one or more user controls 6004) may be used to adjust the output flux levels of light beams 6076A-B produced by optical trains 6002A-B simultaneously or independently from one another, thus allowing a user to obtain a specific desired illumination level and specific desired illumination color temperature for a scene.

Figure 52:
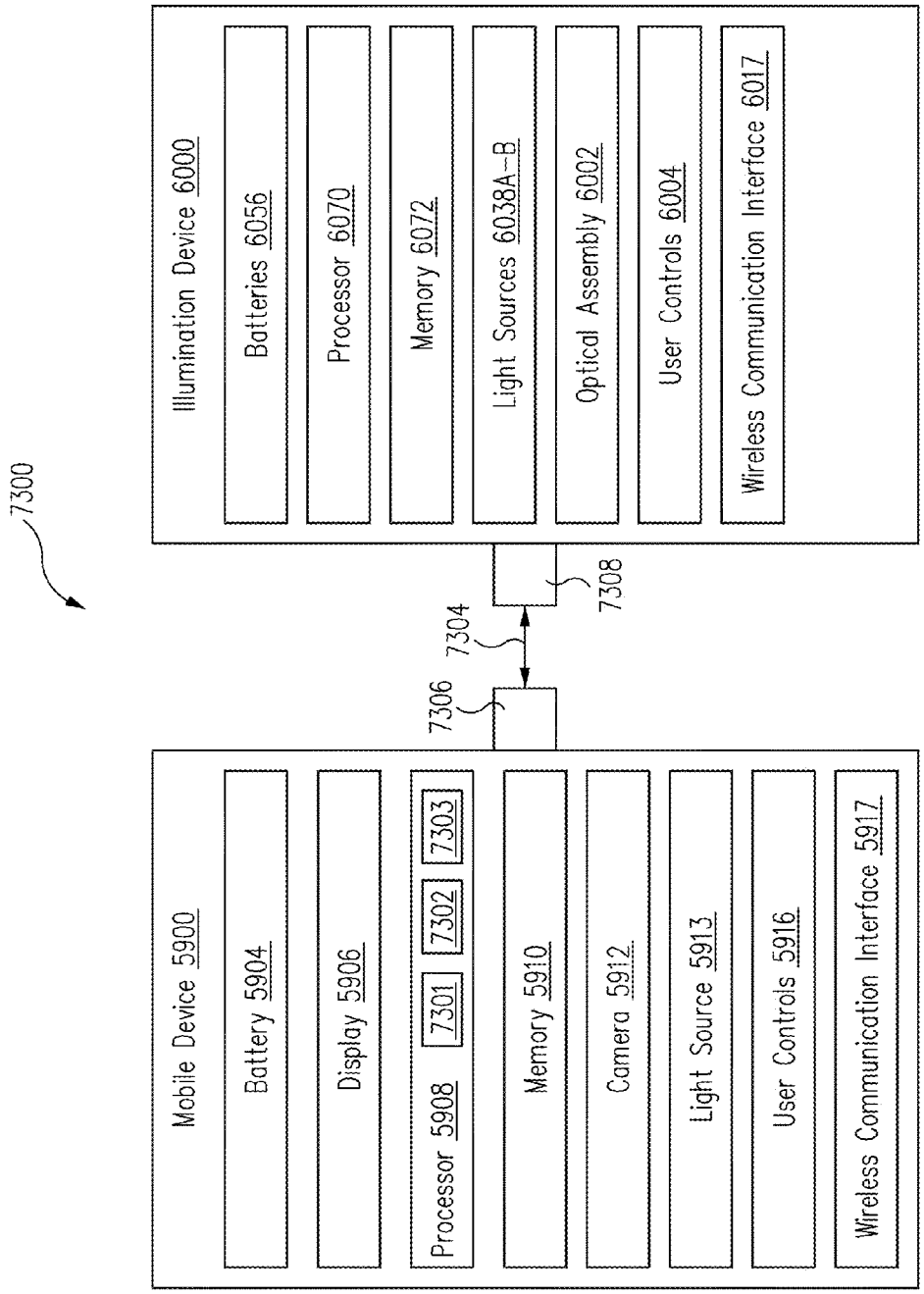
FIG. 52 illustrates a block diagram of a system that includes an illumination device and a mobile device in accordance with an embodiment of the disclosure.

FIG. 52 is a block diagram of a system 7300 that includes illumination device 6000 and mobile device 5900. As shown in FIG. 52, illumination device 6000 may include coupling member 7308 for coupling mobile device 5900 to illumination device 6000. Coupling member 7308 may be a mechanical coupling member (e.g., engagement members 6008 of FIG. 60) and/or an electrical coupling member (e.g., a USB port 6024 or micro-USB port 6026 of FIG. 61 and/or other electrical connections discussed herein). In some embodiments, coupling member 7308 may be an external coupling member part of the outer surface of the housing of illumination device 6000 that is configured to be received and mechanically secured to mobile device 5900 via an attachment mechanism (e.g., mobile device case 5100). In another embodiment, coupling member 7308 may be an electrical connector disposed in a cavity in a housing of illumination device 6000. For example, illumination device 6000 may connect via USB port 6024 or micro-USB port 6026 (shown in FIG. 61) to mobile device 5900. In some embodiments, USB ports 6024/6026 may be selectively protected by a cover 6006 (shown in FIGS. 65-67). In some embodiments, such an electrical connection may provide a way for both data and electrical power to be exchanged between the mobile device 5900 and illumination device 6000. For example, operation of illumination device 6000 may be controlled by mobile device 5900, and/or vice versa. In some embodiments, such an electrical connection may be used to recharge battery 5904 in mobile device 5900 by one or more batteries 6056 of illumination device 6000.

In some embodiments, batteries 6056 may be used to power light sources 6038A-B and/or other electrical components of illumination device 6000. Moreover, by providing one or more batteries 6056 within illumination device 6000, light sources 6038A-B and/or other electrical components of illumination device 6000 may receive electrical power from batteries 6056 for long periods of time without draining battery 5904 of mobile device 5900.

Referring again to FIG. 52, mobile device 5900 may have a coupling member 7306, such as a mechanical attachment mechanism (e.g., case 5100 with ribs 5124 and grooves 5114 or a cold shoe mount). In another embodiment, mobile device 5900 and illumination device 6000 may also be coupled electrically (e.g., via a port such as a 30-pin connector port or a "Lightning" port or a hot shoe mount) that mechanically and/or electrically couples to illumination device 6000. In some embodiments, illumination device 6000 may be communicatively separate from mobile device 5900 (e.g., mobile device 5900 may be attached or unattached mechanically and/or electrically to illumination device 6000 and both devices may be operated separately and independently without any electrical coupling between the two). In other embodiments, mobile device 5900 may send and/or receive electrical power and/or communications signals to and/or from illumination device 6000 via coupling members 7306 and 7308 (e.g., as indicated by arrows 7304). In this respect, coupling member 7306 of mobile device 5900 may form a connector interface (e.g., a wired communication interface) including, for example, circuitry such as one or more processors, integrated circuits, ports, or other circuitry for managing communications with illumination device 6000. Coupling member 7308 may form a connector interface (e.g., a wired communication interface) for illumination device 6000 including circuitry configured to manage communications with mobile device 5900 and/or other devices, and/or to route power from its batteries 6056 to battery 5904 (e.g., a lithium ion or other battery) for charging battery 5904.

As shown, mobile device 5900 and illumination device 6000 may include wireless communication interfaces 5917 and 6017, respectively, which may be implemented with appropriate circuitry such as one or more processors, integrated circuits, ports, antennas, or other circuitry for managing wireless communications between mobile device 5900 and illumination device 6000 (e.g., to pass appropriate control signals or data therebetween using Wi-Fi, Bluetooth®, and/or other communication techniques).

As shown in FIG. 52, illumination device 6000 may include other components such as processor 6070, memory 6072, one or more light sources such as light sources 6038A-B, one or more optical elements such as optical assembly 6002 as discussed, and user controls 6004 (e.g., one or more buttons, switches, sliders, rotary encoders, and/or other control mechanisms). In some embodiments, such a user control 6004 may be provided as a sliding dimmer switch as shown in FIGS. 51A-B. In this regard, user control 6004 may be configured to vary the intensity of light provided by optical assembly 6002 based on Hall effect principles. Other user controls 6004 using the same or different operating principles may be used.

Processor 6070 may be implemented, for example, as a microcontroller, microprocessor, a Field Programmable Gate Array (FPGA), an Application Specific Integrated Circuit (ASIC), and/or any appropriate combination of these or other types of devices.

Memory 6072 (e.g., implemented as any appropriate type of volatile and/or non-volatile memory) may be used to store instructions and/or data. For example, in some embodiments, memory 6072 may be implemented as a non-transitory machine-readable medium storing various instructions which may be executed by processor 6070 to perform various operations such as receiving and processing operating instructions from mobile device 5900. In some embodiments, such a machine-readable medium may be provided within processor 6070 itself (e.g., as firmware and/or otherwise) and/or external to processor 6070. Processor 6070 may include processing circuitry disposed within the housing of illumination device 6000 and configured to receive control signals from the mobile device 5900 via the coupling member 7308 and to operate the light sources 6038A-B in response to the control signals. The control signals may be generated by an application program interface (API) 7301 running on processor 5908 of mobile device 5900 based on user input.

As discussed, light sources 603 8A-B may be implemented using any desired number or types of light sources. As also discussed, light sources 6038A-B may generate light of the same or different spectra (e.g., having the same or different wavelengths). In some embodiments, one or more optical filters may be provided (e.g., within or external to light sources 6038A-B) to modify the spectrum of light emitted from illumination device 6000. Thus, in various embodiments, light beams 6076A-B may exhibit wavelength ranges that overlap with each other completely, partially, or not at all. In various embodiments, the wavelength ranges may comprise electromagnetic radiation in any desired portions (e.g., subsets) of the spectral regions ranging from the extreme ultraviolet (UV) to the far infrared (IR) (e.g., wavelengths from approximately 10 nm to approximately 106 nm) and/or the spectral regions of the visible-light band (e.g., wavelengths ranging from approximately 390 nm to approximately 770 nm). In various embodiments, such wavelength ranges may be determined by light sources 6038A-B themselves and/or other portions of optical trains 6002A-B including one or more of light sources 6038A-B, reflectors 6020A-B, windows 6034A-B, and/or other optical components such as lenses, optical filters, and/or optical diffusers).

As discussed, illumination device 6000 may include reflectors 6020A-B associated with light sources 6038A-B. For example, light sources 6038A-B may be disposed at least partially within corresponding reflectors 6020A-B that shape light generated by light sources 6038A-B into light beams 6076A-B that are projected from illumination device 6000 to provide a combined light beam 6076 onto an area or two-dimensional angular zone of interest such as a scene viewed within the FOV of a camera 5912 of mobile device 5900.

In some embodiments, reflectors 6020A-B may be implemented in the same or similar manner to provide similarly shaped light beams 6076A-B. In some embodiments, reflectors 6020A-B may be implemented differently from each other to provide more degrees of freedom in creating desired shapes for combined light beam 6076.

As shown in FIG. 52, mobile device 5900 may include various components such as battery 5904, display 5906 (e.g., a liquid crystal display or a light-emitting diode display), processor 5908, memory 5910, one or more cameras such as camera 5912 (e.g., rear-facing camera and/or a forward-facing camera), light source 5913 (e.g., one or more LED light sources), user controls 5916 (e.g., buttons, switches, and/or touchscreen components such as portions of display 5906 when implemented as a touchscreen), and/or other components as commonly implemented in mobile devices such as smartphones (e.g., positioning circuitry such as global-positioning system circuitry (GPS), one or more accelerometers, gyroscopes, compasses, etc.).

Processor 5908 may be implemented, for example, as a microcontroller, microprocessor, a Field Programmable Gate Array (FPGA), an Application Specific Integrated Circuit (ASIC), and/or any appropriate combination of these or other types of devices.

Memory 5910 (e.g., implemented as any appropriate type of volatile and/or non-volatile memory) may be used to store instructions and/or data. For example, in some embodiments, memory 5910 may be implemented as a non-transitory machine-readable medium storing various instructions which may be executed by processor 5908 to perform various operations such as operating an illumination device application 7302 (e.g., running on processor 5908 and interfacing with API 7301) for controlling illumination device 6000 (e.g., for operating light sources 6038A-B to flash, turn on, turn off, or increase or decrease in brightness). In some embodiments, such a machine-readable medium may be provided within processor 5908 itself (e.g., as firmware and/or otherwise) and/or external to processor 5908.

Various controls may be used to operate light sources 6038A-B (e.g., to turn on/off, increase or decrease in intensity, go into a strobe mode, and/or perform other operations). In some embodiments, light sources 6038A-B may controlled by user controls 6004 of illumination device 6000 itself. In some embodiments, light sources 6038A-B may be controlled by mobile device 5900 (e.g., by user controls 5916 of mobile device 5900 providing signals communicated to illumination device 6000 and/or an application 7302 running on processor 5908 of mobile device 5900 providing such signals).

In some embodiments, manipulation of user controls 6004 may cause processor 6070 of illumination device 6000 to communicate signals to processor 5908 of mobile device 5900 to cause an operating system 7303 and/or application 7302 running on processor 5908 to display status information to the user (e.g., on/off status, light intensity, strobe duration, and/or other information). Additionally, the operating system 7303 and/or application 7302 may receive user inputs from user controls 5916 of mobile device 5900 and send appropriate control signals to processor 6070 of illumination device 6000 to control light sources 6038A-B (e.g., in addition to and/or overriding user controls 6004).

In some embodiments, illumination device 6000 and mobile device 5900 may communicate in accordance with a published or downloadable API 7301. The API 7301 may be an open API, thereby allowing third parties to publish software that can be downloaded on a mobile device to control the light generated by illumination device 6000 and/or one or more light sources 5913 in the mobile device. For example, an API 7301 may be provided that generates stop-motion strobe photography functionality, using the mobile device's camera 5912 capabilities in conjunction with timed strobing of the light sources 6038A-B in the illumination device 6000.

In some embodiments, an illumination device API 7301 on mobile device 5900 may grant software of the mobile device 5900 the ability to turn the light sources 6038A-B of the illumination device 6000 on and off, adjust the output flux level of each light source, schedule or time durations of light being on with light being off (e.g., strobing or signaling), and/or ramp the peak intensity from one value to another (as examples).

These various control methodologies may be applied to a variety of different types of mobile devices and illumination devices to confer mobile device capabilities on an illumination device. In one example use case, a GPS-controlled illumination device may be provided in which built-in GPS functionality of a mobile device can be accessed and used to activate or deactivate the light source(s) of an attached illumination device based on a location of the mobile device and illumination device (e.g., a GPS-determined location provided by the mobile device's GPS circuitry). In another example use case, a motion-controlled illumination device may be provided in which an accelerometer or other motion-detection circuitry in a mobile device that is attached to the illumination device can provide information about the motion of the mobile device and illumination device. The information can be provided to processing circuitry in the mobile device or the illumination device which, in response to the motion information, may cause the light sources of the illumination device to react (e.g., turn on, turn off, flash, strobe, increase or decrease in brightness, etc.) based on the orientation, rate, direction, or pattern of movement. In another example use case, a network-controlled illumination device may be provided in which a mobile device that is attached to an illumination device acts as a device receiving network signals via the internet, Bluetooth® or other communications circuitry or protocols that then cause processing circuitry in the mobile device or the illumination device to react to those signals and operate the light sources of the illumination device accordingly (e.g., to turn on, turn off, flash, strobe, increase or decrease in brightness, etc. of the light sources in response to the received network signals). For example, the received network signals may be generated by a remote user such as a parent of a child in possession of the mobile device and illumination device (e.g., to help locate the child or communicate with the child) or by a user of the mobile device and illumination device (e.g., to activate the light source to help locate a missing phone or capture an image remotely).

Figure 53A:
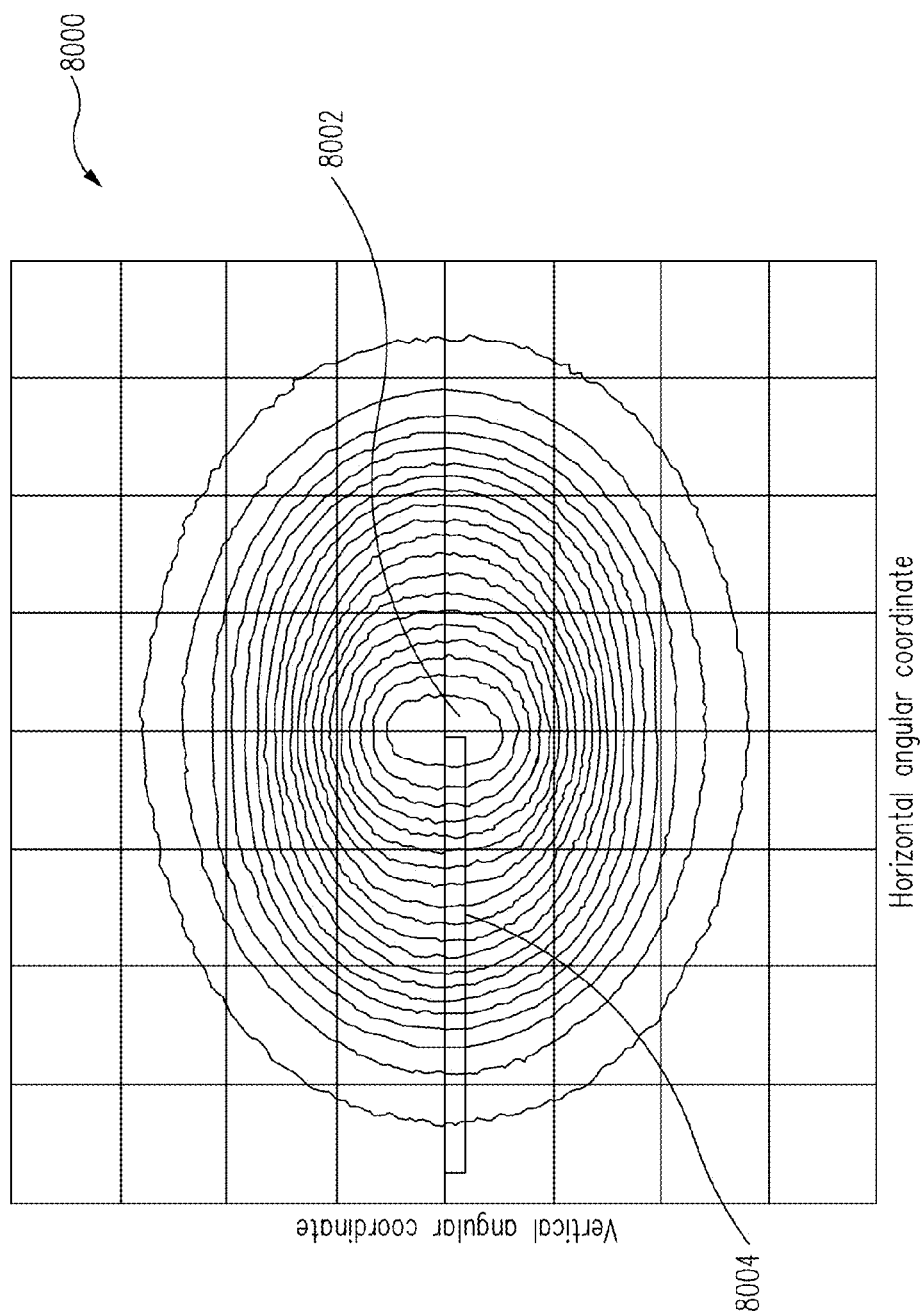
FIG. 53A illustrates a contour plot corresponding to an intensity distribution as a function of horizontal and vertical angular coordinates produced by an illumination device in accordance with an embodiment of the disclosure.

FIG. 53A illustrates a contour map of intensity as a function of horizontal and vertical angular coordinates produced by combining two light beams (e.g., beams 6076A-B) offset by a 15-degree angle relative to each other. The oval-shaped distribution may be created by, for example, an output beam including two overlapping, melded beams of light (e.g., beam 6076). The individual beams 6076A-B may have a common spectrum or different spectra, and the two individual beams 6076A-B may have the same or different angular intensity distributions. In an embodiment, the intensity of the output beam 6076 may be greatest at a centrally located portion 8002 of an intensity distribution 8000. A portion 8004 may represent an angular zone in which the intensity values become progressively lower as a function of angular separation from central intensity peak 8002.

Figure 53B:
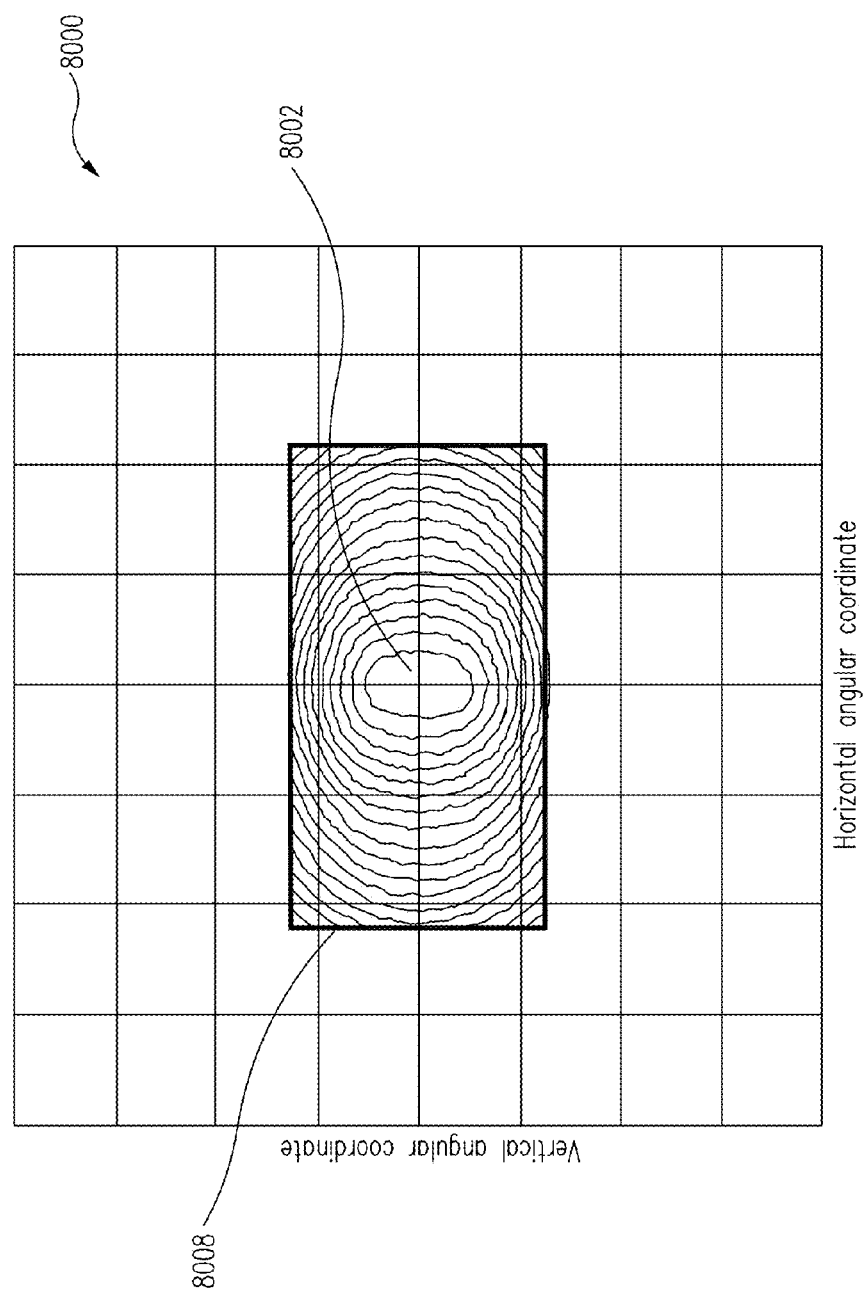
FIG. 53B illustrates a contour plot corresponding to an intensity distribution as a function of horizontal and vertical angular coordinates produced by an illumination device where all intensity values outside the angular region corresponding to the FOV of the camera of a mobile device have been set equal to zero in accordance with an embodiment of the disclosure.

FIG. 53B shows intensity distribution 8000, but with all intensity values set equal to zero outside rectangular angular region 8008 corresponding to the FOV 5918 of the camera 5912 of a mobile device (e.g., FOV 5918 of FIG. 51A). The angular intensity distribution produced by the illumination device 6000 extends substantially beyond the boundaries of angular FOV region 8008, ensuring substantial illumination is received over the entire FOV 5918 of the camera 5912.

Figure 54A:
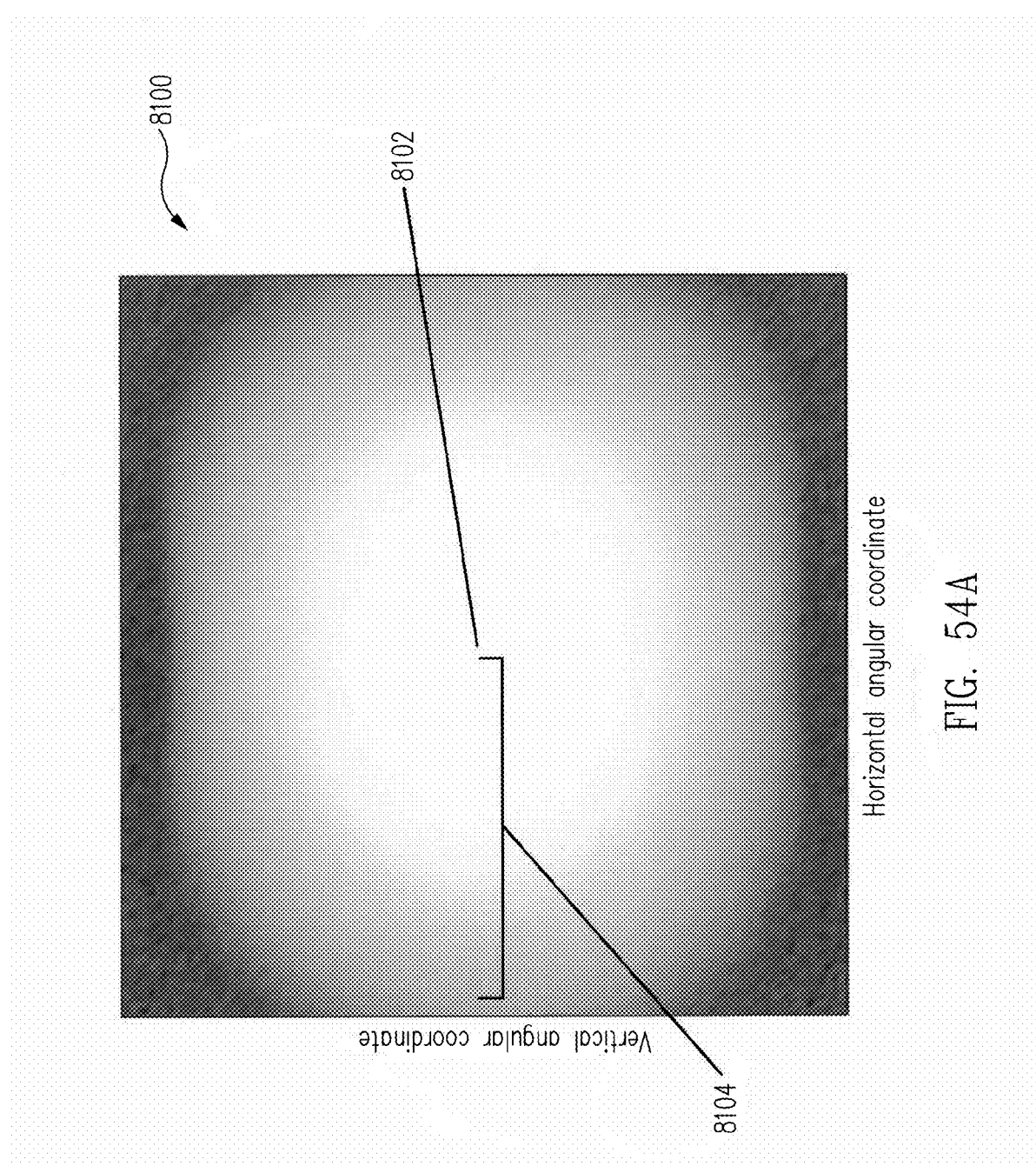
FIG. 54A illustrates a gray-scale plot corresponding to the logarithm of an intensity distribution as a function of horizontal and vertical angular coordinates produced by an illumination device in accordance with an embodiment of the disclosure.
Figure 54B:
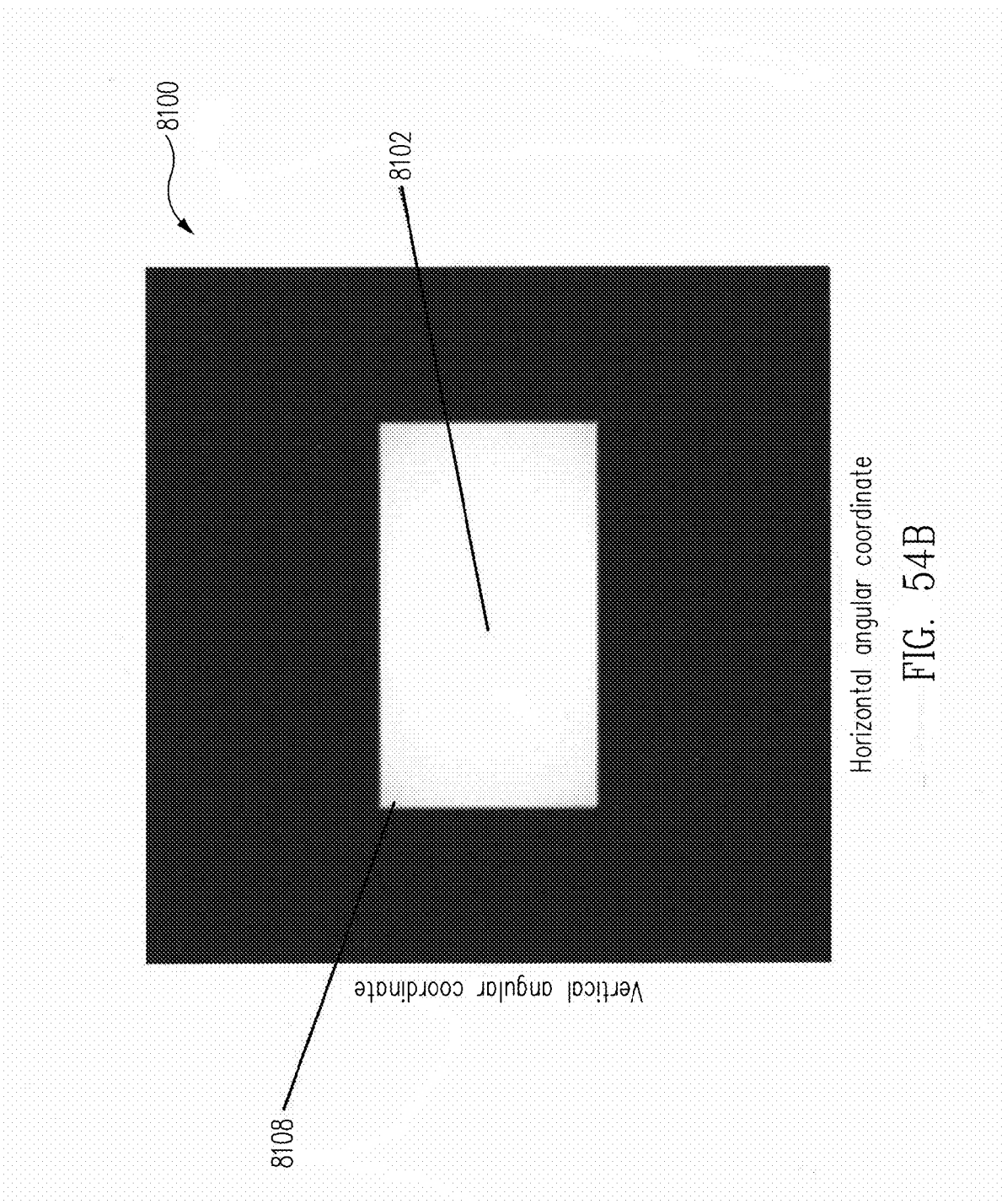
FIG. 54B illustrates a gray-scale plot corresponding to the logarithm of an intensity distribution as a function of horizontal and vertical angular coordinates produced by an illumination device where all intensity-logarithm values outside the angular region corresponding to the FOV of the camera of a mobile device have been set equal to a small value corresponding to the darkest shade of the gray scale in accordance with an embodiment of the disclosure.

FIG. 54A illustrates a gray-scale plot corresponding to the logarithm of the same angular intensity distribution depicted as a contour plot in FIG. 53A. FIG. 54B illustrates a gray-scale plot corresponding to the logarithm of this same intensity distribution, where all intensity-logarithm values outside rectangular angular region 8108 corresponding to the FOV 5918 of the camera 5912 of mobile device 5900 have been set equal to a small value corresponding to the darkest shade of the gray scale. FIGS. 54A-B may include portions 8102 and 8104 of intensity distribution 8100 corresponding to portions 8002 and 8004 of intensity distribution 8000 of FIGS. 53A-B. FIG. 54A shows a gradual and continuous decrease in the intensity as a function of angular separation from the central intensity peak 8102.

Figure 55:
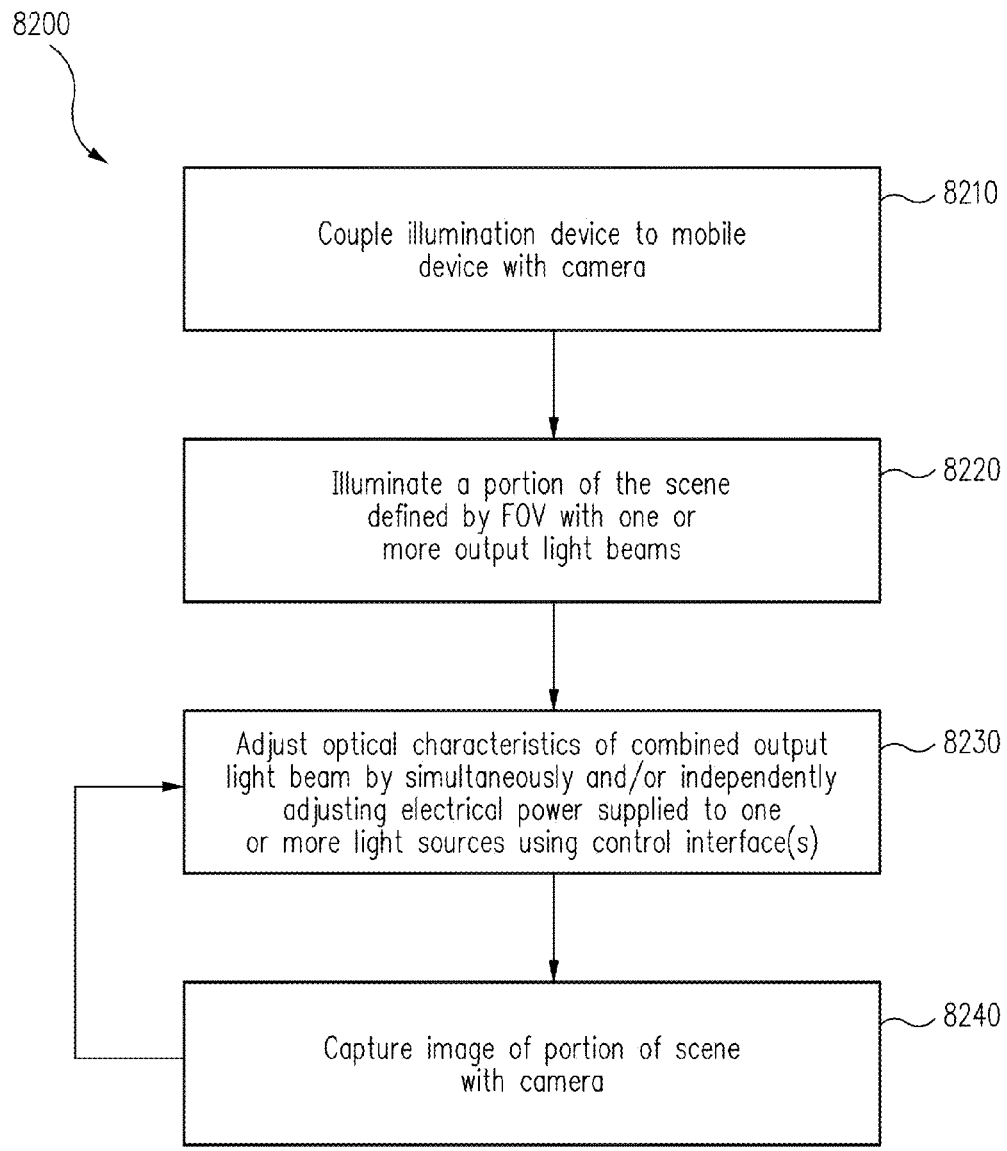
FIG. 55 illustrates a flow chart illustrating a process of operating an illumination device in accordance with an embodiment of the present disclosure.

FIG. 55 is a flow chart illustrating a process 8200 of providing illumination having appropriate characteristics (e.g., intensity distribution and color temperature) to a scene or angular region of interest using illumination device 6000 in accordance with an embodiment of the disclosure.

At block 8210, the illumination device 6000 may be coupled to a mobile device with a camera. Illumination device 6000 may be mounted to, for example, mobile device 5900 at least partially enclosed in case 5100 using methods discussed herein. The illumination device may be coupled to a mobile device mechanically and/or electrically, as discussed herein.

At block 8220, the illumination device 6000 may illuminate a portion of a scene lying within the FOV 5918 of the camera 5912 with the one or more light sources (e.g., light sources 6038A-B) and may project light beams 6076A-B, respectively. For example, the illumination device 6000 may be activated by a user control 6004 of the illumination device 6000, an application 7302 running on processor 5908 of mobile device 5900, and/or a user control 5916 of mobile device 5900. Activating the illumination device 6000 may include providing power from one or more batteries 6056 within the illumination device 6000 to one or more light sources 6038A-B at least partially disposed in one or more reflectors 6020A-B. Light beams 6076A-B may be produced by light sources 6038A-B, shaped by associated reflectors 6020A-B, and passed through transparent windows 6034A-B that may alter the spectrum and/or intensity distribution of the light beams 6076A-B. As discussed, the light beams 6076A-B may be tilted at non-zero angles relative to each other and relative to the optical axis 5920 of the camera 5912. The light beams 6076A-B may be independently tilted so that the light beams 6076A-B overlap within the FOV 5918 of the camera 5912. The overlapped light beams 6076A-B may provide a combined light beam 6076 with an angular region of highest intensity (e.g., portion 8102 of FIGS. 54A-B) in FOV 5918 as discussed herein.

At block 8230, the light beams 6076A-B may be adjusted (e.g., by the various controls and/or applications 7302 discussed herein) by simultaneously or independently adjusting the total optical flux emitted by each of the light sources 6038A-B by adjusting the amount (e.g., level) of electrical power used to drive each of them (e.g., by adjusting one or more voltages, currents, pulse width modulation (PWM) patterns, and/or other associated aspects). Depending on the specifications of the light sources 6038A-B, the designs of the optical components comprising optical trains 6002A-B, and the spatial and angular orientations of the various optical components comprising these optical trains 6002A-B, various optical characteristics (e.g., the angular intensity distribution and/or color temperature) of the combined output beam 6076 produced by the illumination device 6000 may be altered due to said adjustment of the electrical power used to drive each of the light sources 6038A-B. The level of electrical power used to drive each of the light sources 6038A-B may be adjusted during operation of the illumination device 6000 and/or mobile device 5900 (e.g., during a video recording) and may be adjusted discretely or continuously.

These electrical power levels may be adjusted using any of the various control techniques discussed herein. For example, electrical drive power may be increased or decreased to one or more light sources 6038A-B by sliding a switch (e.g., user control 6004). In another embodiment, the mobile device 5900 that the illumination device 6000 is electrically coupled to may also independently adjust the electrical drive power used to drive one or more of the light sources 6038A-B by turning or otherwise adjusting a virtual dimmer or other virtual switch or control displayed on a touchscreen display of the mobile device 5900 (e.g., displayed by an application 7302 or operating system 7303 running on processor 5908 of mobile device 5900), or by operating one or more user controls 5916 of mobile device 5900 (e.g., real buttons, switches, knobs, and/or other controls).

At block 8240, imagery (e.g., one or more images providing visual representations, such as individual still images and/or a video stream) of the portion of the scene within the FOV is captured. For example, camera 5912 may capture imagery of a scene that is illuminated by illumination device 6000. A user may then review the captured imagery on the display 5906 (e.g., a conventional screen and/or a touchscreen) of the mobile device 5900, further adjust the optical characteristics (block 8230) of the illumination provided by the illumination device, and capture additional images until the desired characteristics (e.g., color cast, contrast level, etc.) of the imagery are achieved.

In an embodiment, the illumination device 6000 may be used to provide significantly higher-intensity illumination for capturing both still and video imagery than the one or more light sources 5913 built into the mobile device 5900, thereby allowing high-quality imagery to be captured at significantly longer ranges in low-ambient-lighting conditions than would be possible without the illumination device 6000. In addition, the significantly higher-intensity illumination provided by the illumination device 6000 may allow for significantly improved contrast control (e.g., fill flash) in situations where the brightness level provided by ambient lighting varies significantly over the scene to be captured. If desired, one or more light sources 5913 of the mobile device 5900 may optionally be operated along with the one or more light sources 6038A-B of the illumination device 6000 when still or video imagery is captured. In one embodiment, prior to capturing still or video imagery while operating the one or more light sources 6038A-B of the illumination device 6000, a rotatable top portion of the illumination device 6000 containing the one or more light sources 6038A-B may be rotated to align with a desired camera (e.g., a front-facing or rear-facing camera) of the mobile device 5900.

Figure 56:
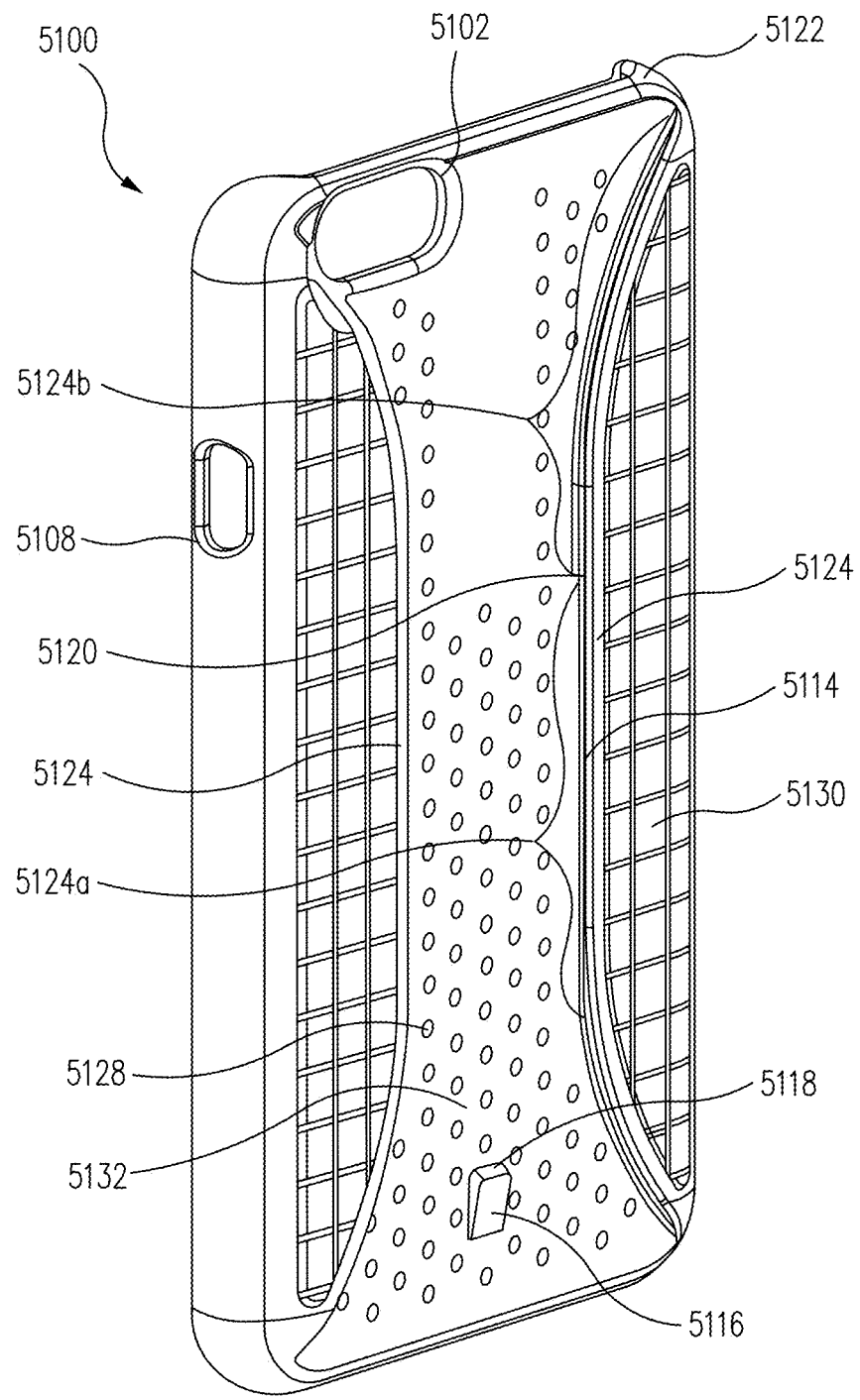
FIG. 56 illustrates a rear perspective view of a case of FIG. 51A in accordance with an embodiment of the disclosure.
Figure 57:
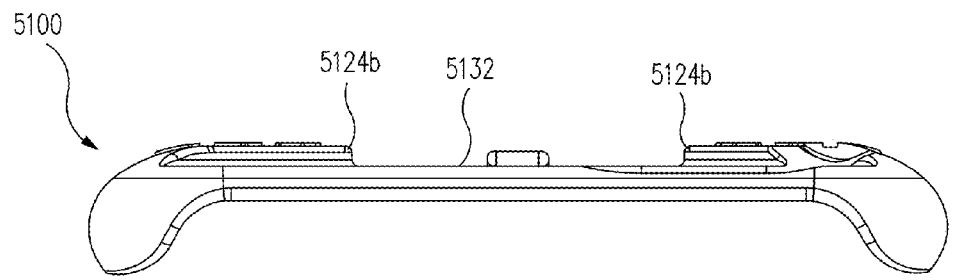
FIG. 57 is a top plan view of the case of FIG. 51A in accordance with an embodiment of the disclosure.
Figure 58:
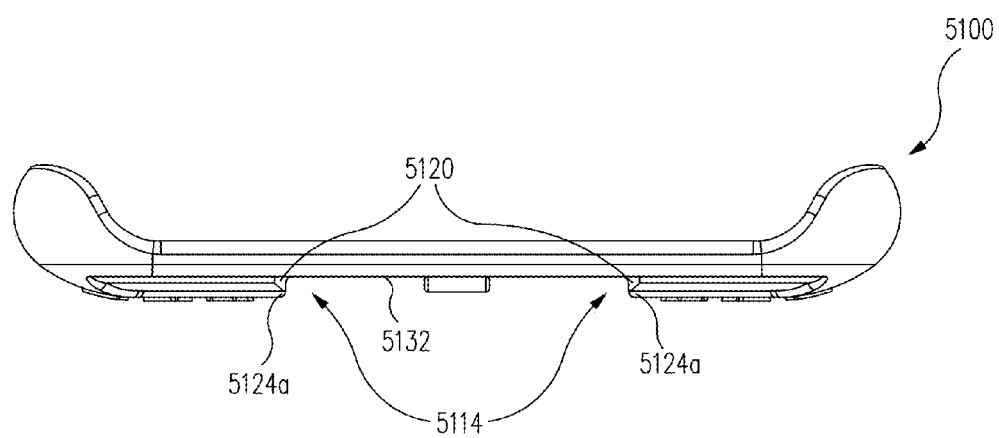
FIG. 58 illustrates a bottom plan view of the case of FIG. 51A in accordance with an embodiment of the disclosure.
Figure 59:
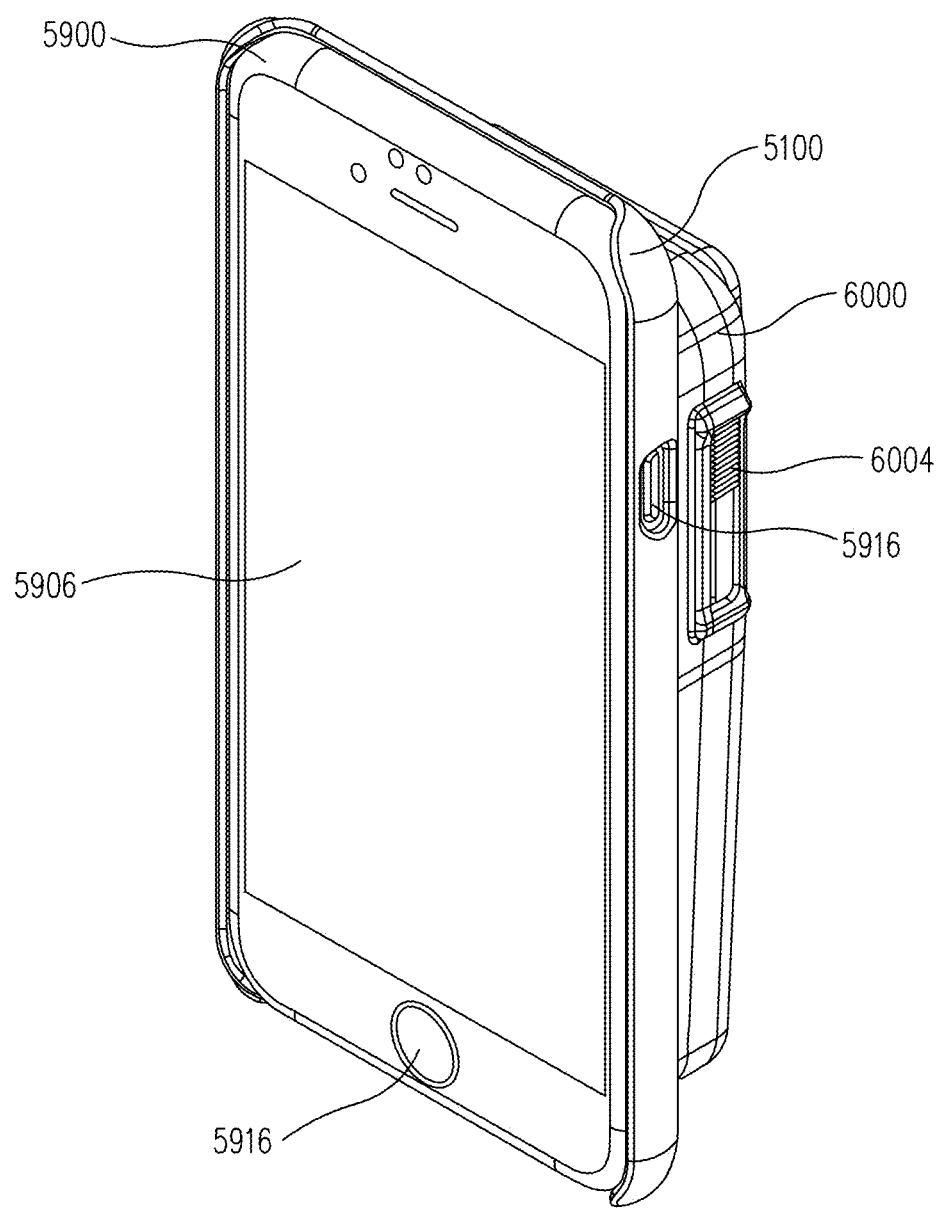
FIG. 59 illustrates a front perspective view of the case holding the mobile device and the illumination device of FIG. 51A secured thereto in accordance with an embodiment of the disclosure.

FIGS. 56-58 are various views of a case 5100 and FIG. 59 is a front perspective view of case 5100 attached to mobile device 5900 in accordance with embodiments of the disclosure. Case 5100 may be used to attach various types of devices (e.g., illumination device 6000; see FIG. 60) to mobile device 5900 as discussed herein. In various embodiments, case 5100 may partially and/or fully enclose mobile device 5900. Case 5100 may have various apertures (e.g., light aperture 5102 and/or switch/button apertures 5104, 5106, and/or 5108; see FIGS. 56 and 65-67) for convenient access to various components of mobile device 5900 at least partially disposed in case 5100.

Various features are provided on rear portion 5122 of case 5100, including an outer surface portion 5132, ribs 5124, and grooves 5114 (e.g., tracks). Ribs 5124 are disposed on substantially opposite sides of outer surface 5132. As shown in FIGS. 56, 57, and 58, portions 5124a of ribs 5124 are elevated and disposed away from outer surface 5132 to define grooves 5114 between elevated portions 5124a and outer surface 5132. For example, grooves 5114 may be implemented as respective elongate voids between elevated portions 5124a and outer surface 5132. Ribs 5124 also include solid portions 5124b which provide stops 5120 at respective ends of grooves 5114. For example, in some embodiments, stops 5120 may be formed by solid portions 5124b of ribs 5124 conjoining with outer surface 5132 to define stops 5120 as surfaces substantially perpendicular to outer surface 5132 (e.g., see FIGS. 57 and 58). Accordingly, grooves 5114 extend under elevated portions 5124a of ribs 5124 and terminate at solid portions 5124b.

Case 5100 also includes a wedge-shaped locking member 5116 having a contact surface 5118 configured to engage with a complementary feature of illumination device 6000 as further described herein.

Case 5100 includes textured surfaces 5130 adjacent to ribs 5124. Outer surface 5132 includes textured surfaces 5128 (e.g., in a dimpled pattern as shown or otherwise). In various embodiments, textured surfaces 5128 and/or 5130 may be provided to permit a user to conveniently grip case 5100 while illumination device 6000 is attached thereto.

Figure 64:
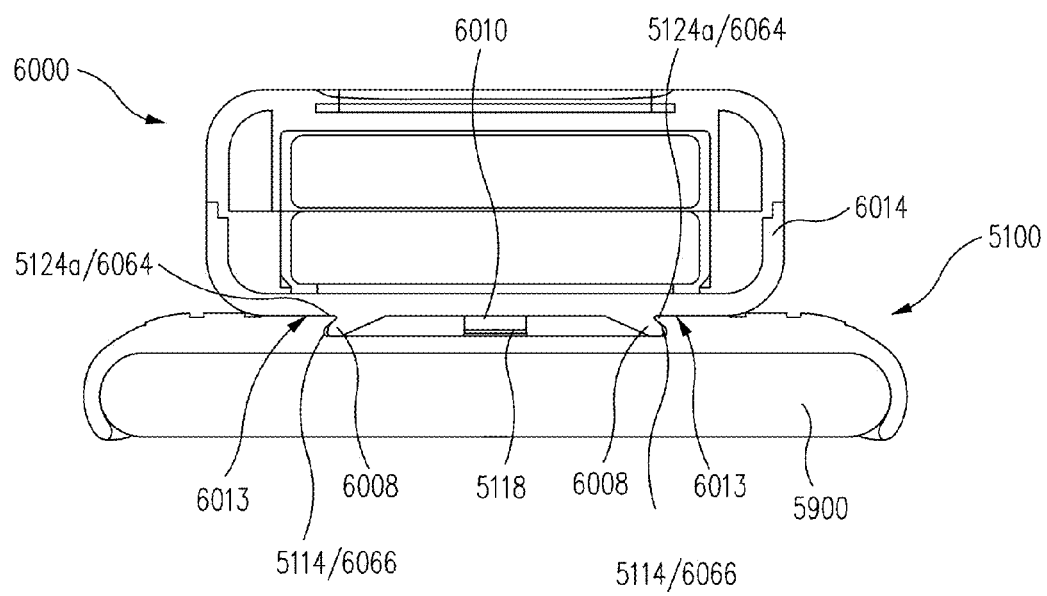
FIG. 64 illustrates a cross-sectional top view of the illumination device, case, and mobile device taken at line 14-14 of FIG. 51A in accordance with an embodiment of the disclosure.
Figure 65:
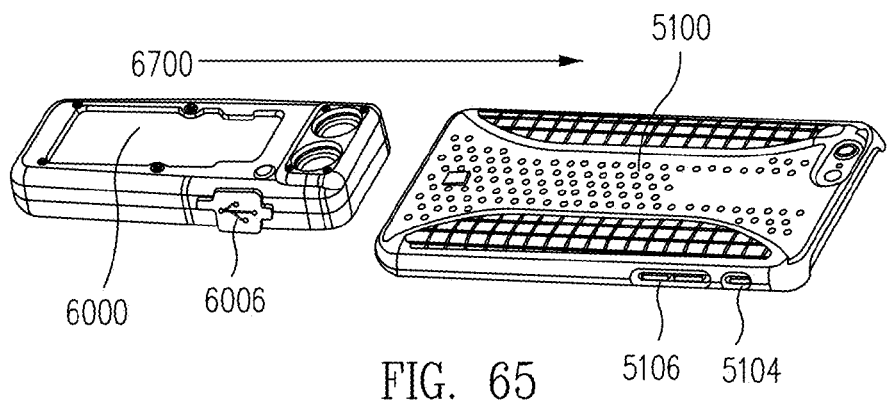
FIG. 65 illustrates a rear perspective view of the illumination device being slid onto the case of FIG. 51A in accordance with an embodiment of the disclosure.
Figure 66:
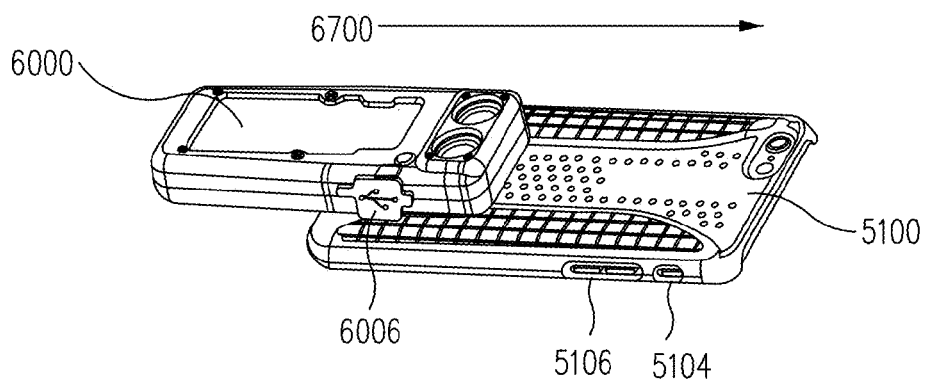
FIG. 66 illustrates a rear perspective view of the illumination device partially engaged with the case of FIG. 51A in accordance with an embodiment of the disclosure.
Figure 67:
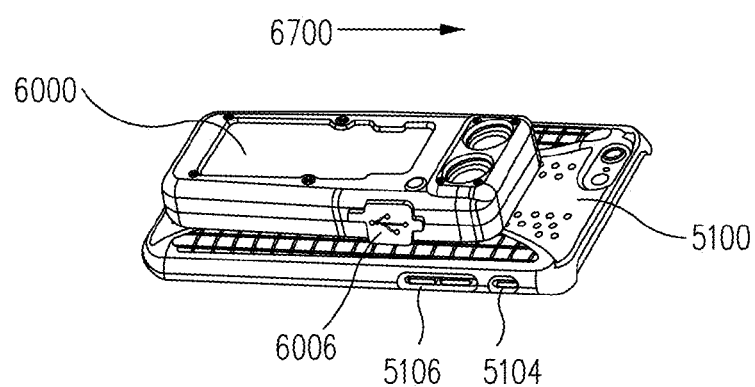
FIG. 67 illustrates a rear perspective view of the illumination device completely engaged with and secured to the case of FIG. 51A in accordance with an embodiment of the disclosure.

FIGS. 60-63 are various views of illumination device 6000 illustrating mechanical structures used to attach it to mobile device 5900 through case 5100 in accordance with embodiments of the disclosure. FIG. 64 is a cross-sectional view of case 5100, mobile device 5900, and illumination device 6000 in accordance with embodiments of the disclosure. FIGS. 65-67 are various views of illumination device 6000 in a process of engagement with case 5100 in accordance with embodiments of the disclosure.

Case 5100 and illumination device 6000 may interoperate to provide an attachment mechanism to secure (e.g., mechanically couple) illumination device 6000 to mobile device 5900 while mobile device 5900 is held by case 5100. In this regard, illumination device 6000 includes two opposing, elongate, and substantially parallel engagement members 6008 extending from a housing 6014 of illumination device 6000 and used to connect to case 5100. In various embodiments, engagement members 6008 may be integral portions of housing 6014 or may be separate structures mounted to or otherwise attached to housing 6014.

Figure 60:
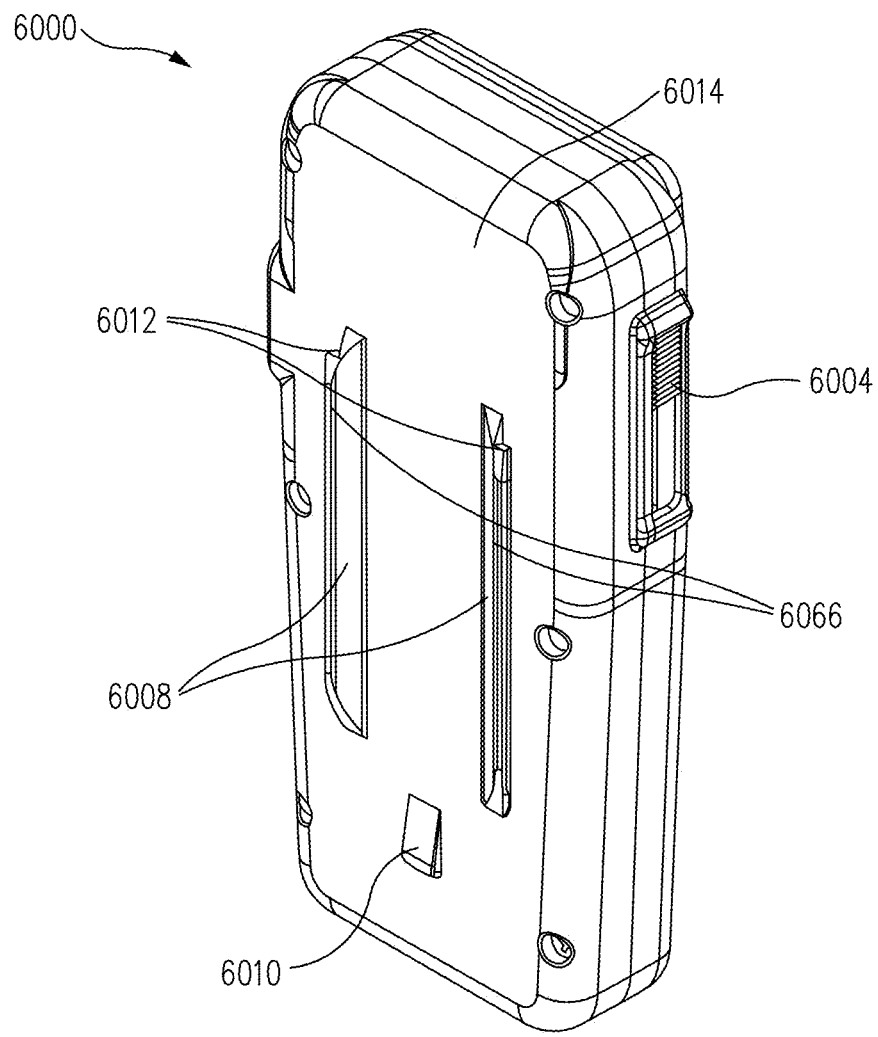
FIG. 60 illustrates a front perspective view of the illumination device of FIG. 51A in accordance with an embodiment of the disclosure.
Figure 61:
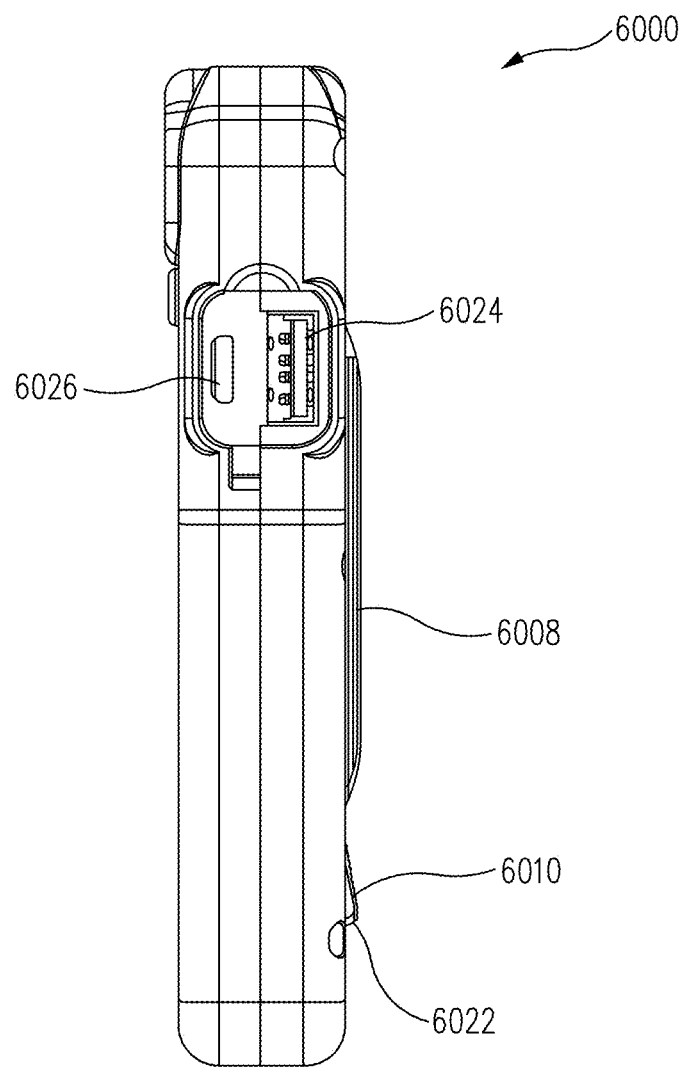
FIG. 61 illustrates a right side elevational view of the illumination device of FIG. 51A in accordance with an embodiment of the disclosure.
Figure 62:
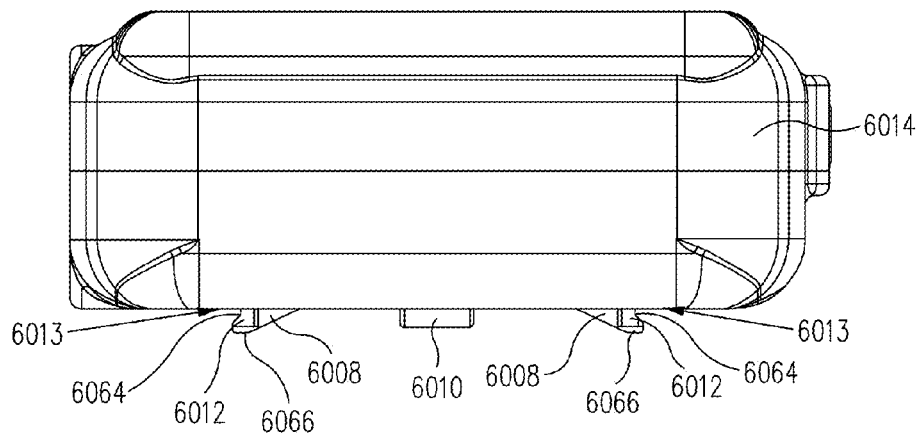
FIG. 62 illustrates a top plan view of the illumination device of FIG. 51A in accordance with an embodiment of the disclosure.
Figure 63:
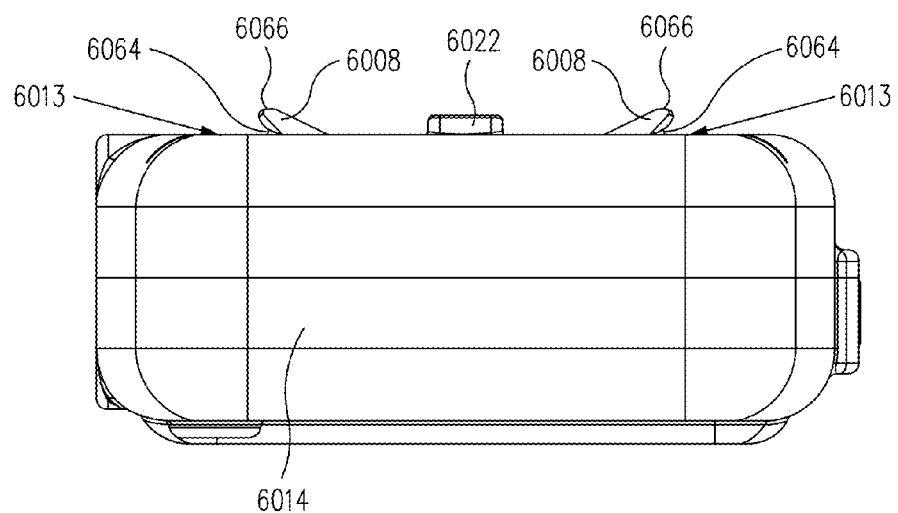
FIG. 63 illustrates a bottom plan view of the illumination device of FIG. 51A in accordance with an embodiment of the disclosure.

Engagement members 6008 each include an elongate tongue 6066 adapted to slide into a corresponding one of grooves 5114 in a tongue-and-groove engagement. As shown in FIG. 60, tongues 6066 may be implemented as flanges extending from main body portions of engagement members 6008. Each tongue 6066 has an abutment surface 6012 configured to contact a corresponding stop 5120 of case 5100 when illumination device 6000 is mounted onto case 5100 and engagement members 6008 are completely engaged with ribs 5124. Abutment surfaces 6012 may be implemented as notches in engagement members 6008. In this regard, abutment surfaces 6012 may catch and rest adjacent stops 5120 of case 5100 when illumination device 6000 is slid onto case 5100 and completely engaged therewith.

As shown in the cross-sectional view of FIG. 64 taken at line 14-14 of FIG. 51A, tongues 6066 of engagement members 6008 may be positioned within grooves 5114 of case 5100 such that elevated portions 5124a of ribs 5124 are disposed above tongues 6066, thus securing illumination device 6000 to case 5100 through the engagement of tongues 6066 with grooves 5114. As also shown, elevated portions 5124a of ribs 5124 may engage with corresponding grooves 6064 (e.g., tracks) of illumination device 6000 (e.g., grooves 6064 formed between a substantially flat surface 6013 of housing 6014 and tongues 6066 of engagement members 6008) to further secure illumination device 6000 to case 5100.

Illumination device 6000 also includes locking member 6010, which may be used to further secure illumination device 6000 to case 5100. Locking member 6010 is disposed on housing 6014 and provides a contact surface 6022 configured to engage with contact surface 5118 of locking member 5116 in a complementary fashion. As tongues 6066 slide into grooves 5114, illumination device locking member 6010 will slide over case locking member 5116. When tongues 6066 are fully slid into grooves 5114 (e.g., such that abutment surfaces 6012 contact stops 5120), locking member 6010 will have fully slid over locking member 5116. Locking member 6010 will be pulled down toward outer surface 5132 of case 5100 due to the engagement of tongues 6066 and grooves 5114. As a result, locking member 6010 will be positioned in front of locking member 5116. Locking members 5116 and 6010 may be sized and positioned such that surfaces 5118 and 6022 are in contact and in tension with each other (e.g., surface 5118 may push against surface 6022) when locking member 6010 is so positioned. This causes locking member 5116 to bias (e.g., push) locking member 6010, and therefore also push housing 6014, toward stops 5120. As a result, tongues 6066 of engagement members 6008 will be pushed against stops 5120 by their attachment to housing 6014.

The mechanical engagement of case 5100 with illumination device 6000 can be further understood with reference to FIGS. 65-67. In FIG. 65, illumination device 6000 is positioned away from case 5100 and is slid generally in the direction of arrow 6700. In other embodiments, case 5100 may be slid toward illumination device 6000 (e.g., generally opposite the direction of arrow 6700) or case 5100 and illumination device 6000 may be slid toward each other. In FIG. 66, tongues 6066 have been partially slid into grooves 5114 such that illumination device 6000 is partially engaged with case 5100. In FIG. 67, tongues 6066 have been fully slid into grooves 5114 such that abutment surfaces 6012 contact stops 5120 and surfaces 5118 and 6022 of locking members 5116 and 6010 are engaged with each other. Illumination device 6000 may be disengaged from case 5100, for example, by reversing the sliding operation with sufficient force to dislodge locking members 5116 and 6010 from each other to permit locking member 6010 to slide back over locking member 5116 and withdraw tongues 6066 from grooves 5114.

Various embodiments described and/or illustrated by the present disclosure may be combined with any of the various embodiments described and/or illustrated in U.S. Provisional Patent Application No. 62/104,038 filed Jan. 15, 2015, which is hereby incorporated by reference in its entirety.

The disclosure is not intended to limit the present invention to the precise forms or particular fields of use disclosed. It is contemplated that various alternate embodiments and/or modifications to the present invention, whether explicitly described or implied herein, are possible in light of the disclosure. For example, it is contemplated that the various embodiments set forth herein may be combined together and/or separated into additional embodiments where appropriate. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A portable illumination device configured to be mounted on a mobile phone, the portable illumination device comprising:
    a housing;
    a plurality of light sources disposed within the housing and configured to provide corresponding light beams having adjustable output flux levels;
    wherein the light beams at least partially overlap to provide a combined light beam that exhibits a non-rotationally symmetric intensity distribution as a function of vertical and horizontal angular coordinates to provide illumination for images of an external volume of interest captured by a camera of the mobile phone separate from the housing; and
    wherein the intensity distribution comprises an intensity peak portion at a center of a field of view of the camera and a continuous decrease in intensity as a function of angular separation from the peak portion.

2. The portable illumination device of claim 1, wherein first and second ones of the light beams exhibit different corresponding first and second wavelength ranges, wherein the combined light beam exhibits a color temperature determined by the output flux levels of the first and second light beams to provide a desired color cast for the images captured by the camera of the mobile phone.

3. The portable illumination device of claim 2, wherein the first and second wavelength ranges comprise partially overlapping visible light wavelength ranges.

4. The portable illumination device of claim 2, wherein the portable illumination device further comprises a control interface configured to receive a manipulation by a user to selectively adjust the output flux levels.

5. The portable illumination device of claim 2, wherein the portable illumination device further comprises a communication interface configured to receive a signal from the mobile phone to selectively adjust the output flux levels in response to an operation by a user of the mobile phone.

6. The portable illumination device of claim 1, wherein first and second ones of the light beams exhibit different corresponding first and second wavelength ranges corresponding to different subsets of wavelengths within a spectrum from approximately 10 nm to approximately $10^6$ nm.

7. The portable illumination device of claim 1, wherein the light sources are implemented as parts of corresponding optical trains of the portable illumination device, wherein the optical trains further comprise associated reflectors and/or lenses configured to project the corresponding light beams to provide the combined light beam.

8. The portable illumination device of claim 7, wherein the reflectors and/or lenses are configured to project the corresponding light beams to exhibit maximum intensities at angular coordinates differing from angular coordinates of an optical axis of the camera.

9. The portable illumination device of claim 7, wherein the reflectors and/or lenses are configured to project the corresponding light beams to exhibit maximum intensities at angular coordinates differing from each other.

10. The portable illumination device of claim 7, wherein the optical trains comprise associated exit pupils separated by a distance greater than half a longest dimension of the mobile phone from an entrance pupil of the camera of the mobile phone to which the portable illumination device is configured to be mounted, wherein the separation is configured to reduce backscattering of light into a field of view of the camera of the mobile phone from airborne particles illuminated by the light beams.

11. The portable illumination device of claim 1, further comprising an electrical connection configured to transfer electrical power, electronic control signals, and/or data in electronic form between the mobile phone and the portable illumination device.

12. The portable illumination device of claim 1, wherein the captured images are video images and/or photographic images.

13. The portable illumination device of claim 1, wherein the one or more light sources are light emitting diodes (LEDs).

14. A method comprising:
providing a portable illumination device configured to be mounted on a mobile phone and comprising a housing and one or more light sources disposed within the housing;
operating the light sources to provide corresponding light beams having adjustable output flux levels, wherein the light beams at least partially overlap to provide a combined light beam that exhibits a non-rotationally symmetric intensity distribution as a function of vertical and horizontal angular coordinates, and wherein the intensity distribution comprises an intensity peak portion at a center of a field of view of the camera and a continuous decrease in intensity as a function of angular separation from the peak portion; and
capturing, by a camera of the mobile phone separate from the housing, images of an external volume of interest illuminated by the combined light beam.

15. The method of claim 14, wherein first and second ones of the light beams exhibit different corresponding first and second wavelength ranges, wherein the combined light beam exhibits a color temperature determined by the output flux levels of the first and second light beams to provide a desired color cast for the images captured by the camera of the mobile phone.

16. The method of claim 15, wherein the first and second wavelength ranges comprise partially overlapping visible light wavelength ranges.

17. The method of claim 15, further comprising receiving, by a control interface of the portable illumination device, a manipulation by a user to selectively adjust the output flux levels.

18. The method of claim 15, further comprising receiving, by a communication interface of the portable illumination device, a signal from the mobile phone to selectively adjust the output flux in response to an operation by a user of the mobile phone.

19. The method of claim 14, wherein first and second ones of the light beams exhibit different corresponding first and second wavelength ranges corresponding to different subsets of wavelengths within a spectrum from approximately 10 nm to approximately $10^6$ nm.

20. The method of claim 14, wherein the light sources are implemented as parts of corresponding optical trains of the portable illumination device, wherein the optical trains further comprise associated reflectors and/or lenses, the method further comprising projecting the corresponding light beams from the reflectors and/or lenses to provide the combined light beam.

21. The method of claim 20, wherein the corresponding light beams projected from the reflectors and/or lenses exhibit maximum intensities at angular coordinates differing from angular coordinates of an optical axis of the camera.

22. The method of claim 20, wherein the corresponding light beams projected from the reflectors and/or lenses exhibit maximum intensities at angular coordinates differing from each other.

23. The method of claim 20, wherein the optical trains comprise associated exit pupils separated by a distance greater than half a longest dimension of the mobile phone from an entrance pupil of the camera of the mobile phone to which the portable illumination device is configured to be mounted, wherein the separation is configured to reduce backscattering of light into a field of view of the camera of the mobile phone from airborne particles illuminated by the light beams.

24. The method of claim 14, further comprising transferring, through an electrical connection between the mobile phone and the portable illumination device, electrical power, electronic control signals, and/or data in electronic form.

25. The method of claim 14, wherein the captured images are video images and/or photographic images.

26. The method of claim 14, wherein the one or more light sources are light emitting diodes (LEDs).

27. The portable illumination device of claim 1, wherein the output flux levels of the light beams are independently adjustable.

28. The method of claim 14, wherein the operating comprises independently adjusting the output flux levels of the light beams.

* * * * *

UNITED STATES PATENT AND TRADEMARK OFFICE
CERTIFICATE OF CORRECTION

PATENT NO. : 9,618,827 B2
APPLICATION NO. : 14/996152
DATED : April 11, 2017
INVENTOR(S) : Shatz et al.

Page 1 of 1

It is certified that error appears in the above-identified patent and that said Letters Patent is hereby corrected as shown below:

In the Specification

In Column 15, Line 46, change "1-min-focal-length" to --1-mm-focal length--;
In Column 21, Line 25, change "may foul" to --may form--;
In Column 22, Line 53, change "remain unfilled" to --remain untilted--; and
In Column 34, Line 51, change "remain unfilled" to --remain untilted--.

Signed and Sealed this
Tenth Day of July, 2018

Andrei Iancu
*Director of the United States Patent and Trademark Office*